(12) United States Patent
Tomimatsu et al.

(10) Patent No.: US 9,188,072 B2
(45) Date of Patent: Nov. 17, 2015

(54) AIR-FUEL RATIO CONTROL APPARATUS FOR AN INTERNAL COMBUSTION ENGINE

(75) Inventors: Makoto Tomimatsu, Susono (JP); Takahiko Fujiwara, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 433 days.

(21) Appl. No.: 13/825,705

(22) PCT Filed: Sep. 24, 2010

(86) PCT No.: PCT/JP2010/066590
§ 371 (c)(1),
(2), (4) Date: Mar. 22, 2013

(87) PCT Pub. No.: WO2012/039064
PCT Pub. Date: Mar. 29, 2012

(65) Prior Publication Data
US 2013/0179051 A1    Jul. 11, 2013

(51) Int. Cl.
*F02D 41/14* (2006.01)
*F01N 3/00* (2006.01)
*F02D 41/02* (2006.01)
*F02D 17/02* (2006.01)
*F02D 41/00* (2006.01)
(Continued)

(52) U.S. Cl.
CPC ........ *F02D 41/0235* (2013.01); *F01N 13/0093* (2014.06); *F02D 17/02* (2013.01); *F02D 41/0085* (2013.01); *F02D 41/1454* (2013.01);
(Continued)

(58) Field of Classification Search
CPC ............ F02D 41/1439; F02D 41/1458; F02D 41/1441; F02D 41/0085; F02D 41/1454; F02D 41/1498; F02D 41/1408; F02D 41/142; F02D 41/1463; F02D 41/1465; F02D 2200/0816; F02D 2200/0814
USPC ............ 60/285, 303, 277, 276, 274; 123/673; 73/23.32, 114.73, 114.75
See application file for complete search history.

(56) References Cited

U.S. PATENT DOCUMENTS 5,609,025 A * 3/1997 Abe ................................ 60/285
5,644,912 A * 7/1997 Kawamura ..................... 60/276
(Continued)

FOREIGN PATENT DOCUMENTS

| JP | 8-158915 A | 6/1996 |
| JP | 2005-207354 A | 8/2005 |

*Primary Examiner* — Stephen K Cronin
*Assistant Examiner* — George Jin
(74) *Attorney, Agent, or Firm* — Sughrue Mion, PLLC

(57) ABSTRACT

An embodiment (control apparatus) of an air-fuel ratio control apparatus according to the present invention determines, based on an output value Voxs of a downstream air-fuel ratio sensor 56 disposed at a position downstream of a three-way catalyst 43, which air-fuel request is occurring, a rich request or a lean request. The control apparatus sets an air-fuel ratio of each cylinder (cylinder-by-cylinder air-fuel ratio) to a rich air-fuel ratio when the rich request is occurring, and sets the cylinder-by-cylinder air-fuel ratio to a lean air-fuel ratio when the lean request is occurring. The control apparatus has a cylinder-by-cylinder air-fuel ratio of a specific cylinder different from a cylinder-by-cylinder air-fuel ratio of the other cylinder so as to obtain a fluctuation period correlated value indicative of a fluctuation of the output value Voxs of the downstream air-fuel ratio sensor 56, and determines an influence/impact degree on the output value of the downstream air-fuel ratio sensor of an exhaust gas discharged from each of a plurality of cylinders, based on the fluctuation period correlated value. Further, the control apparatus controls the air-fuel ratio of each cylinder in accordance with the influence degree.

20 Claims, 18 Drawing Sheets

(51) Int. Cl.
*F02D 41/24* (2006.01)
*F01N 13/00* (2010.01)

(52) U.S. Cl.
CPC ........ *F02D 41/1458* (2013.01); *F02D 41/1463* (2013.01); *F02D 41/2454* (2013.01); *F01N 13/008* (2013.01); *F01N 2560/025* (2013.01); *F02D 41/1441* (2013.01); *Y02T 10/22* (2013.01)

(56) References Cited

U.S. PATENT DOCUMENTS

| | | | |
|---|---|---|---|
| 6,253,542 B1 * | 7/2001 | Omara et al. | 60/274 |
| 6,470,674 B1 * | 10/2002 | Yamaguchi et al. | 60/277 |
| 6,481,201 B2 * | 11/2002 | Kako et al. | 60/285 |
| 8,230,846 B2 * | 7/2012 | Fujiwara et al. | 123/696 |
| 2001/0022081 A1 * | 9/2001 | Oguma et al. | 60/285 |
| 2005/0161033 A1 * | 7/2005 | Okamoto et al. | 123/673 |
| 2006/0242948 A1 * | 11/2006 | Nakagawa | 60/285 |
| 2007/0089398 A1 * | 4/2007 | Fujiwara et al. | 60/277 |
| 2008/0148711 A1 * | 6/2008 | Takubo | 60/285 |
| 2009/0030592 A1 * | 1/2009 | Mitsutani | 701/109 |
| 2009/0138172 A1 * | 5/2009 | Okazaki et al. | 701/103 |
| 2009/0139213 A1 * | 6/2009 | Mukai | 60/277 |
| 2012/0029790 A1 * | 2/2012 | Maruyama | 701/103 |
| 2012/0060805 A1 * | 3/2012 | Nakano et al. | 123/703 |
| 2013/0110380 A1 * | 5/2013 | Tomimatsu et al. | 701/104 |

* cited by examiner

US 9,188,072 B2

AIR-FUEL RATIO CONTROL APPARATUS FOR AN INTERNAL COMBUSTION ENGINE

CROSS REFERENCE TO RELATED APPLICATIONS

This application is a National Stage of International Application No. PCT/JP2010/066590 filed Sep. 24, 2010, the contents of all of which are incorporated herein by reference in their entirety.

TECHNICAL FIELD

The present invention relates to an air-fuel ratio control apparatus for an internal combustion engine having a three-way catalyst in an exhaust passage.

BACKGROUND ART

Conventionally, a three-way catalyst (catalytic converter) is provided in an exhaust passage of a multi-cylinder internal combustion engine in order to purify an exhaust gas discharged from the engine. As is well known, the three-way catalyst has an "oxygen storage function (oxygen storage and release function)" to store and release oxygen in accordance with components flowing into the three-way catalyst. Hereinafter, the three-way catalyst is also simply referred to as a "catalyst", the gas flowing into the catalyst is also referred to as a catalyst inflow gas. Further, the gas flowing out from the catalyst is also referred to as a catalyst outflow gas.

One (conventional apparatus) of the conventional air-fuel ratio control apparatuses comprises an upstream air-fuel ratio sensor disposed in the exhaust passage of the engine at a position upstream of the catalyst, and a downstream air-fuel ratio sensor disposed in the exhaust passage of the engine at a position downstream of the catalyst. The conventional apparatus obtains, based on an amount of an air introduced into the engine, a "base fuel injection amount to have an air-fuel ratio of a mixture supplied to the engine (air-fuel ratio of the engine) coincide with the stoichiometric air-fuel ratio", and performs a feedback-correction on the base fuel injection amount based on an output value of the upstream air-fuel ratio sensor and an output value of the downstream air-fuel ratio sensor (see, for example, Patent Literature No. 1). Further, the conventional apparatus changes a correction amount of the feedback-correction based on a period (time duration) in which the output value of the downstream air-fuel ratio sensor changes from a value corresponding to a rich air-fuel ratio (or a lean air-fuel ratio) with respect to the stoichiometric air-fuel ratio to a value corresponding to a lean air-fuel ratio (or a rich air-fuel ratio) with respect to the stoichiometric air-fuel ratio (that is, the time duration according to an inversion period, and thus, corresponding to a variation/parameter which varies in accordance with an oxygen storage capacity of the catalyst). Accordingly, the conventional apparatus can perform an air-fuel ratio control in accordance with the oxygen storage capacity of the catalyst.

CITATION LIST

Patent Literature

<Patent Literature No. 1> Japanese Patent Application Laid-Open (kokai) No. Hei 8-158915

SUMMARY OF THE INVENTION

The upstream air-fuel ratio sensor is disposed in an exhaust gas merging/aggregated portion of the exhaust passage, but at a certain position, wherein a distance between the position and each exhaust port of each of the cylinders is relatively short. This causes an exhaust gas from a specific cylinder to more strongly reach the upstream air-fuel ratio sensor than from the other cylinders. That is, even when flow rates of the exhaust gases discharged form the cylinders are the same as each other, the exhaust gas discharged from the specific cylinder passes through in the vicinity of the upstream air-fuel ratio sensor in a "greater amount", as compared with the exhaust gas discharged from the cylinder other than the specific cylinder. Accordingly, the output value of the upstream air-fuel ratio sensor is more greatly affected by an air-fuel ratio of a mixture in that specific cylinder. In other words, the sensitivity of the upstream air-fuel ratio sensor with respect to the "air-fuel ratio of the exhaust gas discharged from the specific cylinder" is higher than the sensitivity of the upstream air-fuel ratio sensor with respect to the "air-fuel ratio of the exhaust gas discharged from the cylinder other than the specific cylinder."

In contrast, it has been considered that the exhaust gases discharged from the cylinders reach the downstream air-fuel ratio sensor disposed downstream of the catalyst with the same strength as each other. That is, it has been considered that the sensitivity of the downstream air-fuel ratio sensor with respect to the "air-fuel ratio of the exhaust gas discharged from the certain cylinder" is the same as the sensitivity of the downstream air-fuel ratio sensor with respect to the "air-fuel ratio of the exhaust gas discharged from the cylinder other than that certain cylinder."

However, as exemplified in FIG. 1, the exhaust gas discharged from a specific cylinder (first cylinder #1, in the example shown in FIG. 1) reach the downstream air-fuel ratio sensor 56 relatively strongly, depending on a shape of an exhaust manifold 41, a disposed position of the downstream air-fuel ratio sensor 56, and so on. Thus, it is turned out that there may be a case in which the sensitivity of the downstream air-fuel ratio sensor 56 with respect to the "air-fuel ratio of the exhaust gas discharged from that specific cylinder" is higher than the sensitivity of the downstream air-fuel ratio sensor with respect to the "air-fuel ratio of the exhaust gas discharged from the cylinder other than that specific cylinder." In other words, the inventor(s) has (have) found that the output value of the downstream air-fuel ratio sensor 56 varies while being affected by the air-fuel ratio of the exhaust gas discharged from that specific cylinder (and therefore, the air-fuel ratio of the mixture supplied to that specific cylinder) more strongly than the air-fuel ratio of the exhaust gas discharged from the cylinder other than that specific cylinder.

However, the conventional apparatus does not consider the fact that the output value of the downstream air-fuel ratio sensor 56 is affected by the air-fuel ratio of the exhaust gas discharged from that specific cylinder more strongly than the air-fuel ratio of the exhaust gas discharged from the cylinder other than that specific cylinder, and thus, controls the air-fuel ratios of all of the cylinders uniformly/evenly based on the output value of the downstream air-fuel ratio sensor 56. Accordingly, there is a room for improvement of the emission in the conventional apparatus. Further, in order to perform an air-fuel ratio control which positively utilizes the fact that the output value of the downstream air-fuel ratio sensor 56 is affected by the air-fuel ratio of the exhaust gas discharged from that specific cylinder relatively more strongly, it is necessary to determine which cylinder is that specific cylinder.

The present invention is made to cope with the above problems. One of objects of a first aspect (hereinafter, simply referred to as a "first invention apparatus") of the air-fuel ratio control apparatus for an internal combustion engine according to the present invention is to provide the air-fuel ratio control apparatus for an internal combustion engine which can determine (decide/identify) an "influence/impact degree on the output value of the downstream air-fuel ratio sensor" caused by (or of) the exhaust gas discharged from each of the cylinders, by appropriately adjusting the air-fuel ratio of the mixture supplied to each of the cylinders. Since the first invention apparatus can determine the "influence/impact degree on the output value of the downstream air-fuel ratio sensor (that is, the sensitivity of the downstream air-fuel ratio sensor with respect to the "air-fuel ratio of the exhaust gas discharged from each of the cylinders"), the first invention apparatus can appropriately control, based on the determination result, the air-fuel ratio of each of the cylinders in accordance with an operating condition, etc. . . .

More specifically, the first invention apparatus is the air-fuel ratio control apparatus for a multi-cylinder internal combustion engine, which comprises: a three-way catalyst disposed at a position downstream of an exhaust gas aggregated portion in an exhaust passage of the engine into which exhaust gases discharged from a plurality of cylinders which the engine includes aggregate/merge; a downstream air-fuel ratio sensor; a cylinder-by-cylinder mixture supplying section; and a cylinder-by-cylinder air-fuel ratio control section. Note that, the first invention apparatus may further comprise an upstream air-fuel ratio sensor, and perform an air-fuel ratio control using an output value of the upstream air-fuel ratio sensor.

The downstream air-fuel ratio sensor is disposed in the exhaust passage and at a position downstream of the three-way catalyst. The downstream air-fuel ratio sensor outputs an output value which varies in accordance with (in response to) an air-fuel ratio of an exhaust gas flowing through the position at which the downstream air-fuel ratio sensor is disposed.

The cylinder-by-cylinder mixture supplying section supplies a mixture to each of combustion chambers of a plurality of the cylinders. Further, the cylinder-by-cylinder mixture supplying section is configured so as to adjust an air-fuel ratio of the mixture supplied to each of the combustion chambers (that is, cylinder-by-cylinder air-fuel ratio) independently from each other among a plurality of the cylinders. For example, the cylinder-by-cylinder mixture supplying section may include a plurality of fuel injection valves, each configured so as to inject a fuel contained in the mixture supplied to each of the combustion chambers of a plurality of the cylinders.

The cylinder-by-cylinder air-fuel ratio control section determines, based on the output value of the downstream air-fuel ratio sensor, which air-fuel request is occurring, a rich request or a lean request.

The rich request is a request to set an air-fuel ratio of the catalyst inflow gas to (at) an air-fuel ratio (i.e., rich air-fuel ratio) smaller than the stoichiometric air-fuel ratio.

The lean request is a request to set an air-fuel ratio of the catalyst inflow gas to (at) an air-fuel ratio (i.e., lean air-fuel ratio) larger than the stoichiometric air-fuel ratio.

A method/technique to determine which air-fuel ratio request is occurring, the rich request or the lean request, is not specifically limited. For example, the cylinder-by-cylinder air-fuel ratio control section may determine that the lean request is occurring when the output value of the downstream air-fuel ratio sensor is a value corresponding to an air-fuel ratio richer (smaller) than the stoichiometric air-fuel ratio, and that the rich request is occurring when the output value of the downstream air-fuel ratio sensor is a value corresponding to an air-fuel ratio leaner (larger) than the stoichiometric air-fuel ratio. Needless to say, the cylinder-by-cylinder air-fuel ratio control section may determine which air-fuel ratio request is occurring, the rich request or the lean request, by comparing the output value of the downstream air-fuel ratio sensor with a plurality of thresholds, or by utilizing a temporal differential value of the output value of the downstream air-fuel ratio sensor, etc.

Furthermore, the cylinder-by-cylinder air-fuel ratio control section controls the cylinder-by-cylinder air-fuel ratio of each of a plurality of the cylinders in such a manner that each cylinder-by-cylinder air-fuel ratio of each of a plurality of the cylinders becomes an air-fuel ratio corresponding to the "determined air-fuel ratio request (the rich request or the lean request)." That is, the cylinder-by-cylinder air-fuel ratio control section sets the cylinder-by-cylinder air-fuel ratio to an air-fuel ratio (rich air-fuel ratio) smaller than the stoichiometric air-fuel ratio when the determined air-fuel ratio request is the rich request, and sets the cylinder-by-cylinder air-fuel ratio to an air-fuel ratio (lean air-fuel ratio) larger than the stoichiometric air-fuel ratio when the determined air-fuel ratio request is the lean request.

Note that the cylinder-by-cylinder air-fuel ratio control section controls, based on a proportional-integral-derivative (PID) control, a proportional-integral (PI) control, or the like, the cylinder-by-cylinder air-fuel ratios of a plurality of the cylinders, in such a manner that an error (difference) between the output value of the downstream air-fuel ratio sensor and a predetermined target downstream value becomes zero. In this case as well, it can be said that the cylinder-by-cylinder air-fuel ratio control section, based on the output value of the downstream air-fuel ratio sensor, automatically and substantially determines which the air-fuel ratio request is occurring, "the rich request or the lean request", and controls the cylinder-by-cylinder air-fuel ratios of a plurality of the cylinders in accordance with the air-fuel request.

In addition, the cylinder-by-cylinder air-fuel ratio control section includes a fluctuation period correlated value obtaining section, and a gas reaching strength determining section.

The fluctuation period correlated value obtaining section repeatedly performs an operation to select, as a selected cylinder, one of a plurality of the cylinders; to change each of the cylinder-by-cylinder air-fuel ratios of a plurality of the cylinders in such a manner that a "cylinder-by-cylinder air-fuel ratio of the selected cylinder" becomes different from "cylinder-by-cylinder air-fuel ratios of the remaining cylinders among the plurality of the cylinders (i.e., non-selected cylinders)"; and to obtain, as a "fluctuation period correlated value with respect to the selected cylinder", a "value correlated with a fluctuation period of the output value of the downstream air-fuel ratio sensor"; until a point in time at which each of all of the cylinders (every cylinder) is selected as the selected cylinder.

For example, in a case in which an air-fuel ratio of a mixture supplied to a cylinder (hereinafter, also referred to as a "gas strongly reaching cylinder", a "cylinder having a high gas-reaching-strength", or a "gas excellently reaching cylinder") discharging an exhaust gas which reaches the downstream air-fuel ratio sensor relatively strongly, as compared to exhaust gases discharged from the other cylinders, is set to (at) an air-fuel ratio smaller (richer) than an air-fuel ratio of each of mixtures supplied to the other cylinders in a period in which the rich request is occurring, and when unburnt substances included in the exhaust gas discharged from the gas strongly reaching cylinder flow out from the catalyst without being purified by the catalyst, the output value of the downstream air-fuel ratio sensor changes to a value corresponding to an air-fuel ratio richer than the stoichiometric air-fuel ratio even if an amount of the unburnt substances is relatively small. As a result, the fluctuation period of the output value of the downstream air-fuel ratio sensor (period correlated with an inversion period which will be described later) becomes shorter (refer to a curve line C4 shown in FIG. 6).

In contrast, in a case in which an air-fuel ratio of a mixture supplied to a cylinder (hereinafter, also referred to as a "gas weakly reaching cylinder", a "cylinder having a low gas-reaching-strength", or a "gas poorly reaching cylinder") discharging an exhaust gas which reaches the downstream air-fuel ratio sensor relatively weakly, as compared to exhaust gases discharged from the other cylinders, is set to (at) an air-fuel ratio smaller (richer) than an air-fuel ratio of each of mixtures supplied to the other cylinders in a period in which the rich request is occurring, and when unburnt substances included in the exhaust gas discharged from the gas weakly reaching cylinder flow out from the catalyst without being purified by the catalyst, the output value of the downstream air-fuel ratio sensor does not change to a value corresponding to an air-fuel ratio richer than the stoichiometric air-fuel ratios unless an amount of the unburnt substances becomes relatively large. As a result, the fluctuation period of the output value of the downstream air-fuel ratio sensor (period correlated with the inversion period which will be described later) becomes longer (refer to a curve line C1 shown in FIG. 6).

Similarly, in a case in which the air-fuel ratio of the mixture supplied to the gas strongly reaching cylinder is set to (at) an air-fuel ratio larger (leaner) than the air-fuel ratio of each of the mixtures supplied to the other cylinders in a period in which the lean request is occurring, and when oxygen included in the exhaust gas discharged from the gas strongly reaching cylinder flows out from the catalyst without being stored in the catalyst, the output value of the downstream air-fuel ratio sensor changes to a value corresponding to an air-fuel ratio leaner than the stoichiometric air-fuel ratio even if an amount of the oxygen is relatively small. As a result, the fluctuation period of the output value of the downstream air-fuel ratio sensor (period correlated with the inversion period which will be described later) becomes shorter.

In contrast, in a case in which the air-fuel ratio of the mixture supplied to the gas weakly reaching cylinder is set to (at) an air-fuel ratio larger (leaner) than an air-fuel ratio of each of the mixtures supplied to the other cylinders in a period in which the lean request is occurring, and when oxygen included in the exhaust gas discharged from the gas weakly reaching cylinder flows out from the catalyst without being purified by the catalyst, the output value of the downstream air-fuel ratio sensor does not change to a value corresponding to an air-fuel ratio leaner than the stoichiometric air-fuel ratio unless an amount of the oxygen becomes relatively large. As a result, the fluctuation period of the output value of the downstream air-fuel ratio sensor (period correlated with the inversion period which will be described later) becomes longer.

As understood from the above, the obtained fluctuation period correlated value varies depending on the sensitivity of the downstream air-fuel ratio sensor with respect to the air-fuel ratio of the exhaust gas discharged from the selected cylinder (i.e., depending on the "gas-reaching-strength to the downstream air-fuel ratio sensor" of the exhaust gas discharged from each of the cylinders, and an influence/impact degree of the air-fuel ratio of the exhaust gas from each of the cylinders on the output value of the downstream air-fuel ratio sensor).

In view of the above, the gas reaching strength determining section determines, based on the "obtained fluctuation period correlated value" corresponding to (with respect to) each of a plurality of the cylinders, the influence/impact degree of the air-fuel ratio of the exhaust gas discharged from each of a plurality of the cylinders on the output value of the downstream air-fuel ratio sensor.

In this manner, according to the first invention apparatus, the influence/impact degree of the exhaust gas from each of the cylinders on the output value of the downstream air-fuel ratio sensor can be obtained. Therefore, since the cylinder-by-cylinder air-fuel ratio can be controlled utilizing the influence/impact degree of the exhaust gas from each of the cylinders on the output value of the downstream air-fuel ratio sensor, the air-fuel ratio control apparatus which can improve the emission can be provided.

In the first invention apparatus, the gas reaching strength determining section may include a cylinder-by-cylinder influence degree indicating value obtaining section which obtains, for each of a plurality of the cylinders, based on the "obtained fluctuation period correlated value" corresponding to each of a plurality of the cylinders, the "influence/impact degree on the output value of the downstream air-fuel ratio sensor (that is, "cylinder-by-cylinder influence degree indicating value" of the "exhaust gas discharged from each of a plurality of the cylinders."

Further, the cylinder-by-cylinder air-fuel ratio control section may include a cylinder-by-cylinder air-fuel ratio correction section which corrects each of the cylinder-by-cylinder air-fuel ratios of a plurality of the cylinders, in such a manner that, in a period in which the rich request is occurring, a cylinder-by-cylinder air-fuel ratio of a cylinder whose "influence/impact degree on the output value of the downstream air-fuel ratio sensor indicated by the cylinder-by-cylinder influence degree indicating value" is a "first value" becomes smaller than a cylinder-by-cylinder air-fuel ratio of a cylinder whose "influence/impact degree on the output value of the downstream air-fuel ratio sensor indicated by the cylinder-by-cylinder influence degree indicating value" is a "second value smaller than the first value." The correction of the cylinder-by-cylinder air-fuel ratio by the cylinder-by-cylinder air-fuel ratio correction section may also be referred to as a feedback period shortening control.

According to the configuration described above, in the period in which the rich request is occurring, an "air-fuel ratio of the gas relatively strongly reaching cylinder" is set to an "air-fuel ratio richer (smaller)" than an "air-fuel ratio of the gas relatively weakly reaching cylinder." Accordingly, the output value of the downstream air-fuel ratio sensor changes in a shorter time (earlier) to a value corresponding to an air-fuel ratio richer than the stoichiometric air-fuel ratio. This enables to promptly determine that the lean request has occurred in a case in which a time duration for the exhaust gas to flow from the combustion chamber to the downstream air-fuel ratio sensor (transportation delay time of the exhaust gas) is long, in a case in which it is necessary to promptly determine that the lean request has occurred since a flow rate of the exhaust gas is relatively high (in other words, in a case in which a response delay time of the downstream air-fuel ratio sensor itself with respect to a change in the air-fuel ratio can not be ignored in terms of the air-fuel ratio control), and the like. Consequently, it is possible to appropriately control the air-fuel ratio of the catalyst inflow gas in such a manner that a large amount of the unburnt substances do not flow into the catalyst. Accordingly, the emission can be improved.

In the first invention apparatus, when the gas reaching strength determining section includes the cylinder-by-cylinder influence degree indicating value obtaining section, the cylinder-by-cylinder air-fuel ratio control section may include a cylinder-by-cylinder air-fuel ratio correction section which corrects each of the cylinder-by-cylinder air-fuel ratios of a plurality of the cylinders, in such a manner that, in a period in which the lean request is occurring, a cylinder-by-cylinder air-fuel ratio of a cylinder whose "influence/impact degree on the output value of the downstream air-fuel ratio sensor indicated by the cylinder-by-cylinder influence degree indicating value" is a "first value" becomes larger than a cylinder-by-cylinder air-fuel ratio of a cylinder whose "influence/impact degree on the output value of the downstream air-fuel ratio sensor indicated by the cylinder-by-cylinder influence degree indicating value" is a "second value smaller than the first value." The correction of the cylinder-by-cylinder air-fuel ratio by the cylinder-by-cylinder air-fuel ratio correction section may also be referred to as the feedback period shortening control.

According to the configuration described above, in the period in which the lean request is occurring, an "air-fuel ratio of the gas relatively strongly reaching cylinder" is set to an "air-fuel ratio leaner (larger)" than an "air-fuel ratio of the gas relatively weakly reaching cylinder." Accordingly, the output value of the downstream air-fuel ratio sensor changes in a shorter time (earlier) to a value corresponding to an air-fuel ratio leaner than the stoichiometric air-fuel ratio. This enables to promptly determine that the rich request has occurred in a case in which the transportation delay time of the exhaust gas is long, in a case in which the response delay time of the downstream air-fuel ratio sensor itself with respect to a change in the air-fuel ratio can not be ignored in terms of the air-fuel ratio control, and the like. Consequently, it is possible to appropriately control the air-fuel ratio of the catalyst inflow gas in such a manner that a large amount of the NOx does not flow into the catalyst. Accordingly, the emission can be improved.

Further, in the first invention apparatus, the gas reaching strength determining section may include a gas most excellently reaching cylinder identifying section which identifies, as a "gas most excellently reaching cylinder", based on the fluctuation period correlated value obtained for each of a plurality of the cylinders, a "cylinder discharging an exhaust gas which has a greatest impact/influence on the output value of the downstream air-fuel ratio sensor" among a plurality of the cylinders.

In this case, the cylinder-by-cylinder air-fuel ratio control section may include a cylinder-by-cylinder air-fuel ratio correction section which performs a control (feedback period shortening control) to correct each of the cylinder-by-cylinder air-fuel ratios of a plurality of the cylinders, in such a manner that, in a period in which the rich request is occurring, a "cylinder-by-cylinder air-fuel ratio of the identified gas most excellently reaching cylinder" becomes smaller than a "cylinder-by-cylinder air-fuel ratio of a cylinder other than the gas most excellently reaching cylinder among a plurality of the cylinders."

According to the configuration described above, in the period in which the rich request is occurring, the "cylinder-by-cylinder air-fuel ratio of the gas most excellently reaching cylinder" is set to an air-fuel ratio smaller (richer) than the "cylinder-by-cylinder air-fuel ratio of the cylinder other than the gas most excellently reaching cylinder." Accordingly, the output value of the downstream air-fuel ratio sensor changes in a shorter time (earlier) to a value corresponding to an air-fuel ratio richer than the stoichiometric air-fuel ratio. This enables to promptly determine that the lean request has occurred. Consequently, it is possible to appropriately control the air-fuel ratio of the catalyst inflow gas in such a manner that a large amount of the unburnt substances do not flow into the catalyst. Accordingly, the first invention apparatus can improve the emission.

In the first invention apparatus, when the gas reaching strength determining section includes the gas most excellently reaching cylinder identifying section, the cylinder-by-cylinder air-fuel ratio control section may include a cylinder-by-cylinder air-fuel ratio correction section which performs a control (feedback period shortening control) to correct each of the cylinder-by-cylinder air-fuel ratios of a plurality of the cylinders, in such a manner that, in a period in which the lean request is occurring, a "cylinder-by-cylinder air-fuel ratio of the identified gas most excellently reaching cylinder" becomes larger than a "cylinder-by-cylinder air-fuel ratio of a cylinder other than the gas most excellently reaching cylinder among a plurality of the cylinders."

According to the configuration described above, in the period in which the lean request is occurring, the "cylinder-by-cylinder air-fuel ratio of the gas most excellently reaching cylinder" is set to an air-fuel ratio larger (leaner) than the "cylinder-by-cylinder air-fuel ratio of the cylinder other than the gas most excellently reaching cylinder." Accordingly, the output value of the downstream air-fuel ratio sensor changes in a shorter time (earlier) to a value corresponding to an air-fuel ratio leaner than the stoichiometric air-fuel ratio. This enables to promptly determine that the rich request has occurred. Consequently, it is possible to appropriately control the air-fuel ratio of the catalyst inflow gas in such a manner that a large amount of NOx does not flow into the catalyst. Accordingly, the first invention apparatus can improve the emission.

The above described cylinder-by-cylinder air-fuel ratio correction section may be configured so as to perform the feedback period shortening control at least either one of cases, a case in which an intake air amount of the engine is equal to or larger than a first intake air amount threshold, and a case in which the intake air amount of the engine is equal to or smaller than a second intake air amount threshold smaller than the first intake air amount threshold.

According to the configuration described above, the feedback period shortening control is carried out, in a case in which it is necessary to promptly determine that the lean request has occurred since a flow rate of the exhaust gas is high (in other words, in a case in which the response delay time of the downstream air-fuel ratio sensor itself with respect to a change in the air-fuel ratio can not be ignored in terms of the air-fuel ratio control), and/or in a case a time duration for the exhaust gas to flow from the combustion chamber to the downstream air-fuel ratio sensor (transportation delay time of the exhaust gas) is long when the flow rate of the exhaust gas is extremely small. Accordingly, it can be avoided that an excessively large amount of "oxygen and/or unburnt substances" flow into the catalyst. Consequently, the emission can be improved.

Meanwhile, when the engine is in a predetermined operating condition (e.g., deceleration operation), a so-called "fuel cut operation" is carried out. That is, the cylinder-by-cylinder mixture supplying section may include a fuel cut section which performs the fuel cut operation to stop supplying the mixtures to all of the combustion chambers of a plurality of the cylinders, when a predetermined fuel cut start condition becomes satisfied, and which ends/terminates the fuel cut operation so as to resume supplying the mixtures to all of the combustion chambers of a plurality of the cylinders when a predetermined fuel cut termination condition becomes satisfied while the fuel cut operation is being performed.

In this case, the gas reaching strength determining section may include the above described cylinder-by-cylinder influence degree indicating value obtaining section.

Further, the cylinder-by-cylinder air-fuel ratio control section may include a cylinder-by-cylinder air-fuel ratio correction section configured so as to:
(1) determine, based on the output value of the downstream air-fuel ratio sensor, whether or not the unburnt substances start to flow out downstream of the three-way catalyst after a point in time of an end (termination) of the fuel cut operation; and
(2) perform a post fuel cut control to correct the cylinder-by-cylinder air-fuel ratios in a period (that is, post fuel cut period) from the "point in time of the end of the fuel cut operation" to a "point in time at which it is determined that the unburnt substances start to flow out downstream of the three-way catalyst", in such a manner that a cylinder-by-cylinder air-fuel ratio of a cylinder whose "influence/impact degree on the output value of the downstream air-fuel ratio sensor indicated by the cylinder-by-cylinder influence degree indicating value" is a "first value" becomes larger than a cylinder-by-cylinder air-fuel ratio of a cylinder whose "influence/impact degree on the output value of the downstream air-fuel ratio sensor indicated by the cylinder-by-cylinder influence degree indicating value" is a "second value smaller than the first value", but becomes smaller than the stoichiometric air-fuel ratio.

Since a large amount of oxygen flows into the catalyst during the fuel cut operation, the oxygen storage amount of the catalyst reaches a maximum oxygen storage amount. Accordingly, the air-fuel request during the post fuel cut period is the rich request, and thus, an exhaust gas whose air-fuel ratio is the rich air-fuel ratio is supplied to the catalyst. Therefore, when a predetermined time has elapsed after the point in time of the end of the fuel cut operation, the unburnt substances start to flow out downstream of the catalyst, and the air-fuel ratio request thus changes to the lean request.

At this point in time (point in time at which the unburnt substances start to flow out downstream of the catalyst), the oxygen storage materials supported by the catalyst have sufficiently released oxygen so as to be in a reduction condition, however, the "noble (precious) metals serving as catalytic materials (especially, rhodium etc.)" have not sufficiently become in a reduction condition. That is, the noble metals are still in the oxidized state, and a "greater amount of the unburnt substances (reducing agents)" are necessary in order for the noble metals to get out of this oxidized state than an amount of the unburnt substances required to release the "oxygen stored during the fuel cut operation" from the oxygen storage materials.

In view of the above, during the post fuel cut period, the cylinder-by-cylinder air-fuel ratio correction section sets the air-fuel ratio of the "cylinder (gas relatively strongly reaching cylinder) whose influence/impact degree on the output value of the downstream air-fuel ratio sensor is the first value" to the air-fuel ratio larger (but smaller than the stoichiometric air-fuel ratio) than the air-fuel ratio of the "cylinder (gas relatively weakly reaching cylinder) whose influence/impact degree on the output value of the downstream air-fuel ratio sensor is the second value smaller than the first value."

According to the configuration above, a point in time is delayed, as compared to the conventional apparatus, at which the output value of the downstream air-fuel ratio sensor changes to a value corresponding to an air-fuel ratio richer than the stoichiometric air-fuel ratio (i.e., the point in time at which it is determined that the unburnt substances start to flow out downstream of the three-way catalyst). Accordingly, a sufficiently large amount of the unburnt substances that are necessary to reduce the noble metals of the catalyst can be flowed into the catalyst in the post fuel cut period. Consequently, it can be avoided that the purifying capacity of the catalyst lowers due to the state in which the noble metals are not reduced after the fuel cut operation.

According to a similar reason, when the cylinder-by-cylinder mixture supplying section includes the fuel cut section, and when the gas reaching strength determining section includes the gas most excellently reaching cylinder identifying section, the cylinder-by-cylinder air-fuel ratio control section may preferably include a cylinder-by-cylinder air-fuel ratio correction section configured so as to:
(1) determine, based on the output value of the downstream air-fuel ratio sensor, whether or not the unburnt substances start to flow out downstream of the three-way catalyst after a point in time of an end (termination) of the fuel cut operation; and
(2) perform a post fuel cut control to correct the cylinder-by-cylinder air-fuel ratios in a post fuel cut period from the point in time of the end of the fuel cut operation to the point in time at which it is determined that the unburnt substances start to flow out downstream of the three-way catalyst, in such a manner that a "cylinder-by-cylinder air-fuel ratio of the identified gas most excellently reaching cylinder" becomes larger than a cylinder-by-cylinder air-fuel ratio of a cylinder other than the gas most excellently reaching cylinder", but smaller than the stoichiometric air-fuel ratio.

According to the configuration described above, the air-fuel ratio of the identified gas most excellently reaching cylinder is made closer to the stoichiometric air-fuel ratio, and thus, the point in time of the end of the post fuel cut period (that is, a point in time at which it is determined that the unburnt substances has started to flow out downstream of the three-way catalyst) can be delayed. Accordingly, a sufficiently large amount of the unburnt substances that are necessary to reduce the noble metals of the catalyst can be flowed into the catalyst in the post fuel cut period. Consequently, it can be avoided that the purifying capacity of the catalyst lowers due to the state in which the noble metals are not reduced after the fuel cut operation.

Further, when the cylinder-by-cylinder mixture supplying section includes the fuel cut section, it is preferable that the cylinder-by-cylinder air-fuel ratio correction section be configured so as to correct the cylinder-by-cylinder air-fuel ratio in such a manner that a "mean (average) value of the cylinder-by-cylinder air-fuel ratios of a plurality of the cylinders during the post fuel cut period" become smaller (richer) than a "mean (average) value of the cylinder-by-cylinder air-fuel ratios of a plurality of the cylinders during a period in which the rich request is occurring after the post fuel cut period."

According to the configuration above, an adequate amount of unburnt substances can be supplied to the catalyst after the post fuel cut period, and the catalyst can be shifted to a normal condition in a short time after the post fuel cut period.

Further, in the first invention apparatus, when the gas reaching strength determining section includes the cylinder-by-cylinder influence degree indicating value obtaining section, the cylinder-by-cylinder air-fuel ratio control section may include:

a maximum oxygen storage amount obtaining section which obtains a maximum oxygen storage amount of the three-way catalyst; and a cylinder-by-cylinder air-fuel ratio correction section which performs a control hunting preventing control to correct each of the cylinder-by-cylinder air-fuel ratios of a plurality of the cylinders in such a manner that, in a period in which the rich request is occurring, a cylinder-by-cylinder air-fuel ratio of a cylinder whose "influence/impact degree on the output value of the downstream air-fuel ratio sensor indicated by the cylinder-by-cylinder influence degree indicating value" is a "first value" becomes, (1) larger than a cylinder-by-cylinder air-fuel ratio of a cylinder whose "influence/impact degree on the output value of the downstream air-fuel ratio sensor indicated by the cylinder-by-cylinder influence degree indicating value" is a "second value smaller than the first value",
(2) smaller than the stoichiometric air-fuel ratio, and
(3) closer to the stoichiometric air-fuel ratio as the obtained maximum oxygen storage amount becomes smaller.

According to the configuration above, in the period in which the rich request is occurring, an "air-fuel ratio of the gas relatively strongly reaching cylinder" is set to an "air-fuel ratio leaner (larger)" than an "air-fuel ratio of the gas relatively weakly reaching cylinder." Furthermore, the "air-fuel ratio of the gas relatively strongly reaching cylinder" is richer (smaller) than the stoichiometric air-fuel ratio, and comes closer to the stoichiometric air-fuel ratio as the maximum oxygen storage amount of the catalyst becomes smaller.

When the maximum oxygen storage amount of the catalyst becomes smaller, the above described fluctuation period of the output value of the downstream air-fuel ratio sensor (in other words, feedback cycle of the air-fuel ratio) becomes shorter, and in some cases, the air-fuel ratio of the engine (cylinder-by-cylinder air-fuel ratios that are the same as each other) greatly fluctuates (show hunting) so that the emission becomes worse. In contrast, when the air-fuel ratio of the gas relatively strongly reaching cylinder is set as described above in the period in which the rich request is occurring, a point in time at which the output value of the downstream air-fuel ratio sensor changes to a value corresponding to an air-fuel ratio richer than the stoichiometric air-fuel ratio is delayed. Accordingly, the fluctuation period of the output value of the downstream air-fuel ratio sensor (in other words, the feedback cycle of the air-fuel ratio) can be lengthened. Consequently, it can be avoided that the emission becomes worse when the maximum oxygen storage amount becomes small.

Further, in the first invention apparatus, when the gas reaching strength determining section includes the cylinder-by-cylinder influence degree indicating value obtaining section, the cylinder-by-cylinder air-fuel ratio control section may include:

a maximum oxygen storage amount obtaining section which obtains a maximum oxygen storage amount of the three-way catalyst; and a cylinder-by-cylinder air-fuel ratio correction section which performs a control hunting preventing control to correct each of the cylinder-by-cylinder air-fuel ratios of a plurality of the cylinders in such a manner that, in a period in which the lean request is occurring, a cylinder-by-cylinder air-fuel ratio of a cylinder whose "influence/impact degree on the output value of the downstream air-fuel ratio sensor indicated by the cylinder-by-cylinder influence degree indicating value" is a "first value" becomes, (1) smaller than a cylinder-by-cylinder air-fuel ratio of a cylinder whose "influence/impact degree on the output value of the downstream air-fuel ratio sensor indicated by the cylinder-by-cylinder influence degree indicating value" is a "second value smaller than the first value",
(2) larger than the stoichiometric air-fuel ratio, and
(3) closer to the stoichiometric air-fuel ratio as the obtained maximum oxygen storage amount becomes smaller.

According to the configuration above, in the period in which the lean request is occurring, an "air-fuel ratio of the gas relatively strongly reaching cylinder" is set to an "air-fuel ratio richer (smaller)" than an "air-fuel ratio of the gas relatively weakly reaching cylinder." Furthermore, the "air-fuel ratio of the gas relatively strongly reaching cylinder" is leaner (larger) than the stoichiometric air-fuel ratio, and comes closer to the stoichiometric air-fuel ratio as the maximum oxygen storage amount of the catalyst becomes smaller.

As described above, when the maximum oxygen storage amount of the catalyst becomes smaller, there may be a case in which the cylinder-by-cylinder air-fuel ratios greatly fluctuates (show hunting) so that the emission becomes worse. In contrast, when the air-fuel ratio of the gas relatively strongly reaching cylinder is set as described above in the period in which the lean request is occurring, a point in time at which the output value of the downstream air-fuel ratio sensor changes to a value corresponding to an air-fuel ratio leaner than the stoichiometric air-fuel ratio is delayed. Accordingly, the fluctuation period of the output value of the downstream air-fuel ratio sensor (in other words, the feedback cycle of the air-fuel ratio) can be lengthened. Consequently, it can be avoided that the emission becomes worse when the maximum oxygen storage amount becomes small.

Further, in the first invention apparatus, when the gas reaching strength determining section includes the gas most excellently reaching cylinder identifying section, the cylinder-by-cylinder air-fuel ratio control section may include:

a maximum oxygen storage amount obtaining section which obtains a maximum oxygen storage amount of the three-way catalyst; and a cylinder-by-cylinder air-fuel ratio correction section which performs a control hunting preventing control to correct each of the cylinder-by-cylinder air-fuel ratios of a plurality of the cylinders in such a manner that, in a period in which the rich request is occurring, a cylinder-by-cylinder air-fuel ratio of the identified gas most excellently reaching cylinder becomes, (1) larger than a cylinder-by-cylinder air-fuel ratio of a "cylinder other than the gas most excellently reaching cylinder among a plurality of the cylinders",
(2) smaller than the stoichiometric air-fuel ratio, and
(3) closer to the stoichiometric air-fuel ratio as the obtained maximum oxygen storage amount becomes smaller.

According to the configuration above, in the period in which the rich request is occurring, the "air-fuel ratio of the gas most excellently reaching cylinder" is set to a "relatively leaner (larger) air-fuel ratio." Furthermore, the "air-fuel ratio of the gas most excellently reaching cylinder" is richer (smaller) than the stoichiometric air-fuel ratio, and comes closer to the stoichiometric air-fuel ratio as the maximum oxygen storage amount of the catalyst becomes smaller.

As described above, when the maximum oxygen storage amount of the catalyst becomes smaller, there may be a case in which the cylinder-by-cylinder air-fuel ratios greatly fluctuates (show hunting) so that the emission becomes worse. In contrast, when the air-fuel ratio of the gas most excellently reaching cylinder is set as described above in the period in which the rich request is occurring, a point in time at which the output value of the downstream air-fuel ratio sensor changes to a value corresponding to an air-fuel ratio richer than the stoichiometric air-fuel ratio is delayed. Accordingly, the fluctuation period of the output value of the downstream air-fuel ratio sensor (in other words, the feedback cycle of the air-fuel ratio) can be lengthened. Consequently, it can be avoided that the emission becomes worse when the maximum oxygen storage amount becomes small.

Further, in the first invention apparatus, when the gas reaching strength determining section includes the gas most excellently reaching cylinder identifying section, the cylinder-by-cylinder air-fuel ratio control section may include:

a maximum oxygen storage amount obtaining section which obtains a maximum oxygen storage amount of the three-way catalyst; and a cylinder-by-cylinder air-fuel ratio correction section which performs a control hunting preventing control to correct each of the cylinder-by-cylinder air-fuel ratios of a plurality of the cylinders in such a manner that, in a period in which the lean request is occurring, a cylinder-by-cylinder air-fuel ratio of the identified gas most excellently reaching cylinder becomes, (1) smaller than a cylinder-by-cylinder air-fuel ratio of a "cylinder other than the gas most excellently reaching cylinder among a plurality of the cylinders",
(2) larger than the stoichiometric air-fuel ratio, and
(3) closer to the stoichiometric air-fuel ratio as the obtained maximum oxygen storage amount becomes smaller.

According to the configuration above, in the period in which the lean request is occurring, the "air-fuel ratio of the gas most excellently reaching cylinder" is set to a "relatively richer (smaller) air-fuel ratio." Furthermore, the "air-fuel ratio of the gas most excellently reaching cylinder" is leaner (larger) than the stoichiometric air-fuel ratio, and comes closer to the stoichiometric air-fuel ratio as the maximum oxygen storage amount of the catalyst becomes smaller.

As described above, when the maximum oxygen storage amount of the catalyst becomes smaller, there may be a case in which the cylinder-by-cylinder air-fuel ratios greatly fluctuates (show hunting) so that the emission becomes worse. In contrast, when the air-fuel ratio of the gas most excellently reaching cylinder is set as described above in the period in which the lean request is occurring, a point in time at which the output value of the downstream air-fuel ratio sensor changes to a value corresponding to an air-fuel ratio leaner than the stoichiometric air-fuel ratio is delayed. Accordingly, the fluctuation period of the output value of the downstream air-fuel ratio sensor (in other words, the feedback cycle of the air-fuel ratio) can be lengthened. Consequently, it can be avoided that the emission becomes worse when the maximum oxygen storage amount becomes small.

Meanwhile, the fluctuation period correlated value obtaining section may be configured so as to obtain any one of the following parameters as a base parameter, and to obtain a value correlated with the obtained base parameter as the fluctuation period correlated value.

A trajectory/trace length of the output value of the downstream air-fuel ratio sensor.

An inversion period correlated with (corresponding to) a time duration from a point in time at which the output value of the downstream air-fuel ratio sensor changes to a value corresponding to an air-fuel ratio richer than the stoichiometric air-fuel ratio to a point in time at which the output value of the downstream air-fuel ratio sensor again changes to a value corresponding to the air-fuel ratio richer than the stoichiometric air-fuel ratio after it changes to a value corresponding to an air-fuel ratio leaner than the stoichiometric air-fuel ratio.

An amount of stored oxygen of the three-way catalyst which corresponds to a total amount of an excessive oxygen flowing into the three-way catalyst during a period from a point in time at which the output value of the downstream air-fuel ratio sensor changes to a value corresponding to an air-fuel ratio richer than the stoichiometric air-fuel ratio to a point in time at which it changes to a value corresponding to an air-fuel ratio leaner than the stoichiometric air-fuel ratio.

An amount of released oxygen of the three-way catalyst which corresponds to a total amount of an excessive unburnt substance flowing into the three-way catalyst during a period from a point in time at which the output value of the downstream air-fuel ratio sensor changes to a value corresponding to an air-fuel ratio leaner than the stoichiometric air-fuel ratio to a point in time at which it changes to a value corresponding to an air-fuel ratio richer than the stoichiometric air-fuel ratio.

A second aspect (hereinafter, simply referred to as a "second invention apparatus") of the air-fuel ratio control apparatus for an internal combustion engine according to the present invention also carries out the cylinder-by-cylinder air-fuel ratio control in consideration of the "influence/impact degree on the output value of the downstream air-fuel ratio sensor" of (by) the exhaust gas discharged from each of the cylinders, similarly to the first invention apparatus.

As described, the first invention apparatus comprises the fluctuation period correlated value obtaining section and the gas reaching strength determining section, so that it determines (judges) the influence/impact degree on the output value of the downstream air-fuel ratio sensor of (by) the exhaust gas discharged from each of the cylinders. However, the "influence/impact degree on the output value of the downstream air-fuel ratio sensor" of the exhaust gas discharged from each of the cylinders or of the air-fuel ratio of the exhaust gas can be obtained in advance based on experiments or the like, if, for example, the shape of the exhaust manifold, the position/disposition of the catalyst, the position/disposition of the downstream air-fuel ratio sensor, and the like are determined. In view of the above, the second invention apparatus controls the cylinder-by-cylinder air-fuel ratio based on the "influence/impact degree on the output value of the downstream air-fuel ratio sensor which the exhaust gas discharged from each of the cylinders has" that has been obtained in advance.

More specifically, the second invention apparatus comprises "a three-way catalyst, a downstream air-fuel ratio sensor, a cylinder-by-cylinder mixture supplying section, and a cylinder-by-cylinder air-fuel ratio control section", that the first invention apparatus similarly comprises, and is an air-fuel ratio control apparatus for an internal combustion engine in which reaching strengths of exhaust gases discharged from a plurality of the cylinders to the downstream air-fuel ratio sensor are not uniform among the cylinders, and thus, the influence/impact degrees on the output value of the downstream air-fuel ratio sensor of the exhaust gases discharged from a plurality of the cylinders are different from each other among a plurality of the cylinders, and wherein, the cylinder-by-cylinder air-fuel ratio control section includes a cylinder-by-cylinder air-fuel ratio correction section, which determines whether or not an operating condition of the engine satisfies a predetermined cylinder-by-cylinder air-fuel ratio control condition, and which corrects each of the cylinder-by-cylinder air-fuel ratios of a plurality of the cylinders when it is determined that the operating condition of the engine satisfies the predetermined cylinder-by-cylinder air-fuel ratio control condition in such a manner that a cylinder-by-cylinder air-fuel ratio of a "gas most excellently reaching cylinder" which is a "cylinder discharging an exhaust gas which has the greatest influence/impact on the output value of the downstream air-fuel ratio sensor among a plurality of the cylinders" becomes different from a cylinder-by-cylinder air-fuel ratio of a "cylinder other than the gas most excellently reaching cylinder among a plurality of the cylinders" (the cylinder-by-cylinder air-fuel ratio of the "gas most excellently reaching cylinder" is always different from the cylinder-by-cylinder air-fuel ratio of the "cylinder other than the gas most excellently reaching cylinder", in other words, when an air-fuel ratio feedback correction amount is commonly used for all of the cylinders, the cylinder-by-cylinder air-fuel ratio of the "gas most excellently reaching cylinder" and the cylinder-by-cylinder air-fuel ratio of the "cylinder other than the gas most excellently reaching cylinder" are different from each other with respect to the air-fuel ratio feedback correction amount).

According to the configuration above, the sensitivity of the downstream air-fuel ratio sensor with respect to the exhaust gas (the air-fuel ratio of the exhaust gas) discharged from each of the cylinder (that is, a "gas-reaching-strength to the downstream air-fuel ratio sensor" of the exhaust gas discharged from each of the cylinder, and the influence/impact degree of the exhaust gas from each of the cylinders on the output value of the downstream air-fuel ratio sensor) is positively utilized to realize the above described feedback period shortening control, the above described post fuel cut control (reduction of the noble metals of the catalyst after the fuel cut operation), the above described control hunting preventing control, and the like, for example. Consequently, the second invention apparatus can also improve the emission.

In the second invention apparatus, the cylinder-by-cylinder air-fuel ratio correction section is configured so as to determine that the cylinder-by-cylinder air-fuel ratio control condition is satisfied, at least in one of cases, a case in which an intake air amount of the engine is equal to or larger than a first intake air amount threshold, and a case in which the intake air amount of the engine is equal to or smaller than a second intake air amount threshold smaller than the first intake air amount threshold.

Further, the cylinder-by-cylinder air-fuel ratio correction section is configured so as to perform the feedback period shortening control to correct each of the cylinder-by-cylinder air-fuel ratios of a plurality of the cylinders, in such a manner that, in a period in which the rich request is occurring, the "cylinder-by-cylinder air-fuel ratio of the gas most excellently reaching cylinder" is (always) smaller than the "cylinder-by-cylinder air-fuel ratio of the cylinder other than the gas most excellently reaching cylinder among a plurality of the cylinders."

According to the configuration above, the output value of the downstream air-fuel ratio sensor having a high sensitivity with respect to the exhaust gas from the gas most excellently reaching cylinder promptly changes to a value corresponding to an air-fuel ratio richer than the stoichiometric air-fuel ratio. Accordingly, it is possible to promptly determine that the lean request has occurred, in a case in which it is necessary to promptly determine that the lean request has occurred since a flow rate of the exhaust gas is relatively high (in other words, in a case in which a response delay time of the downstream air-fuel ratio sensor itself with respect to a change in the air-fuel ratio can not be ignored in terms of the air-fuel ratio control), and/or in a case in which a transportation delay time of the exhaust gas is large since the flow rate of the exhaust gas is extremely small. Consequently, it is possible to appropriately control the air-fuel ratio of the catalyst inflow gas in such a manner that a large amount of the unburnt substances do not flow into the catalyst. Accordingly, the emission can be improved.

Alternatively, in the second invention apparatus, the cylinder-by-cylinder air-fuel ratio correction section is configured so as to determine that the cylinder-by-cylinder air-fuel ratio control condition is satisfied, at least in one of cases, a case in which an intake air amount of the engine is equal to or larger than a first intake air amount threshold, and a case in which the intake air amount of the engine is equal to or smaller than a second intake air amount threshold smaller than the first intake air amount threshold, and so as to perform a feedback period shortening control to correct each of the cylinder-by-cylinder air-fuel ratios of a plurality of the cylinders, in such a manner that, in a period in which the lean request is occurring, the "cylinder-by-cylinder air-fuel ratio of the gas most excellently reaching cylinder" is (always) larger than the cylinder-by-cylinder air-fuel ratio of the "cylinder other than the gas most excellently reaching cylinder among a plurality of the cylinders."

According to the configuration above, the output value of the downstream air-fuel ratio sensor having a high sensitivity with respect to the exhaust gas from the gas most excellently reaching cylinder promptly changes to a value corresponding to an air-fuel ratio leaner than the stoichiometric air-fuel ratio. Accordingly, it is possible to promptly determine that the rich request has occurred, in a case in which it is necessary to promptly determine that the rich request has occurred since a flow rate of the exhaust gas is relatively high (in other words, in a case in which a response delay time of the downstream air-fuel ratio sensor itself with respect to a change in the air-fuel ratio can not be ignored in terms of the air-fuel ratio control), and/or in a case in which a transportation delay time of the exhaust gas is large since the flow rate of the exhaust gas is extremely small. Consequently, it is possible to appropriately control the air-fuel ratio of the catalyst inflow gas in such a manner that a large amount of the NOx does not flow into the catalyst. Accordingly, the emission can be improved.

Further, in the second invention apparatus, when the cylinder-by-cylinder mixture supplying section includes the fuel cut section, the cylinder-by-cylinder air-fuel ratio control section is configured:

so as to determine, based on the output value of the downstream air-fuel ratio sensor, whether or not the unburnt substances start to flow out downstream of the three-way catalyst after a point in time of an end (termination) of the fuel cut operation;

so as to determine that the cylinder-by-cylinder air-fuel ratio control condition is satisfied during a "post fuel cut period" from a point in time of the end of the fuel cut operation to a point in time at which it is determined that the unburnt substances start to flow out downstream of the three-way catalyst; and so as to perform a post fuel cut control to correct each of the cylinder-by-cylinder air-fuel ratios of a plurality of the cylinders in the post fuel cut period, in such a manner that a "cylinder-by-cylinder air-fuel ratio of the gas most excellently reaching cylinder" is (always) larger than a "cylinder-by-cylinder air-fuel ratio of the cylinder other than the gas most excellently reaching cylinder", but is smaller than the stoichiometric air-fuel ratio.

According to the configuration described above, the air-fuel ratio of the gas most excellently reaching cylinder is made closer to the stoichiometric air-fuel ratio after the end of the fuel cut, and thus, the point in time of the end of the post fuel cut period (that is, a point in time at which it is determined that the unburnt substances has started to flow out downstream of the three-way catalyst) can be delayed. Accordingly, a sufficiently large amount of the unburnt substances that are necessary to reduce the noble metals of the catalyst can be flowed into the catalyst in the post fuel cut period. Consequently, it can be avoided that the purifying capacity of the catalyst lowers due to the state in which the noble metals are not reduced after the fuel cut operation.

Further, in the second invention apparatus, the cylinder-by-cylinder air-fuel ratio correction section is configured:

so as to obtain a maximum oxygen storage amount of the catalyst, determine whether or not the obtained maximum oxygen is smaller than a predetermined maximum oxygen storage amount threshold, and determine that the cylinder-by-cylinder air-fuel ratio control condition is satisfied when it determines that the obtained maximum oxygen is smaller than the predetermined maximum oxygen storage amount threshold; and so as to perform a control hunting preventing control to correct each of the cylinder-by-cylinder air-fuel ratios of a plurality of the cylinders in such a manner that, in a period in which the rich request is occurring, a cylinder-by-cylinder air-fuel ratio of the gas most excellently reaching cylinder always becomes larger than a cylinder-by-cylinder air-fuel ratio of a "cylinder other than the gas most excellently reaching cylinder among a plurality of the cylinders", but is smaller than the stoichiometric air-fuel ratio.

According to the configuration above, in a case in which the maximum oxygen storage amount is smaller than the predetermined maximum oxygen storage amount threshold due to a deterioration of the catalyst, and in the period in which the rich request is occurring, the "air-fuel ratio of the gas most excellently reaching cylinder" is set to the "air-fuel ratio, which is leaner and is closer to the stoichiometric air-fuel ratio" than the "air-fuel ratio of the cylinder other than the gas most excellently reaching cylinder."

As described above, when the maximum oxygen storage amount of the catalyst becomes small, the fluctuation period of the output value of the downstream air-fuel ratio sensor (in other words, feedback cycle of the air-fuel ratio) becomes short, and in some cases, the cylinder-by-cylinder air-fuel ratios greatly fluctuate (show hunting). In contrast, according to the above configuration, a point in time at which the output value of the downstream air-fuel ratio sensor having a high sensitivity with respect to the exhaust gas discharged from the gas most excellently reaching cylinder changes to a "value corresponding to an air-fuel ratio richer than the stoichiometric air-fuel ratio" is delayed, and thus, the inversion period of the output value of the downstream air-fuel ratio sensor (in other words, the feedback cycle of the air-fuel ratio) can be lengthened. Consequently, it can be avoided that the emission becomes worse when the maximum oxygen storage amount becomes small.

Furthermore, in the second invention apparatus, the cylinder-by-cylinder air-fuel ratio correction section is configured:

so as to obtain a maximum oxygen storage amount of the catalyst, determine whether or not the obtained maximum oxygen is smaller than a predetermined maximum oxygen storage amount threshold, and determine that the cylinder-by-cylinder air-fuel ratio control condition is satisfied when it determines that the obtained maximum oxygen is smaller than the predetermined maximum oxygen storage amount threshold; and so as to perform a control hunting preventing control to correct each of the cylinder-by-cylinder air-fuel ratios of a plurality of the cylinders in such a manner that, in a period in which the lean request is occurring, a "cylinder-by-cylinder air-fuel ratio of the gas most excellently reaching cylinder" (always) becomes smaller than a "cylinder-by-cylinder air-fuel ratio of a cylinder other than the gas most excellently reaching cylinder among a plurality of the cylinders", but is larger than the stoichiometric air-fuel ratio.

According to the configuration above, in a case in which the maximum oxygen storage amount is smaller than the predetermined maximum oxygen storage amount threshold due to a deterioration of the catalyst, and in the period in which the lean request is occurring, the "air-fuel ratio of the gas most excellently reaching cylinder" is set to the "air-fuel ratio, which is richer and is closer to the stoichiometric air-fuel ratio" than the "air-fuel ratio of the cylinder other than the gas most excellently reaching cylinder."

As described above, when the maximum oxygen storage amount of the catalyst becomes small, the fluctuation period of the output value of the downstream air-fuel ratio sensor (in other words, feedback cycle of the air-fuel ratio) becomes short, and in some cases, the cylinder-by-cylinder air-fuel ratios greatly fluctuate (show hunting). In contrast, according to the above configuration, a point in time at which the output value of the downstream air-fuel ratio sensor having a high sensitivity with respect to the exhaust gas discharged from the gas most excellently reaching cylinder changes to a "value corresponding to an air-fuel ratio leaner than the stoichiometric air-fuel ratio" is delayed, and thus, the inversion period of the output value of the downstream air-fuel ratio sensor (in other words, the feedback cycle of the air-fuel ratio) can be lengthened. Consequently, it can be avoided that the emission becomes worse when the maximum oxygen storage amount becomes small.

Other objects, features, and advantages of the present invention will be readily understood from the following description of each of embodiments of the present invention with reference to the accompanying drawings.

DESCRIPTION OF EMBODIMENTS

An air-fuel ratio control apparatus for an internal combustion engine according to embodiments of the present invention will be described with reference to the drawings.

First Embodiment (Configuration)

Figure 2:
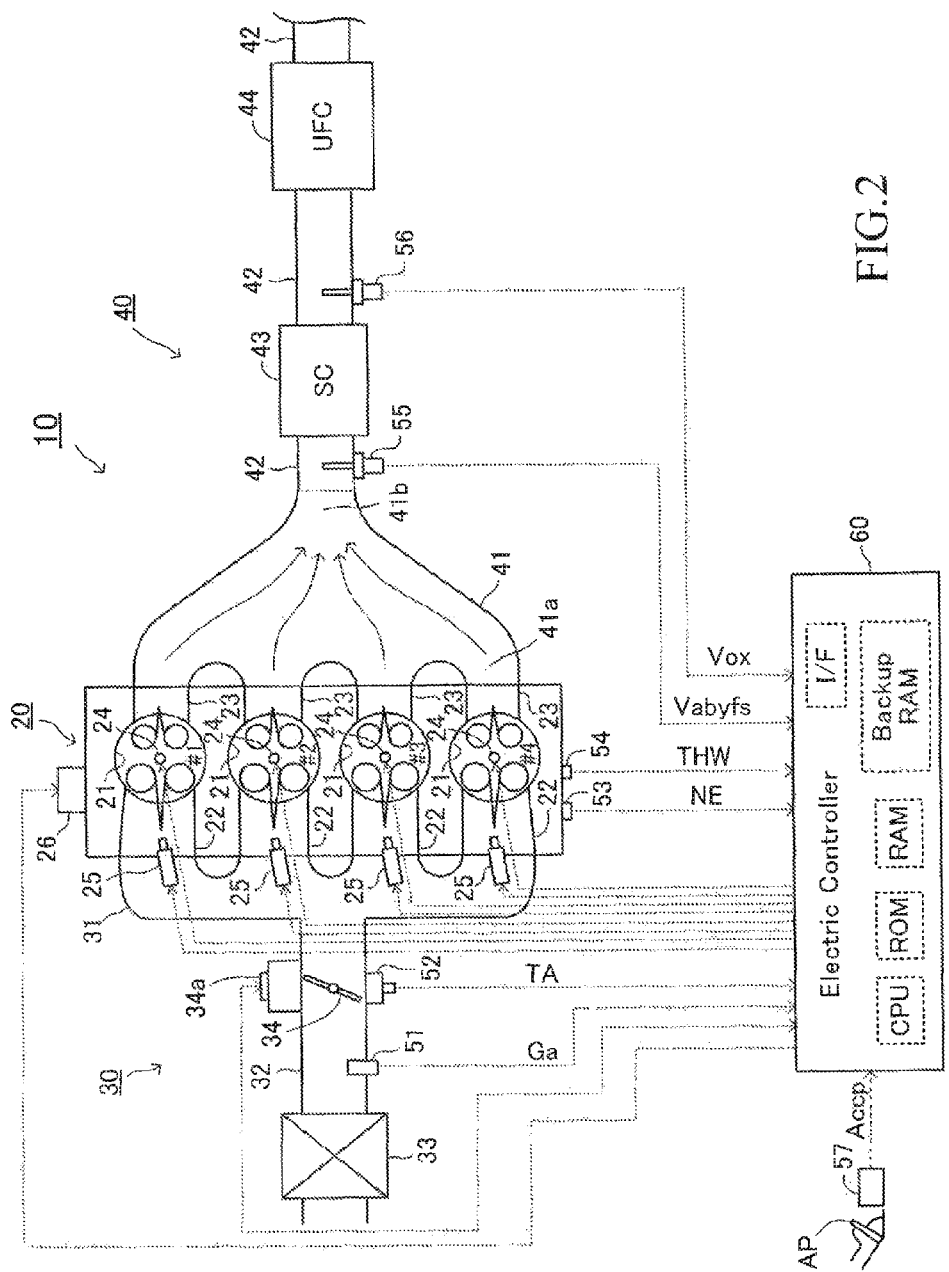
FIG. 2 is a schematic perspective view of the internal combustion engine to which the present control apparatus is applied.

FIG. 2 schematically shows a schematic configuration of an internal combustion engine 10 to which an air-fuel ratio control apparatus (hereinafter, also referred to as a "first control apparatus") according to a first embodiment of the present invention is applied. The engine 10 is a spark-ignition multi-cylinder (4-cylinder, in the present example) four-cycle gasoline engine 10. The engine 10 comprises a main body section 20, an intake system 30, and an exhaust system 40.

The main body section 20 includes a cylinder block section and a cylinder head section. The main body section 20 has a plurality of (four of) combustion chambers 21 (first cylinder #1 to fourth cylinder #4), each formed by a top surface of a piston, a wall of a cylinder, and a lower surface of the cylinder head section.

In the cylinder head section, intake ports 22, each of which is for supplying a "mixture formed of an air and a fuel" to each of the combustion chambers (each cylinder) 21, and exhaust ports 23, each of which is for discharging an exhaust gas (burnt gas) from each of the combustion chambers 21, are provided. Each intake port 22 is opened and closed by each intake valve which is unillustrated. Each exhaust port 23 is opened and closed by each exhaust valve which is unillustrated.

In the cylinder head section, a plurality of (four of) spark plugs 24 are fixed. Each of the spark plugs 24 is disposed in such a manner that its spark generation portion is exposed in a position in the vicinity of the lower surface of the cylinder head section at a central portion of each of the combustion chambers 21. The spark plug 24 is configured so as to generate a spark for ignition from the spark generation portion in response to a spark signal.

In the cylinder head section, a plurality of (four of) fuel injection valves (injectors) 25 are further fixed. Each of the fuel injection valves 25 is provided for each of the intake ports 22 (that is, one injector per one cylinder). The fuel injection valve 25 is configured so as to inject, in response to an injection instruction signal, a "fuel of an instructed injection amount included in the injection instruction signal" into a corresponding intake port 22.

Further, in the cylinder head section, an intake valve control device 26 is provided. The intake valve control device 26 comprises a well-known configuration to hydraulically adjust/control a relative rotation angle (phase angle) between an intake cam shaft (not shown) and an intake cam (not shown). The intake valve control device 26 operates in response to an instruction signal (drive signal), and is configured so as to change an opening timing of the intake valve (intake valve opening timing).

The intake system 30 comprises an intake manifold 31, an intake pipe 32, an air filter 33, a throttle valve 34, and a throttle valve actuator 34a.

The intake manifold 31 includes a plurality of branch portions connected with intake ports 22, and a surge tank portion into which the branch portions merges. The intake pipe 32 is connected to the surge tank portion. The intake manifold 31, the intake pipe 32, and a plurality of the intake ports 22 constitute an intake passage. The air-filter is provided at the end of the intake pipe 32. The throttle valve 34 is rotatably supported by the intake pipe 32 at a position between the air filter 33 and the intake manifold 31. The throttle valve 34 is adapted to change the opening cross sectional area of the intake passage formed by the intake pipe 32 when rotating. The throttle valve actuator 34a includes a DC motor, and is configured so as to rotate the throttle valve 34 in response to an instruction signal (drive signal).

The exhaust system 40 comprises an exhaust manifold 41, an exhaust pipe 42, an upstream catalyst 43, and a downstream catalyst 44.

The exhaust manifold 41 comprises a plurality of branch portions 41a, each of which is connected to each of a plurality of the exhaust ports 23, and an aggregated portion 41b (exhaust gas aggregated portion) 41b, into which those branch portions 41a aggregate. The exhaust pipe 42 is connected to the aggregated portion 41b of the exhaust manifold 41. The exhaust manifold 41, the exhaust pipe 42, and a plurality of the exhaust ports 23 constitute a passage through which the exhaust gas passes. It should be noted that, in the present specification, a passage formed by the aggregated portion 41b of the exhaust manifold 41 and the exhaust pipe 42 is referred to as an "exhaust passage", for convenience.

The upstream catalyst 43 is a three-way catalyst carrying, on the support formed of ceramic, "noble metals serving as catalytic substances (palladium Pd and platinum Pt, rhodium Rd, etc.)" and "ceria ($CeO_2$) serving as an oxygen occluding (storing) substance" so as to have an oxygen storage/release function (oxygen storage function). The upstream catalyst 43 is disposed in the exhaust pipe 42. When a temperature of the upstream catalyst 43 reaches a predetermined activating temperature, the upstream catalyst 43 exerts a "catalytic function to simultaneously purify unburned combustibles/substances (HC, CO, and $H_2$) and nitrogen oxides (NOx)" and the "oxygen storage function." The upstream catalyst 43 is also referred to as a start catalytic converter (SC) or a first catalyst.

The downstream catalyst 44 is a three-way catalyst similar to the upstream catalyst 43. The downstream catalyst 44 is disposed in the exhaust pipe at a position downstream of the upstream catalyst 43. The downstream catalyst 44 is arranged under a floor of a vehicle, and thus, is also referred to as an under floor catalytic converter (UFC) or a second catalyst. It should be noted that, in the present specification, a mere expression of "catalyst" means the upstream catalyst 43.

The first control apparatus includes a hot-wire air-flow meter 51, a throttle position sensor 52, an engine rotational speed sensor 53, a water temperature sensor 54, an upstream air-fuel ratio sensor 55, a downstream air-fuel ratio sensor 56, and an accelerator opening sensor 57.

The hot-wire air-flow meter 51 detects a mass flow rate of an intake air flowing in the intake pipe 32 so as to output an signal indicative of the mass flow rate (intake air amount of the engine per unit time) Ga.

The throttle position sensor 52 detects an opening of the throttle valve 34 so as to output a signal indicative of the throttle valve opening TA.

The engine rotational speed sensor 53 outputs a signal including a narrow pulse generated every time the intake cam shaft rotates 5° and a wide pulse generated every time the intake cam shaft rotates 360°. The signal output from the engine rotational speed sensor 53 is converted to an engine rotational speed NE by an electric controller 60, which will be described later. Further, the electric controller 60 is configured so as to obtain a crank angle (absolute crank angle) CA of the engine 10, based on signals from the engine rotational speed sensor 53 and an unillustrated crank angle sensor.

The water temperature sensor 54 detects a temperature of a cooling water of the internal combustion engine 10 so as to output a signal indicative of the cooling water temperature THW.

The upstream air-fuel ratio sensor 55 is disposed in "either one of the exhaust manifold 41 and the exhaust pipe 42" (that is, in the exhaust passage) and at a position between the aggregated portion 41b of the exhaust manifold 41 and the upstream catalyst 43. The upstream air-fuel ratio sensor 55 is a "limiting-current-type wide range air-fuel ratio sensor including a diffusion resistance layer" disclosed in, for example, Japanese Patent Application Laid-Open (kokai) Nos. H11-72473, 2000-65782, and 2004-69547.

Figure 3:
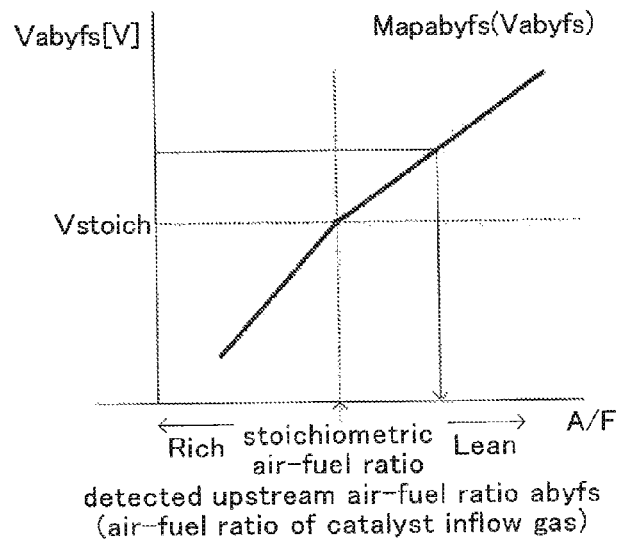
FIG. 3 is a graph showing a relationship between an output voltage of an upstream air-fuel ratio sensor shown in FIG. 2 and an air-fuel ratio.

As shown in FIG. 3, the upstream air-fuel ratio sensor 55 outputs an output value Vabyfs which corresponds to an air-fuel ratio of an exhaust gas flowing at the position at which the upstream air-fuel ratio sensor 55 is disposed (i.e., an air-fuel ratio of a "catalyst inflow gas" which is a gas flowing into the catalyst 43, or a detected upstream air-fuel ratio abyfs). The output value Vabyfs becomes larger as the air-fuel ratio of the catalyst inflow gas becomes larger (that is, as the air-fuel ratio of the catalyst inflow gas becomes leaner).

The electric controller 60 stores an "air-fuel ratio conversion table (map) Mapabyfs shown in FIG. 3. The electric controller 60 detects an actual upstream air-fuel ratio abyfs (obtains the detected upstream air-fuel ratio) by applying the output value Vabyfs to the air-fuel ratio conversion table Mapabyfs.

Figure 1:
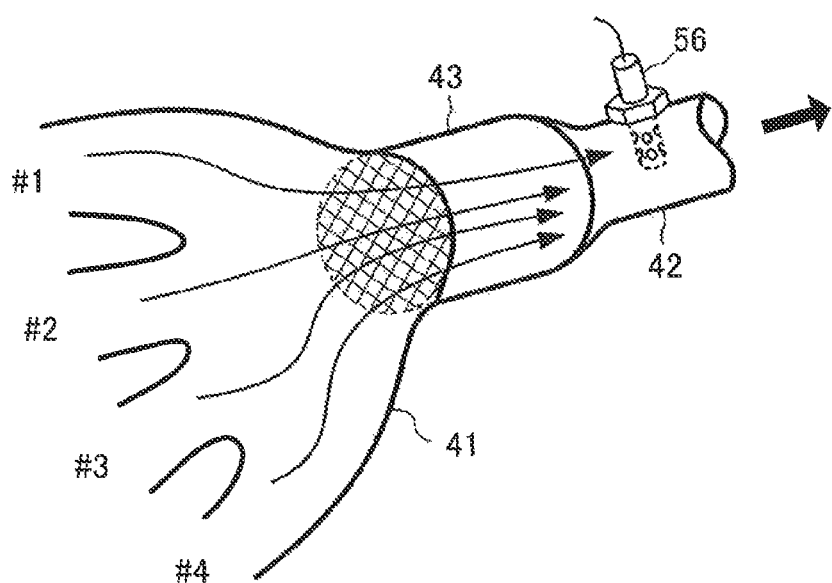
FIG. 1 is a schematic perspective view of an exhaust system of an internal combustion engine to which an air-fuel ratio control apparatus (present control apparatus) according to each of embodiments of the present invention is applied.

Referring back to FIG. 2, the downstream air-fuel ratio sensor 56 is disposed in the exhaust pipe 42 (that is, in the exhaust passage), and at a position between the upstream catalyst 43 and the downstream catalyst 44. As shown in FIG. 1, the downstream air-fuel ratio sensor 56 is provided in the vicinity of the upstream catalyst 43. The downstream air-fuel ratio sensor 56 is a well-known concentration-cell-type oxygen concentration sensor ($O_2$ sensor). The downstream air-fuel ratio sensor 56 is designed/configured to output an output value Voxs corresponding to an air-fuel ratio (downstream air-fuel ratio afdown) of a gas flowing at a position at which the downstream air-fuel ratio sensor 56 is disposed (i.e., a "catalyst outflow gas" which is a gas flowing out from the catalyst 43).

Figure 4:
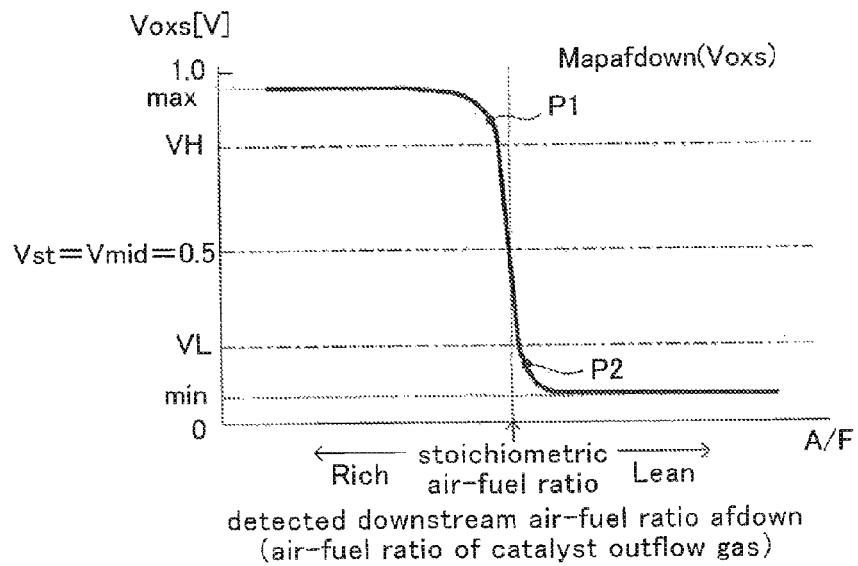
FIG. 4 is a graph showing a relationship between an output voltage of a downstream air-fuel ratio sensor shown in FIG. 2 and an air-fuel ratio.

As shown in FIG. 4, the output value Voxs of the downstream air-fuel ratio sensor 56 becomes a maximum output value max (e.g., about 0.9 V to 1.0 V) when the air-fuel ratio of the catalyst outflow gas (gas to be detected) is richer than the stoichiometric air-fuel ratio, and thus, an oxygen partial pressure of a gas in a state where the unburnt substances and oxygen in the catalyst outflow gas have chemically achieved equilibrium is small. That is, the downstream air-fuel ratio sensor 56 outputs the maximum output value max when the catalyst outflow gas does not contain an excessive oxygen.

Further, the output value Voxs becomes a minimum output value min (e.g., about 0 V to 0.1 V) when the air-fuel ratio of the catalyst outflow gas (gas to be detected) is leaner than the stoichiometric air-fuel ratio, and thus, the oxygen partial pressure of the gas in the state where the unburnt substances and oxygen in the catalyst outflow gas have chemically achieved equilibrium is large. That is, the downstream air-fuel ratio sensor 56 outputs the minimum output value min when the catalyst outflow gas contains excessive oxygen.

Further, the output value Voxs drastically decreases from the maximum output value max to the minimum output value min when the air-fuel ratio of the catalyst outflow gas changes from the air-fuel ratio richer than the stoichiometric air-fuel ratio to the air-fuel ratio leaner than the stoichiometric air-fuel ratio. In contrast, the output value Voxs drastically increases from the minimum output value min to the maximum output value max when the air-fuel ratio of the catalyst outflow gas changes from the air-fuel ratio leaner than the stoichiometric air-fuel ratio to the air-fuel ratio richer than the stoichiometric air-fuel ratio. It should be noted that a mean value of the minimum output value min and the maximum output value max is referred to as a midpoint voltage mid (=(max+min)/2), or a stoichiometric air-fuel ratio corresponding voltage Vst.

The accelerator opening sensor 57 shown in FIG. 2 detects an operation amount of an accelerator pedal AP operated by the driver, so as to output a signal indicative of the operation amount Accp of the accelerator pedal AP.

The electric controller 60 is an electronic circuit including a "well-known microcomputer which includes a CPU, a ROM, a RAM, a backup RAM, and an interface which includes an AD converter, etc."

The backup RAM included in the electric controller 60 is supplied with an electric power from a battery mounted on a vehicle on which the engine 10 is mounted, regardless of a position (off-position, start position, on-position, and so on) of an unillustrated ignition key switch of the vehicle. While the electric power from the battery is supplied to the backup RAM, data is stored in (written into) the backup RAM according to an instruction of the CPU, and the backup RAM holds (retains, stores) the data in such a manner that the data can be read out. When the battery is taken out from the vehicle, for example, and thus, when the backup RAM is not supplied with the electric power, the backup RAM can not hold the data. That is, the data which have been stored are disappeared (destroyed).

The interface of the electric controller 60 is connected to the sensors 51-57 described above so as to send signals from those sensors to the CPU. In addition, the interface is designed to send instruction signals (drive signals) to each of the spark plugs 24 of the cylinders, each of the fuel injection valves 25 of the cylinders, the intake valve control device 26, and the throttle valve actuator 34a, and the like, in response to instructions from the CPU. It should be noted that the electric controller 60 is designed to send the instruction signal to the throttle valve actuator 34a so that the throttle valve opening TA increases as the obtained accelerator pedal operation amount Accp increases.

(An Outline of the Air-Fuel Ratio Control by the First Control Apparatus)

The first control apparatus sets the air-fuel ratio of the engine (cylinder-by-cylinder air-fuel ratios) to a lean air-fuel ratio (which is an air-fuel ratio larger than the stoichiometric air-fuel ratio), when it determines, based on the output value Voxs of the downstream air-fuel ratio sensor 56, that a lean request is occurring, the lean request being a request which requires to set the air-fuel ratio of the catalyst inflow gas to the lean air-fuel ratio. The first control apparatus sets the air-fuel ratio of the engine (cylinder-by-cylinder air-fuel ratios) to a rich air-fuel ratio (which is an air-fuel ratio smaller than the stoichiometric air-fuel ratio), when it determines, based on the output value Voxs of the downstream air-fuel ratio sensor 56, that a rich request is occurring, the rich request being a request which requires to set the air-fuel ratio of the catalyst inflow gas to the rich air-fuel ratio. The air-fuel ratio control described above is a feedback control on an air-fuel ratio based on the output value Voxs of the downstream air-fuel ratio sensor 56.

Figure 5:
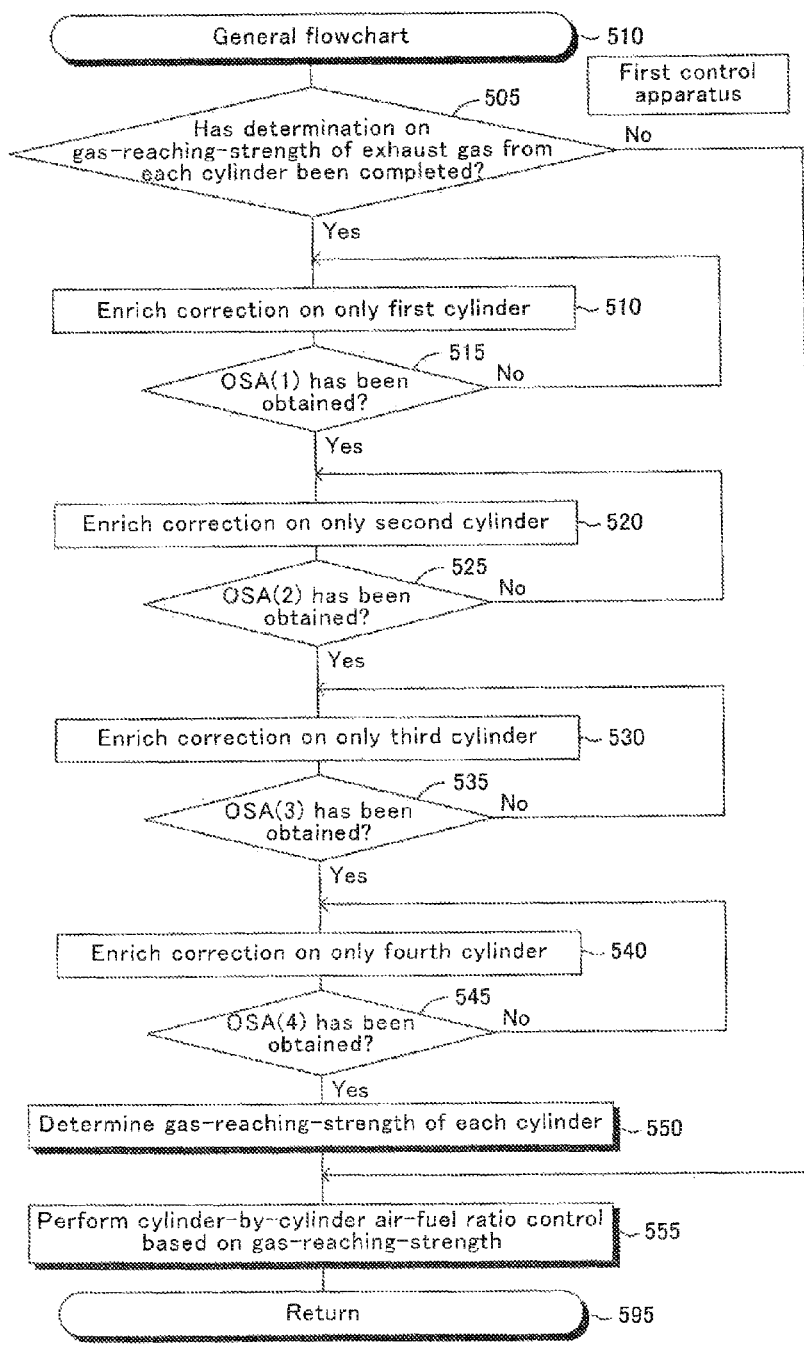
FIG. 5 is a general flowchart showing a routine executed by a CPU of an air-fuel ratio control apparatus (first control apparatus) according to a first embodiment of the present invention.

Further, as an outline of operations shown in the general flowchart in FIG. 5, the first control apparatus has/makes an air-fuel ratio (air-fuel ratio of a selected cylinder) of a mixture supplied to the combustion chamber 21 of one particular/specific cylinder (selected cylinder (Nth cylinder)) (always) different from an air-fuel ratio (air-fuel ratio of a non-selected cylinder) of a mixture supplied to the combustion chambers 21 of each of the cylinders (non-selected cylinder) other than the selected cylinder. In actuality, when the first control apparatus differentiates the air-fuel ratio of the selected cylinder from the air-fuel ratio of the non-selected cylinder, the first control apparatus sets the air-fuel ratio of the selected cylinder to an air-fuel ratio smaller (richer) than the air-fuel ratio of the non-selected cylinder, in a period in which the rich request serving as the air-fuel ratio request is occurring.

In addition, the first control apparatus obtains a mean oxygen storage amount OSA(N) in that case (i.e., in the case in which the air-fuel ratio of the selected cylinder is set be smaller than the air-fuel ratio of the non-selected cylinder), and stores/memorizes the mean oxygen storage amount OSA(N) with associating it with the selected cylinder (the Nth cylinder) (refer to steps from step 505 to step 545). As described later, the mean oxygen storage amount OSA(N) is one of "values/parameters indicative of an aspect/feature of a cyclic fluctuation" of the output value Voxs of the downstream air-fuel ratio sensor 56, and is referred to as a "fluctuation period correlated value." In other words, the mean oxygen storage amount OSA(N) is a value varying depending on (in accordance with) an "inversion period of the output value Voxs", and thus, is a value correlated with the inversion period of the output value Voxs.

More specifically, in a period in which a feedback control condition is satisfied, the first control apparatus determines that a state/condition of the catalyst 43 is a rich state (state in which the lean request which requires to set the air-fuel ratio of the catalyst inflow gas to the lean air-fuel ratio is occurring) when the output value Voxs of the downstream air-fuel ratio sensor 56 is larger than the stoichiometric air-fuel ratio corresponding voltage Vst, so as to set the air-fuel ratio of each of the cylinders to an "air-fuel ratio larger (leaner) than the stoichiometric air-fuel ratio by a predetermined amount."

Further, the first control apparatus determines that the state/condition of the catalyst 43 is a lean state (state in which the rich request which requires to set the air-fuel ratio of the catalyst inflow gas to the rich air-fuel ratio is occurring) when the output value Voxs of the downstream air-fuel ratio sensor 56 is smaller than the stoichiometric air-fuel ratio corresponding voltage Vst, so as to set the air-fuel ratio of each of the cylinders to an "air-fuel ratio smaller (richer) than the stoichiometric air-fuel ratio by a predetermined amount." That is, the first control apparatus feedback-controls the air-fuel ratio (cylinder-by-cylinder air-fuel ratio) of each of the cylinders based on the output value Voxs of the downstream air-fuel ratio sensor 56.

In this state, when the first control apparatus proceeds to step 505 shown in FIG. 5, it determines whether or not a determination (judgment) has been completed on a "gas-reaching-strength of the exhaust gas discharged from each of the cylinders to the downstream air-fuel ratio sensor 56 (that is, an influence/impact degree on the output value Voxs of the downstream air-fuel ratio sensor 56 of (by) the exhaust gas discharged from each of the cylinders)." Hereinafter, the "gas-reaching-strength of the exhaust gas discharged from a certain cylinder to the downstream air-fuel ratio sensor 56" is simply referred to as a "gas-reaching-strength of a certain cylinder."

If the determination of (on) the gas-reaching-strength of each of the cylinders has not yet been completed, the first control apparatus makes a rich correction on only the air-fuel ratio of the first cylinder at step 510. That is, when the output value Voxs of the downstream air-fuel ratio sensor 56 is smaller than the stoichiometric air-fuel ratio corresponding voltage Vst, and therefore, the rich request is occurring, the first control apparatus sets the air-fuel ratio of a cylinder other than the first cylinder to the "air-fuel ratio smaller (richer) than the stoichiometric air-fuel ratio by the predetermined amount", and sets the air-fuel ratio of the first cylinder to an "air-fuel ratio richer (smaller) than the air-fuel ratio of the cylinder other than the first cylinder." In other words, the first control apparatus increases an "injection amount of a fuel injected from the fuel injection valve 25 corresponding to the first cylinder" by a predetermined ratio as compared to an "injection amount of a fuel injected from the fuel injection valve 25 corresponding to the cylinder other than the first cylinder", in a case in which the first control apparatus sets the catalyst inflow gas to the rich air-fuel ratio.

Further, when the output value Voxs of the downstream air-fuel ratio sensor 56 is larger than the stoichiometric air-fuel ratio corresponding voltage Vst, and therefore, the lean request is occurring, the first control apparatus sets each of the air-fuel ratios of all of the cylinders to an "air-fuel ratio leaner (larger) than the stoichiometric air-fuel ratio by a predetermined amount." That is, when the lean request is occurring, the first control apparatus sets both of the "injection amount of the fuel injected from the fuel injection valve 25 corresponding to the first cylinder" and the "injection amount of the fuel injected from the fuel injection valve 25 corresponding to the cylinder other than the first cylinder" to a value equal to each other.

The first control apparatus continues the air-fuel ratio feedback control under this state, and calculates a stored oxygen amount OSAkz and a released oxygen amount OSAhs, according to a well-known method.

For example, the stored oxygen amount OSAkz is calculated by integrating (summing) a stored oxygen increasing amount ΔOSAkz per unit time shown by a formula (1) described below, over (for) a period in which the output value Voxs of the downstream air-fuel ratio sensor 56 is larger than the stoichiometric air-fuel ratio corresponding voltage Vst (refer to a point in time t1 to a point in time t2, shown in FIG. 6). In the formula (1), a value "0.23" is a mass fraction of oxygen contained in the air. SFi is a total amount of the fuel injection amount of the fuel injected per said unit time. abyfs is the upstream air-fuel ratio abyfs (that is, the air-fuel ratio of the gas flowing into the catalyst 43) obtained by applying the output value Vabyfs of the upstream air-fuel ratio sensor 55 to the air-fuel ratio conversion table Mapabyfs(Vabyfs) shown in FIG. 3. stoich is the stoichiometric air-fuel ratio (e.g., 14.6).

$$\Delta OSAkz = 0.23 \cdot SFi \cdot (abyfs - stoich) \quad (1)$$

For example, the released oxygen amount OSAhs is calculated by integrating (summing) a released oxygen increasing amount ΔOSAhs per unit time shown by a formula (2) described below, over (for) a period in which the output value Voxs of the downstream air-fuel ratio sensor 56 is smaller than the stoichiometric air-fuel ratio corresponding voltage Vst (refer to a point in time t2 to a point in time t3, shown in FIG. 6).

$$\Delta OSAhs = 0.23 \cdot SFi \cdot (stoich - abyfs) \quad (2)$$

After the stored oxygen amount OSAkz and the released oxygen amount OSAhs are obtained, the first control apparatus calculates a mean value OSA(1) of those values. The OSA(1) is the above described mean oxygen storage amount OSA(N) (N=1). The mean oxygen storage amount OSA(1) is stored as the fluctuation period correlated value of the first cylinder in the RAM.

Subsequently, the first control apparatus makes a rich correction on only the air-fuel ratio of the second cylinder at step 520 and step 525, similarly to step 510 and step 515, and obtains the stored oxygen amount OSAkz and the released oxygen amount OSAhs under this state. Thereafter, the first control apparatus stores a mean value OSA(2) of those values in the RAM as the fluctuation period correlated value of the second cylinder.

Subsequently, the first control apparatus makes a rich correction on only the air-fuel ratio of the third cylinder at step 530 and step 535, similarly to step 510 and step 515, and obtains the stored oxygen amount OSAkz and the released oxygen amount OSAhs under this state. Thereafter, the first control apparatus stores a mean value OSA(3) of those values in the RAM as the fluctuation period correlated value of the third cylinder.

Subsequently, the first control apparatus makes a rich correction on only the air-fuel ratio of the fourth cylinder at step 540 and step 545, similarly to step 510 and step 515, and obtains the stored oxygen amount OSAkz and the released oxygen amount OSAhs under this state. Thereafter, the first control apparatus stores a mean value OSA(4) of those values in the RAM as the fluctuation period correlated value of the fourth cylinder.

Subsequently, the first control apparatus proceeds to step 550 to determine (judge) the gas-reaching-strength of each of the cylinders, based on the mean oxygen storage amounts OSA(N) (N is an integer from 1 to 4), each serving as the fluctuation period correlated value.

Figure 6:
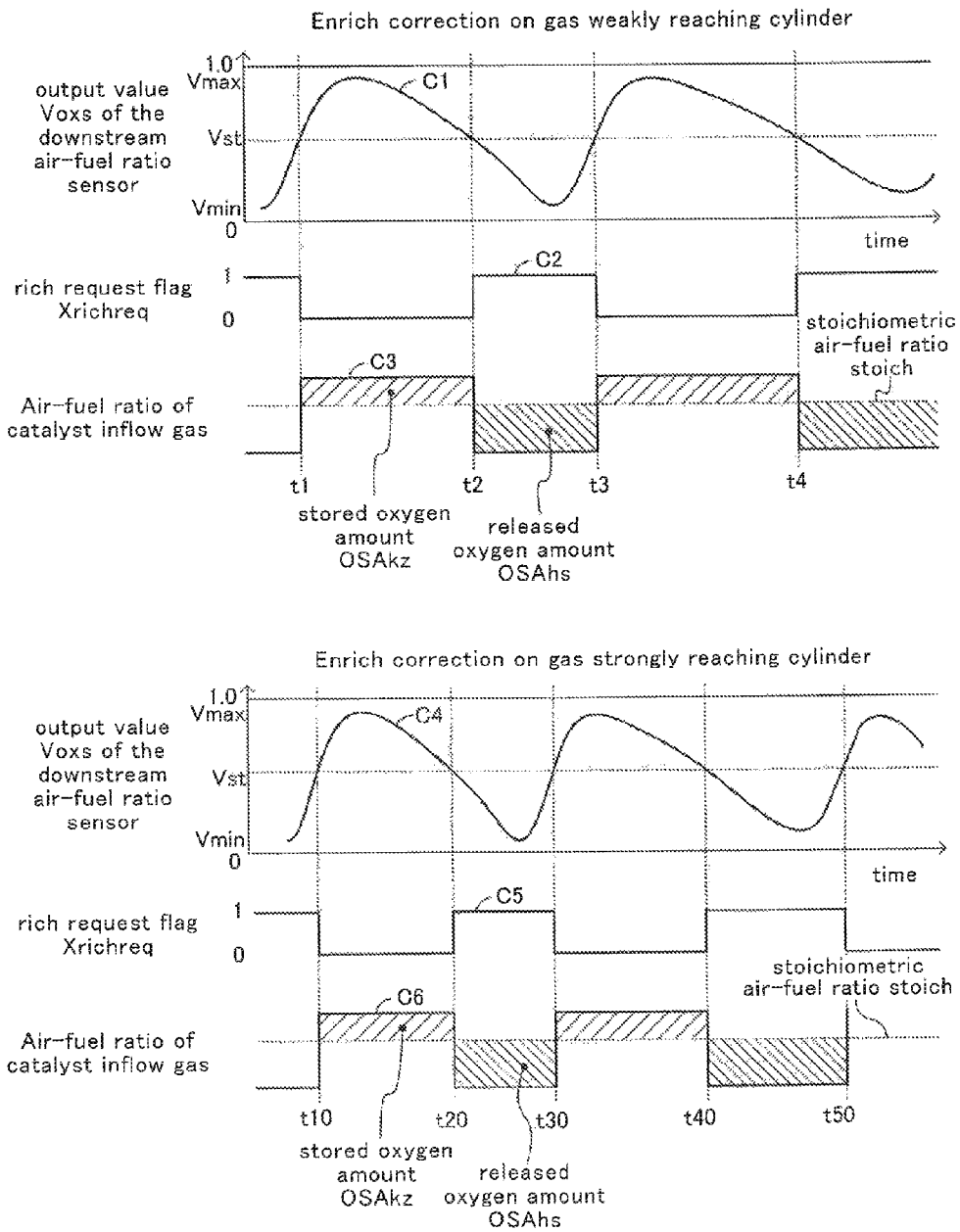
FIG. 6 is a timeline chart showing a relationship among an output value of the downstream air-fuel ratio sensor, a rich request flag, and an air-fuel ratio of a catalyst inflow gas.

As shown by a curve line C1 in FIG. 6, when only the gas weakly reaching cylinder is rich-corrected, the output value Voxs of the downstream air-fuel ratio sensor 56 does not readily change with respect to the "exhaust gas of the rich-corrected cylinder." Accordingly, the output value Voxs of the downstream air-fuel ratio sensor 56 does not readily change from a value smaller than the stoichiometric air-fuel ratio corresponding voltage Vst to a value larger than the stoichiometric air-fuel ratio corresponding voltage Vst. As a result, the inversion period of the output value Voxs of the downstream air-fuel ratio sensor 56 becomes relatively long (refer to the point in time t1 to the point in time t3). Accordingly, as understood from areas of regions, each surrounded by the line C3 indicating the air-fuel ratio of the catalyst inflow gas and a dotted straight line indicating the stoichiometric air-fuel ratio (i.e., areas of hutched portions), the mean oxygen storage amount OSA(N) (=the mean value of the stored oxygen amount OSAkz and the released oxygen amount OSAhs) becomes relatively large when the gas weakly reaching cylinder is rich-corrected.

It should be noted that the inversion period of the output value Voxs means a time duration (from the point in time t1 to the point in time t3, and a point in time t10 to a point in time t30, shown in FIG. 6) from a point in time at which the output value Voxs of the downstream air-fuel ratio sensor 56 changes to a value corresponding to an air-fuel ratio richer than the stoichiometric air-fuel ratio (value larger than the stoichiometric air-fuel ratio corresponding voltage Vst) to a point in time at which the output value Voxs again changes to a value corresponding to an air-fuel ratio richer than the stoichiometric air-fuel ratio after it changes to a value corresponding to an air-fuel ratio leaner than the stoichiometric air-fuel ratio (value smaller than the stoichiometric air-fuel ratio corresponding voltage Vst).

On the other hand, as shown by a curve line C4 in FIG. 6, when only the gas strongly reaching cylinder is rich-corrected, the output value Voxs of the downstream air-fuel ratio sensor 56 readily changes with respect to the "exhaust gas of the rich-corrected cylinder." Accordingly, the output value Voxs of the downstream air-fuel ratio sensor 56 readily changes from a value smaller than the stoichiometric air-fuel ratio corresponding voltage Vst to a value larger than the stoichiometric air-fuel ratio corresponding voltage Vst. As a result, the inversion period of the output value Voxs of the downstream air-fuel ratio sensor 56 becomes relatively short (refer to the point in time t10 to the point in time t30, and the point in time t30 to the point in time t50). Accordingly, as understood from areas of regions, each surrounded by the line C6 indicating the air-fuel ratio of the catalyst inflow gas and a dotted straight line indicating the stoichiometric air-fuel ratio (i.e., areas of hutched portions), the mean oxygen storage amount OSA(N) (=the mean value of the stored oxygen amount OSAkz and the released oxygen amount OSAhs) becomes relatively small when only the gas strongly reaching cylinder is rich-corrected as compared with when only the gas weakly reaching cylinder is rich-corrected.

In view of the above, the first control apparatus determines that the cylinder having the smaller mean oxygen storage amount OSA(N) is a gas more strongly reaching cylinder. That is, assuming that the mean oxygen storage amounts OSA(N) are obtained as shown in a table 1 below, the first control apparatus determines that the first cylinder is the "gas most strongly reaching cylinder (gas most excellently reaching cylinder)", the fourth cylinder is the "gas most weakly reaching cylinder (gas most poorly reaching cylinder)", and each of the remaining second and third cylinders is the "cylinder which the gas reaches with a standard strength (gas normally reaching cylinder)."

TABLE 1

| Cylinder | mean oxygen storage amount OSA(N) | cylinder-by-cylinder influence degree indicating value EF(N) = OSAave − OSA(N) | gas-reaching-strength to downstream air-fuel ratio sensor |
|---|---|---|---|
| first cylinder | 0.3 (g) | +0.1 (g) | High (best) |
| second cylinder | 0.4 (g) | 0 | Middle (standard) |
| third cylinder | 0.4 (g) | 0 | Middle (standard) |
| fourth cylinder | 0.5 (g) | −0.1 (g) | Low (worse) |

It should be noted that, as shown in the above table 1, the first control apparatus calculates a mean value OSAave (=(OSA(1)+OSA(2)+OSA(3)+OSA(4))4) of the mean oxygen storage amounts OSA(N) (N is an integer from 1 to 4), and obtains, as a value EF (hereinafter, referred to as a "cylinder-by-cylinder influence degree indicating value EF(N)") indicative of (representing) an influence/impact degree on the output value Voxs of the downstream air-fuel ratio sensor 56 which the exhaust gas discharged from each of the cylinder (the Nth cylinder) has, a value obtained by subtracting the mean oxygen storage amount OSA(N) from the mean value OSAave (i.e., a difference between the mean value OSAave and the mean oxygen storage amount OSA(N)). That is, since the cylinder-by-cylinder influence degree indicating value EF(N)=OSAave−OSA(N), the gas-reaching-strength becomes stronger as the cylinder-by-cylinder influence degree indicating value EF(N) becomes larger.

Thereafter, the first control apparatus proceeds to step 555 shown in FIG. 5 to perform a cylinder-by-cylinder air-fuel ratio control (cylinder-by-cylinder fuel injection amount control) described later, based on the gas-reaching-strength of each of the cylinder (e.g., the cylinder-by-cylinder influence degree indicating value EF(N)). That is, the first control apparatus differentiates each of the air-fuel ratios of the cylinders based on an operation state of the engine 10, or the like. This is the outline of the operation of the first control apparatus.

(Operation)

The operation of the first control apparatus will next be described in detail.

<Fuel Injection Control>

Figure 7:
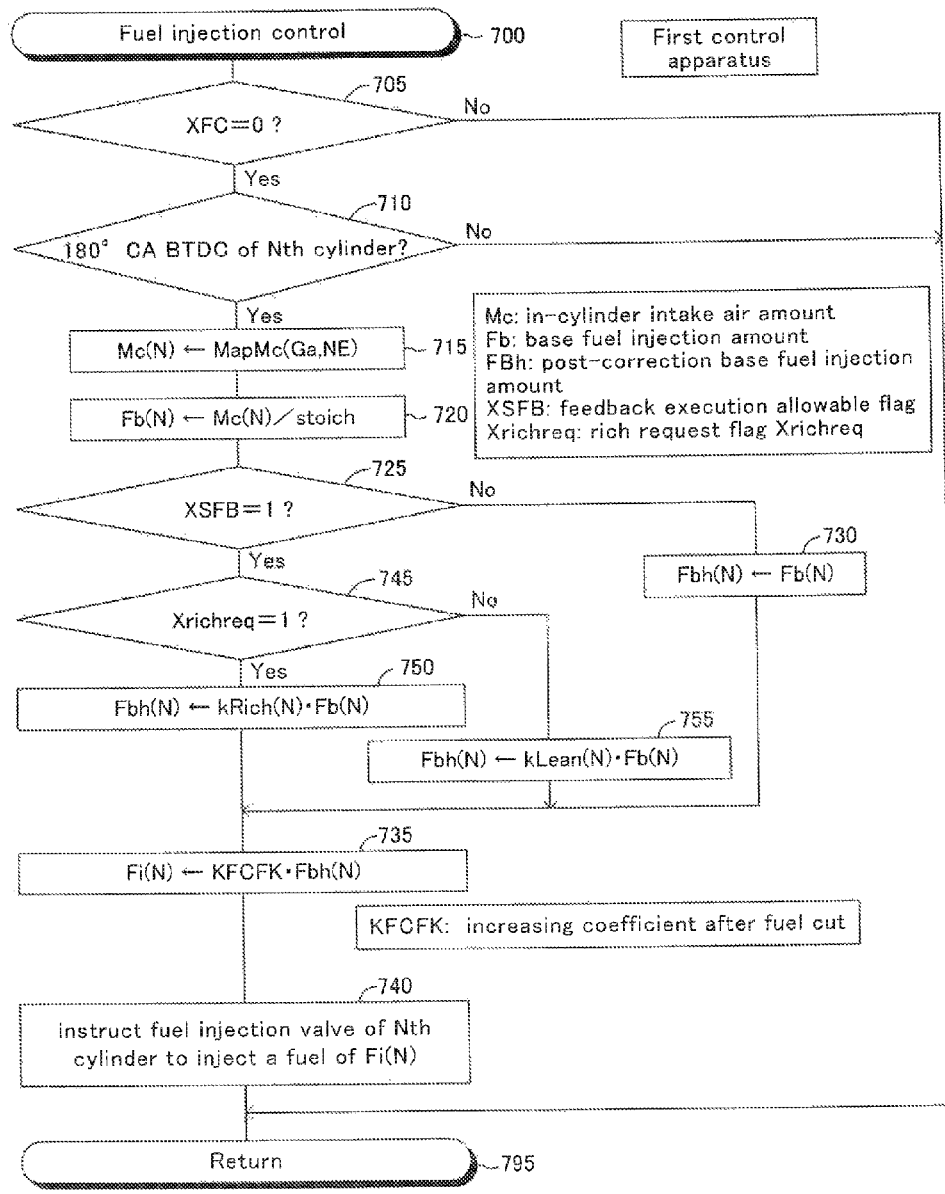
FIG. 7 is a flowchart showing a routine executed by the CPU of the first control apparatus.

The CPU is designed to repeatedly execute a routine shown by a flowchart in FIG. 7 for calculating a final fuel injection amount Fi(N) and instructing a fuel injection every time a predetermined time period elapses.

Figure 11:
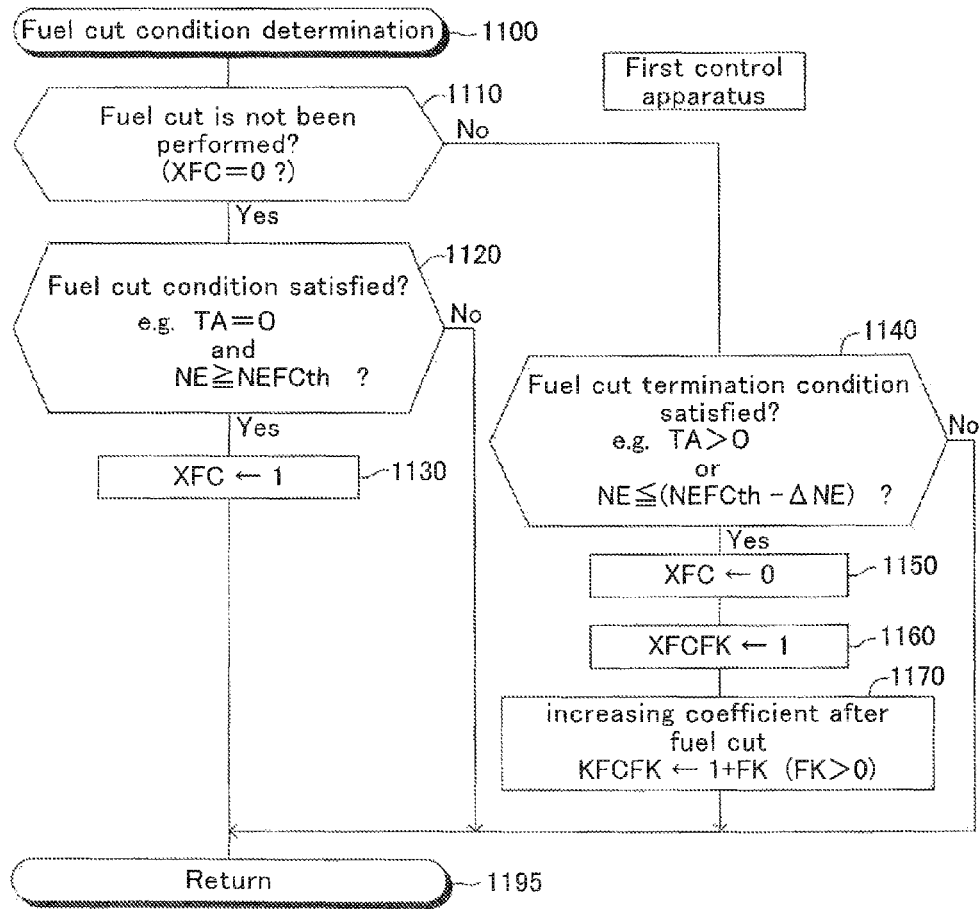
FIG. 11 is a flowchart showing a routine executed by the CPU of the first control apparatus.

Accordingly, at an appropriate point in time, the CPU starts the process from step 700 to proceed to step 705, at which the CPU determines whether or not a value of a fuel cut flag XFC is "0." The value of the fuel cut flag XFC is set to "1" when a fuel cut start condition is satisfied while the value of the fuel cut flag XFC is "0", and is set to "0" when a fuel cut termination condition is satisfied while the value of the fuel cut flag XFC is "1", by means of a fuel cut condition determining routine shown in FIG. 11 which will be described later. It should be noted that the value of the fuel cut flag XFC is set to "0" in an initial routine. The initial routine is a routine executed by the CPU when the ignition key switch of the vehicle on which the engine 10 is mounted is turned on from off.

It is assumed here that the value of the fuel cut flag is "0", the CPU makes a "Yes" determination at step 705 to proceed to step 710, at which the CPU determines a crank angle of an arbitrary cylinder (Nth cylinder, N is an integer from 1 to 4) reaches a predetermined crank angle (e.g., BTDC 180° CA) before the intake top dead center.

When there is no cylinder whose crank angle reaches the predetermined crank angle, the CPU makes a "No" determination at step 710 to directly proceed to step 795 to end the present routine tentatively.

In contrast, when the crank angle of the arbitrary cylinder (Nth cylinder) becomes equal to the predetermined crank angle before the intake top dead center of that cylinder (Nth cylinder), the CPU makes a "Yes" determination at step 710 to proceed to step 715, at which the CPU obtains (estimates, determines) an "in-cylinder intake air amount Mc(N) which is an amount of an air introduced into the Nth cylinder" by applying the actual intake air amount (flow rate) Ga and the actual engine rotational speed NE to a table MapMc(Ga, NE). The Nth cylinder is a "cylinder which is about to perform a current intake stroke", and is also referred to as a "fuel injection cylinder." Ga is the intake air amount measured by the air flow meter 51. NE is the engine rotational speed separately obtained. Note that the CPU may estimates the in-cylinder intake air amount Mc(N) using a well-known "air model."

Subsequently, the CPU proceeds to step 720 to obtain a base fuel injection amount Fb(N) to have the air-fuel ratio of the Nth cylinder coincide with the stoichiometric air-fuel ratio stoich, by dividing the in-cylinder intake air amount Mc(N) by the stoichiometric air-fuel ratio stoich. The base fuel injection amount Fb(N) is a feedforward amount to have the air-fuel ratio of the engine coincide with the stoichiometric air-fuel ratio stoich.

Subsequently, the CPU proceeds to step 725 to determine whether or not a value of a feedback (sub feedback) execution allowable flag XSFB is "1." The value of the feedback execution allowable flag XSFB is set to "0" in the initial routine described above. Further, the value of the feedback execution allowable flag XSFB is set to "1" when a air-fuel ratio feedback control condition is satisfied, and is set to "0" when the air-fuel ratio feedback control condition is not satisfied.

The air-fuel ratio feedback control condition is satisfied when all of the following conditions are satisfied.

(Condition 1) The cooling water temperature THW is equal to or higher than a cooling water temperature threshold THWth.

(Condition 2) The downstream air-fuel ratio sensor 56 has been activated.

It is assumed here that the value of the feedback execution allowable flag XSFB is "0." In this case, the CPU makes a "No" determination at step 725 to proceed to step 730, at which the CPU stores the base fuel injection amount Fb(N) into a post-correction base fuel injection amount Fbh(N). That is, the post-correction base fuel injection amount Fbh(N) is made equal to the base fuel injection amount Fb(N). Thereafter, the CPU sequentially executes processes of steps from step 735 and step 740, described below, one after another, and proceeds to step 795 to end the present routine tentatively.

Step 735: The CPU calculates the final fuel injection amount (instructed injection amount) Fi(N) by multiplying the post-correction base fuel injection amount Fbh(N) by an increasing coefficient after fuel cut KFCFK. The increasing coefficient after fuel cut KFCFK is set to "1" in the initial routine described above, and is also set to "1" during a normal operation. The increasing coefficient after fuel cut KFCFK is set to a value (1+KF) which is larger than "1" when the fuel cut operation is terminated (refer to step 1170, described later). The increasing coefficient after fuel cut KFCFK is returned to "1" when a rich request flag Xrichreq described later has changed from "1" to "0" (in the present example, when the output value Voxs of the downstream air-fuel ratio sensor 56 has changed from a value smaller than the stoichiometric air-fuel ratio corresponding voltage Vst to a value larger than the stoichiometric air-fuel ratio corresponding voltage Vst) while the value of the increasing coefficient after fuel cut KFCFK is (1+KF) (refer to a routine shown in FIG. 13, described later).

Step 740: The CPU instructs the fuel injection valve 25 corresponding to the Nth cylinder to inject a fuel of the final fuel injection amount Fi(N) from the fuel injection valve 25. Consequently, when the value of the feedback execution allowable flag XSFB is "0", the fuel injection amount of a specific cylinder is neither increased nor decreased, and thus, the cylinder-by-cylinder air-fuel ratios are maintained at the same values as each other.

In contrast, if the value of the feedback execution allowable flag XSFB is "1" when the CPU executes the process of step 725, the CPU makes a "Yes" determination at step 725 to proceed to step 745, at which the CPU determines whether or not the value of the rich request flag Xrichreq is "1."

Figure 8:
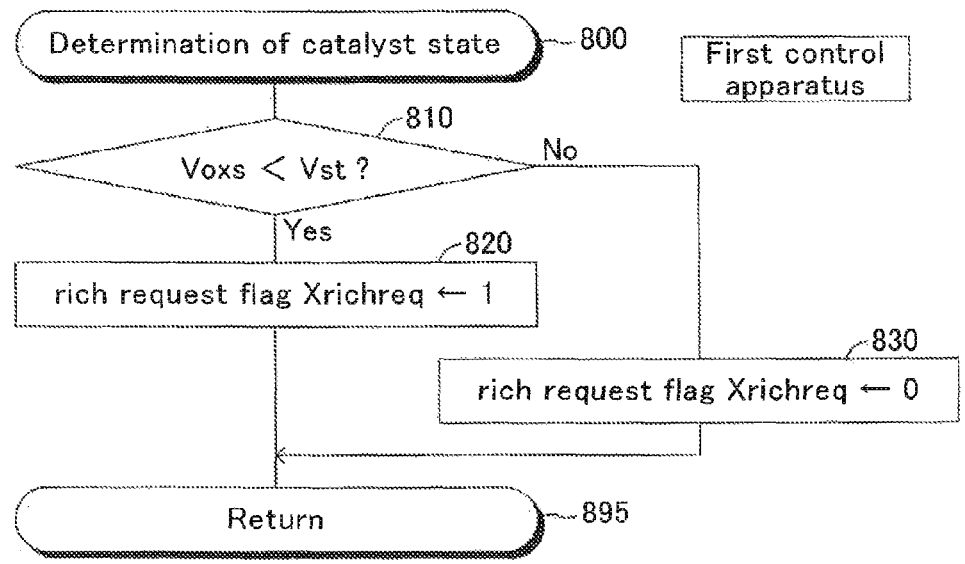
FIG. 8 is a flowchart showing a routine executed by the CPU of the first control apparatus.

The value of the rich request flag Xrichreq is set to "1" in the initial routine described above. Further, the value of the rich request flag Xrichreq is set according to a routine shown in FIG. 8. That is, the CPU executes the "catalyst state/ condition determining routine" shown by a flowchart in FIG.

8, every time a predetermined time period elapses. Accordingly, at an appropriate point in time, the CPU starts the process from step 800 of FIG. 8 to proceed to step 810, the output value Voxs of the downstream air-fuel ratio sensor 56 is smaller than the stoichiometric air-fuel ratio corresponding voltage Vst. In other words, the CPU determines whether or not the air-fuel ratio (downstream air-fuel ratio) represented/indicated by the output value Voxs is larger (leaner) than the stoichiometric air-fuel ratio stoich.

When the output value Voxs is smaller than the stoichiometric air-fuel ratio corresponding voltage Vst, the CPU makes a "Yes" determination at step 810 to proceed to step 820, at which the CPU sets the value of the rich request flag Xrichreq to "1", and thereafter, proceeds to step 895 to end the present routine tentatively. In contrast, when the output value Voxs is equal to or larger than the stoichiometric air-fuel ratio corresponding voltage Vst, the CPU makes a "No" determination at step 810 to proceed to step 830, at which the CPU sets the value of the rich request flag Xrichreq to "0", and thereafter, proceeds to step 895 to end the present routine tentatively.

That is, the value of the rich request flag Xrichreq is set to "1" when the state/condition of the catalyst 43 is in lean condition (or, is in a condition in which an exhaust gas having the rich air-fuel ratio should be flowed into the catalyst 43), and is set to "0" when the state/condition of the catalyst 43 is in rich condition (or, is in a condition in which an exhaust gas having the lean air-fuel ratio should be flowed into the catalyst 43).

When the value of the rich request flag Xrichreq is set at "1", the CPU makes a "Yes" determination at step 745 shown in FIG. 7 to proceed to step 750, at which the CPU calculates the post-correction base fuel injection amount Fbh(N) by multiplying the base fuel injection amount Fb(N) by an increasing coefficient for Nth cylinder kRich(N).

Figure 9:
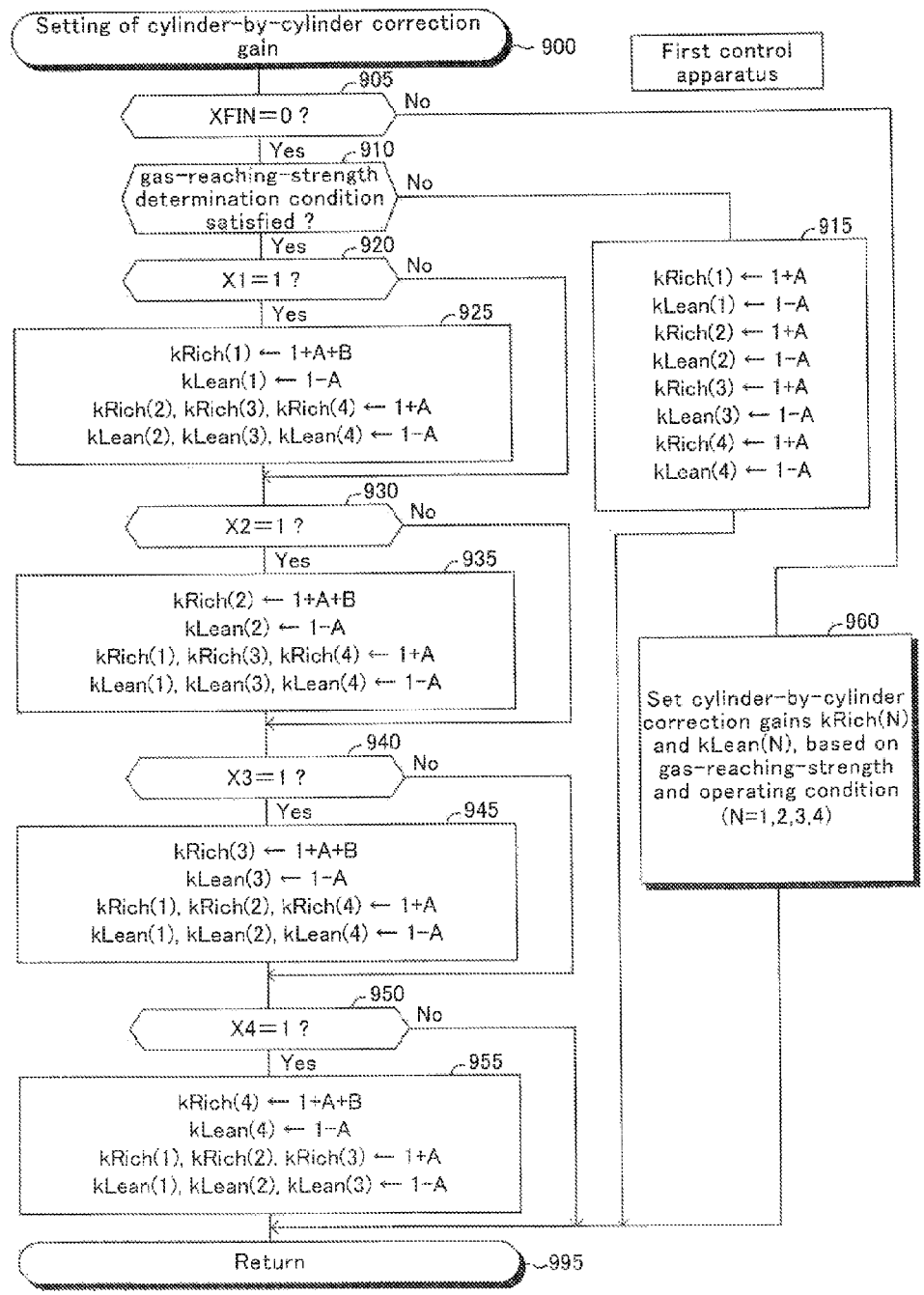
FIG. 9 is a flowchart showing a routine executed by the CPU of the first control apparatus.

The increasing coefficient for Nth cylinder kRich(N) is normally set to a value "1+A" which is larger than "1" by a predetermined positive value A (refer to step 915 shown in FIG. 9). The value "1+A" is larger than "1", and also referred to as an "increasing coefficient base value" or a "rich side base gain." Therefore, the post-correction base fuel injection amount Fbh(N) calculated at step 750 becomes a fuel injection amount which sets the air-fuel ratio of the Nth cylinder to an air-fuel ratio smaller (richer) than the stoichiometric air-fuel ratio stoich. That is, the air-fuel ratio of the Nth cylinder is equal to a value obtained by dividing the stoichiometric air-fuel ratio stoich by the increasing coefficient for Nth cylinder kRich(N).

Thereafter, the CPU executes the processes of step 735 and step 740 to proceed to step 795 to end the present routine tentatively. As a result, the air-fuel ratio of the Nth cylinder becomes the rich air-fuel ratio when the value of the rich request flag Xrichreq is "1", and thus, the exhaust gas having the rich air-fuel ratio flows into the catalyst 43.

In contrast, if the value of the rich request flag Xrichreq is set to "0" when the CPU executes the process of step 745, the CPU makes a "No" determination at step 745 to proceed to step 755, at which the CPU calculates the post-correction base fuel injection amount Fbh(N) by multiplying the base fuel injection amount Fb(N) by a decreasing coefficient for Nth cylinder kLean(N).

The decreasing coefficient for Nth cylinder kLean(N) is normally set to a value "1−A" which is smaller than "1" by a predetermined positive value A (refer to step 915 shown in FIG. 9). The value "1−A" is smaller than "1", and also referred to as an "decreasing coefficient base value" or a "lean side base gain." Therefore, the post-correction base fuel injection amount Fbh(N) calculated at step 755 becomes a fuel injection amount which sets the air-fuel ratio of the Nth cylinder to an air-fuel ratio larger (leaner) than the stoichiometric air-fuel ratio stoich. That is, the air-fuel ratio of the Nth cylinder is equal to a value obtained by dividing the stoichiometric air-fuel ratio stoich by the decreasing coefficient for Nth cylinder kLean(N).

Thereafter, the CPU executes the processes of step 735 and step 740 to proceed to step 795 to end the present routine tentatively. As a result, the air-fuel ratio of the Nth cylinder becomes the lean air-fuel ratio when the value of the rich request flag Xrichreq is "0", and thus, the exhaust gas having the lean air-fuel ratio flows into the catalyst 43.

Further, if the value of the fuel cut flag XFC is "1" when the CPU executes the process of step 705, the CPU makes a "No" determination at step 705 to directly proceed to step 795 to end the present routine tentatively. As a result, since the process of step 740 is not executed, the fuel injection is stopped. That is, the fuel cut operation is carried out.

<Setting of a Cylinder-by-Cylinder Correction Gain, and Obtainment of a Mean Oxygen Storage Amount (Fluctuation Period Correlated Value)>

Operations of the CPU will next be described for setting "the increasing coefficient for Nth cylinder kRich(N) and the decreasing coefficient for Nth cylinder kLean(N)" described above, and for obtaining the "mean oxygen storage amount OSA(N) serving as a fluctuation period correlated value." Firstly, the description continues assuming that a "degree (strength) on how strongly the exhaust gas discharged from each of the cylinders reaches the downstream air-fuel ratio sensor 56 (gas-reaching-strength to the downstream air-fuel ratio sensor 56) (that is, an influence/impact degree on the output value Voxs of the downstream air-fuel ratio sensor 56)" has not yet been determined (judged) after a current start of the engine 10.

The CPU executes a "cylinder-by-cylinder correction gain setting routine" shown by a flowchart in FIG. 9, every time a predetermined time period elapses. Accordingly, at an appropriate point in time, the CPU starts the process from step 900 shown in FIG. 9 to proceed to step 905, at which the CPU determines whether or not a value of a gas-reaching-strength determination completion flag XFIN is "0." The value of the gas-reaching-strength determination completion flag XFIN is set to "1" when the "gas-reaching-strength to the downstream air-fuel ratio sensor 56 of the exhaust gas discharged from each of the cylinders" has been determined (judged) (refer to step 1093 shown in FIG. 10). The gas-reaching-strength determination completion flag XFIN is set to "0" in the initial routine described above.

According to the assumption described above, the gas-reaching-strength has not yet been determined, and thus, the value of the gas-reaching-strength determination completion flag XFIN is "0." Thus, the CPU makes a "Yes" determination at step 905 to proceed to step 910, at which the CPU determines whether or not a gas-reaching-strength determination condition is satisfied. For example, the gas-reaching-strength determination condition is satisfied when all of conditions described below are satisfied.

(Condition 1) The value of the feedback execution allowable flag XSFB is "1."
(Condition 2) The operating condition of the engine 10 is stable (e.g., an absolute value of a change amount ΔGa per unit time of the intake air amount Ga is smaller than an air change amount threshold ΔGath).

When the gas-reaching-strength determination condition is not satisfied, the CPU makes a "No" determination at step 910 to proceed to step 915, at which the CPU sets each of an increasing coefficient for 1st cylinder kRich(1) to an increasing coefficient for 4th cylinder kRich(4) to the increasing coefficient base value "1+A", and sets each of a decreasing coefficient for 1st cylinder kLean(1) to a decreasing coefficient for 4th cylinder kLean(4) to the decreasing coefficient base value "1−A". Note that the value A is positive and smaller than "1" (e.g., 0.15). Thereafter, the CPU directly proceeds to step 995 to end the present routine tentatively. Consequently, the cylinder-by-cylinder air-fuel ratios for all of the cylinders are controlled so as to be equal to each other.

In contrast, if the gas-reaching-strength determination condition is satisfied when the CPU executes the process of step 910, the CPU makes a "Yes" determination at step 910 to proceed to step 920, at which the CPU determines whether or not a value of a first cylinder enrich flag X1 is "1."

The CPU sets the first cylinder enrich flag X1 to "1" and sets each value of the second cylinder enrich flag X2, a third cylinder enrich flag X3, and a fourth cylinder enrich flag X4 to "0", in the initial routine described above. Accordingly, if the present point in time is a point in time at which the CPU firstly proceeds to step 920 after the current start of the engine 10, the value of the first cylinder enrich flag X1 is "1." Therefore, the CPU makes a "Yes" determination at step 920 to proceed to step 925 so as to execute the following processes.

The CPU sets the value of the increasing coefficient for first cylinder kRich(1) to "1+A+B." The value B is a positive value (e.g., "0.1").

The CPU sets the value of the decreasing coefficient for first cylinder kLean(1) to "1−A." The value B is a positive value (e.g., "0.1").

The CPU sets each of the values of the increasing coefficient for second cylinder kRich(2), the increasing coefficient for third cylinder kRich(3), and the increasing coefficient for fourth cylinder kRich(4) to the increasing coefficient base value "1+A."

The CPU sets each of the values of the decreasing coefficient for second cylinder kLean(2), the decreasing coefficient for third cylinder kLean(3), and the decreasing coefficient for fourth cylinder kLean(4) to the decreasing coefficient base value "1−A."

Thereafter, the CPU proceeds to step 930 to determine whether or not the value of the second cylinder enrich flag X2 is "1." At this point in time, the value of the second cylinder enrich flag X2 is "0." Accordingly, the CPU makes a "No" determination at step 930 to directly proceed to step 940.

At step 940, the CPU determines whether or not the value of the third cylinder enrich flag X3 is "1." At this point in time, the value of the third cylinder enrich flag X3 is "0." Accordingly, the CPU makes a "No" determination at step 940 to directly proceed to step 950.

At step 950, the CPU determines whether or not the value of the fourth cylinder enrich flag X4 is "1." At this point in time, the value of the fourth cylinder enrich flag X4 is "0." Accordingly, the CPU makes a "No" determination at step 950 to directly proceed to step 955 to end the present routine tentatively.

As a result, if the base fuel injection amount Fb(N) is constant, the post-correction base fuel injection amount Fbh(1) for the first cylinder becomes larger than the post-correction base fuel injection amount Fbh(M) for the Mth cylinder (M is 2, 3, and 4) (that is, it becomes "(1+A+B)/(1+A)" times larger), by means of the process of step 750 shown in FIG. 7. Accordingly, when the value of the rich request flag Xrichreq is "1", only the cylinder-by-cylinder air-fuel ratio of the first cylinder is set to the air-fuel ratio smaller than the cylinder-by-cylinder air-fuel ratio of the remaining cylinders. That is, only the air-fuel ratio of the first cylinder is enriched.

It should be noted that the decreasing coefficient for Nth cylinder kLean(N) (N is an integer from 1 to 4) is set to the decreasing coefficient base value "1−A", and thus, the post-correction base fuel injection amounts Fbh(N) are set to the same value as each other as long as the base fuel injection amounts Fb(N) remain unchanged, by means of the process of step 755 shown in FIG. 7. Accordingly, when the value of the rich request flag Xrichreq is "0", the cylinder-by-cylinder air-fuel ratios are set to the same lean air-fuel ratio as each other for all of the cylinders.

Figure 10:
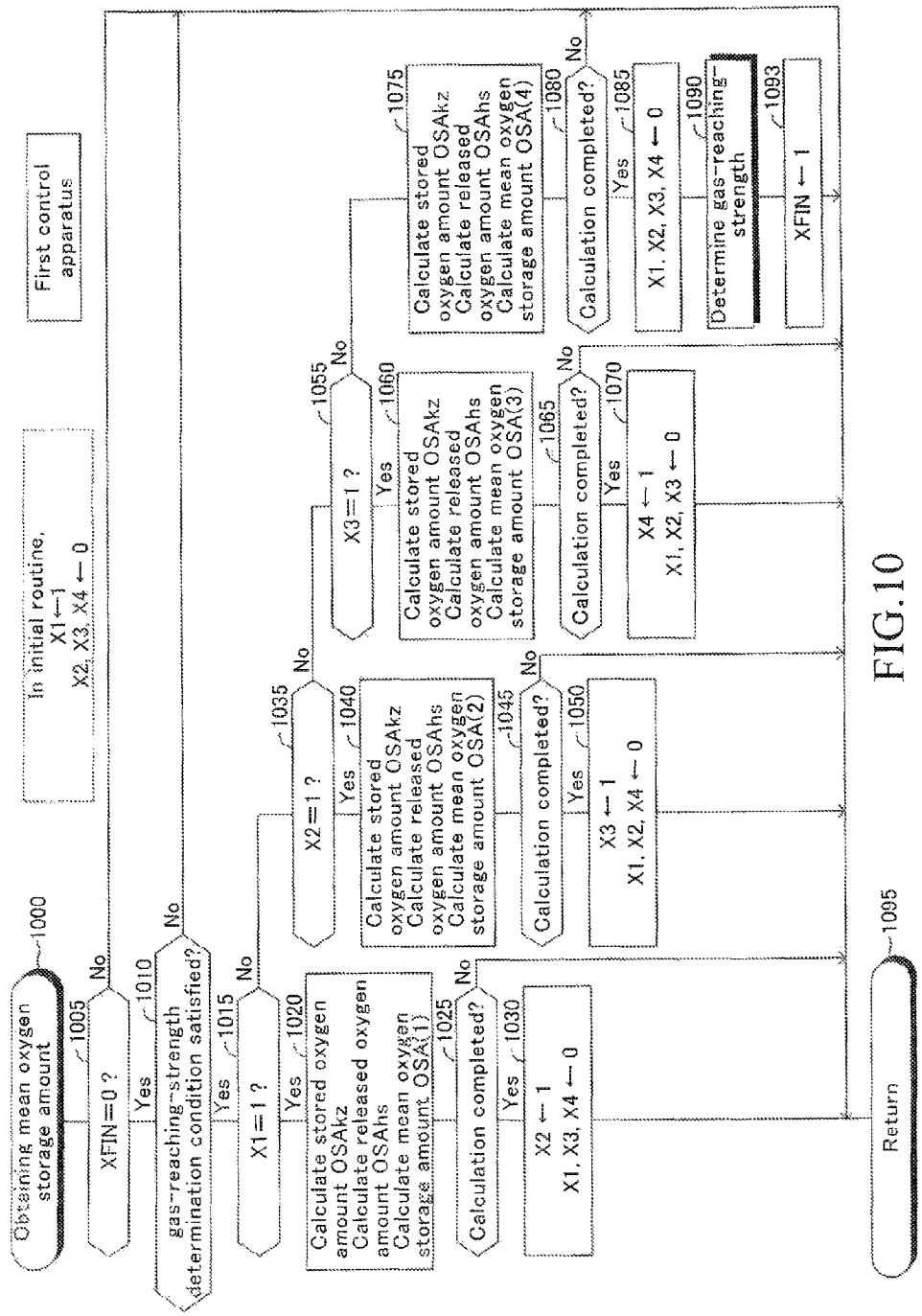
FIG. 10 is a flowchart showing a routine executed by the CPU of the first control apparatus.

Further, the CPU executes a "mean oxygen storage amount obtaining routine" shown by a flowchart in FIG. 10, every time a predetermined time period elapses. Accordingly, at an appropriate point in time, the CPU starts the process from step 1000 to proceed to step 1005, at which the CPU determines whether or not the value of the gas-reaching-strength determination completion flag XFIN is "0." When the gas-reaching-strength determination completion flag XFIN is "1", the CPU makes a "No" determination at step 1005 to directly proceed to step 1095 to end the present routine tentatively.

In contrast, if the value of the gas-reaching-strength determination completion flag XFIN is "0" when the CPU executes the process of step 1005, the CPU makes a "Yes" determination at step 1005 to proceed to step 1010, at which the CPU determines whether or not the gas-reaching-strength determination condition is satisfied. When the gas-reaching-strength determination condition is not satisfied, the CPU makes a "No" determination at step 1010 to directly proceed to step 1095 to end the present routine tentatively.

If the gas-reaching-strength determination condition is satisfied, the CPU makes a "Yes" determination at step 1010 to proceed to step 1015, at which the CPU determines whether or not the value of the first cylinder enrich flag X1 is "1." According to the above assumption (that the CPU firstly proceeds to step 920 after the current start of the engine 10), the value of the first cylinder enrich flag X1 is "1" at this point in time.

Therefore, the CPU makes a "Yes" determination at step 1015 to proceed to step 1020, at which the CPU executes processes of calculating the stored oxygen amount OSAkz and the released oxygen amount OSAhs according to the formulas (1) and (2) described above, and of calculating their mean value as a "mean oxygen storage amount OSA(1) for the first cylinder."

Thereafter, the CPU proceeds to step 1025 to determine whether the calculation for the stored oxygen amount OSAkz, the released oxygen amount OSAhs, and the mean oxygen storage amount OSA(1) has been completed. If the calculation has not yet been completed, the CPU makes a "No" determination at step 1025 to directly proceed to step 1095 to end the present routine tentatively.

By repetition of those processes, the calculation for the stored oxygen amount OSAkz, the released oxygen amount OSAhs, and the mean oxygen storage amount OSA(1) has been completed. Accordingly, when the CPU proceeds to step 1025, the CPU makes a "Yes" determination at step 1025 to proceed to step 1030, at which the CPU sets the value of the second cylinder enrich flag X2 to "1", and sets each value of the first cylinder enrich flag X1, the third cylinder enrich flag X3, and the fourth cylinder enrich flag X4 to "0". Thereafter, the CPU proceeds to step 1095 to end the present routine tentatively.

As a result, the value of the second cylinder enrich flag X2 is set to "1", the CPU makes "No" determinations at step 920, step 940, and step 950 shown in FIG. 9, and makes a "Yes" determination at step 930 to proceed to step 935. The CPU executes processes described below at step 935.

The CPU sets the value of the increasing coefficient for second cylinder kRich(2) to "1+A+B."

The CPU sets the value of the decreasing coefficient for second cylinder kLean(2) to "1−A."

The CPU sets each of the values of the increasing coefficient for first cylinder kRich(1), the increasing coefficient for third cylinder kRich(3), and the increasing coefficient for fourth cylinder kRich(4) to the increasing coefficient base value "1+A."

The CPU sets each of the values of the decreasing coefficient for first cylinder kLean(1), the decreasing coefficient for third cylinder kLean(3), and the decreasing coefficient for fourth cylinder kLean(4) to the decreasing coefficient base value "1−A."

As a result, if the base fuel injection amount Fb(N) is constant, the post-correction base fuel injection amount Fbh(2) for the second cylinder becomes larger than the post-correction base fuel injection amount Fbh(M) for the Mth cylinder (M is 1, 3, and 4) (that is, it becomes "(1+A+B)/(1+A)" times larger), by means of the process of step 750 shown in FIG. 7. Accordingly, when the value of the rich request flag Xrichreq is "1", only the cylinder-by-cylinder air-fuel ratio of the second cylinder is set to the air-fuel ratio smaller than the cylinder-by-cylinder air-fuel ratio of the remaining cylinders. That is, only the air-fuel ratio of the second cylinder is enriched.

It should be noted that the decreasing coefficient for Nth cylinder kLean(N) (N is an integer from 1 to 4) is set to the decreasing coefficient base value "1−A", and thus, the post-correction base fuel injection amounts Fbh(N) are set to the same value as each other as long as the base fuel injection amounts Fb(N) remain unchanged, by means of the process of step 755 shown in FIG. 7. Accordingly, when the value of the rich request flag Xrichreq is "0", the cylinder-by-cylinder air-fuel ratios are set to the same lean air-fuel ratio as each other for all of the cylinders.

At this stage, when the CPU starts the process from step 1000 shown in FIG. 10, the CPU makes "Yes" determinations at both step 1005 and step 1010, and makes a "No" determination at step 1015 to proceed to step 1035, at which the CPU determines whether or not the value of the second cylinder enrich flag X2 is "1." At this point in time, the value of the second cylinder enrich flag X2 is "1."

Therefore, the CPU makes a "Yes" determination at step 1035 to proceed to step 1040, at which the CPU executes processes of calculating the stored oxygen amount OSAkz and the released oxygen amount OSAhs according to the formulas (1) and (2) described above, and of calculating their mean value as a "mean oxygen storage amount OSA(2) for the second cylinder."

Thereafter, the CPU proceeds to step 1045 to determine whether the calculation for the stored oxygen amount OSAkz, the released oxygen amount OSAhs, and the mean oxygen storage amount OSA(2) has been completed. If the calculation has not yet been completed, the CPU makes a "No" determination at step 1045 to directly proceed to step 1095 to end the present routine tentatively.

By repetition of those processes, the calculation for the stored oxygen amount OSAkz, the released oxygen amount OSAhs, and the mean oxygen storage amount OSA(2) has been completed. Accordingly, when the CPU proceeds to step 1045, the CPU makes a "Yes" determination at step 1045 to proceed to step 1050, at which the CPU sets the value of the third cylinder enrich flag X3 to "1", and sets each value of the first cylinder enrich flag X1, the second cylinder enrich flag X2, and the fourth cylinder enrich flag X4 to "0". Thereafter, the CPU proceeds to step 1095 to end the present routine tentatively.

As a result, since the value of the third cylinder enrich flag X3 is set to "1", the CPU makes "No" determinations at step 920, step 930, and step 950 shown in FIG. 9, and makes a "Yes" determination at step 940 to proceed to step 945. The CPU executes processes described below at step 945.

The CPU sets the value of the increasing coefficient for third cylinder kRich(3) to "1+A+B."

The CPU sets the value of the decreasing coefficient for third cylinder kLean(3) to "1−A."

The CPU sets each of the values of the increasing coefficient for first cylinder kRich(1), the increasing coefficient for second cylinder kRich(2), and the increasing coefficient for fourth cylinder kRich(4) to the increasing coefficient base value "1+A."

The CPU sets each of the values of the decreasing coefficient for first cylinder kLean(1), the decreasing coefficient for second cylinder kLean(2), and the decreasing coefficient for fourth cylinder kLean(4) to the decreasing coefficient base value "1−A."

As a result, if the base fuel injection amount Fb(N) is constant, the post-correction base fuel injection amount Fbh(3) for the third cylinder becomes larger than the post-correction base fuel injection amount Fbh(M) for the Mth cylinder (M is 1, 2, and 4) (that is, it becomes "(1+A+B)/(1+A)" times larger), by means of the process of step 750 shown in FIG. 7. Accordingly, when the value of the rich request flag Xrichreq is "1", only the cylinder-by-cylinder air-fuel ratio of the third cylinder is set to the air-fuel ratio smaller than the cylinder-by-cylinder air-fuel ratio of the remaining cylinders. That is, only the air-fuel ratio of the third cylinder is enriched.

It should be noted that the decreasing coefficient for Nth cylinder kLean(N) (N is an integer from 1 to 4) is set to the decreasing coefficient base value "1−A", and thus, the post-correction base fuel injection amounts Fbh(N) are set to the same value as each other as long as the base fuel injection amounts Fb(N) remain unchanged, by means of the process of step 755 shown in FIG. 7. Accordingly, when the value of the rich request flag Xrichreq is "0", the cylinder-by-cylinder air-fuel ratios are set to the same lean air-fuel ratio as each other for all of the cylinders.

At this stage, when the CPU starts the process from step 1000 shown in FIG. 10, the CPU makes "Yes" determinations at both step 1005 and step 1010, and makes "No" determinations at both step 1015 and step 1035 to proceed to step 1055, at which the CPU determines whether or not the value of the third cylinder enrich flag X3 is "1." At this point in time, the value of the third cylinder enrich flag X3 is "1."

Therefore, the CPU makes a "Yes" determination at step 1055 to proceed to step 1060, at which the CPU executes processes of calculating the stored oxygen amount OSAkz and the released oxygen amount OSAhs according to the formulas (1) and (2) described above, and of calculating their mean value as a "mean oxygen storage amount OSA(3) for the third cylinder."

Thereafter, the CPU proceeds to step 1065 to determine whether the calculation for the stored oxygen amount OSAkz, the released oxygen amount OSAhs, and the mean oxygen storage amount OSA(3) has been completed. If the calculation has not yet been completed, the CPU makes a "No" determination at step 1065 to directly proceed to step 1095 to end the present routine tentatively.

By repetition of those processes, the calculation for the stored oxygen amount OSAkz, the released oxygen amount OSAhs, and the mean oxygen storage amount OSA(3) has been completed. Accordingly, when the CPU proceeds to step 1065, the CPU makes a "Yes" determination at step 1065 to proceed to step 1070, at which the CPU sets the value of the fourth cylinder enrich flag X4 to "1", and sets each value of the first cylinder enrich flag X1, the second cylinder enrich flag X2, and the third cylinder enrich flag X3 to "0". Thereafter, the CPU proceeds to step 1095 to end the present routine tentatively.

As a result, the value of the fourth cylinder enrich flag X4 is set to "1", the CPU makes "No" determinations at step 920, step 930, and step 940 shown in FIG. 9, and makes a "Yes" determination at step 950 to proceed to step 955. The CPU executes processes described below at step 955.

The CPU sets the value of the increasing coefficient for fourth cylinder kRich(4) to "1+A+B."

The CPU sets the value of the decreasing coefficient for fourth cylinder kLean(4) to "1−A."

The CPU sets each of the values of the increasing coefficient for first cylinder kRich(1), the increasing coefficient for second cylinder kRich(2), and the increasing coefficient for third cylinder kRich(3) to the increasing coefficient base value "1+A."

The CPU sets each of the values of the decreasing coefficient for first cylinder kLean(1), the decreasing coefficient for second cylinder kLean(2), and the decreasing coefficient for third cylinder kLean(3) to the decreasing coefficient base value "1−A."

As a result, if the base fuel injection amount Fb(N) is constant, the post-correction base fuel injection amount Fbh(4) for the fourth cylinder becomes larger than the post-correction base fuel injection amount Fbh(M) for the Mth cylinder (M is 1, 2, and 3) (that is, it becomes "(1+A+B)/(1+A)" times larger), by means of the process of step 750 shown in FIG. 7. Accordingly, when the value of the rich request flag Xrichreq is "1", only the cylinder-by-cylinder air-fuel ratio of the fourth cylinder is set to the air-fuel ratio smaller than the cylinder-by-cylinder air-fuel ratio of the remaining cylinders. That is, only the air-fuel ratio of the fourth cylinder is enriched.

It should be noted that the decreasing coefficient for Nth cylinder kLean(N) (N is an integer from 1 to 4) is set to the decreasing coefficient base value "1−A", and thus, the post-correction base fuel injection amounts Fbh(N) are set to the same value as each other as long as the base fuel injection amounts Fb(N) remain unchanged, by means of the process of step 755 shown in FIG. 7. Accordingly, when the value of the rich request flag Xrichreq is "0", the cylinder-by-cylinder air-fuel ratios are set to the same lean air-fuel ratio as each other for all of the cylinders.

At this stage, when the CPU starts the process from step 1000 shown in FIG. 10, the CPU makes "Yes" determinations at both step 1005 and step 1010, and makes "No" determinations at step 1015, step 1035, and step 1055. Then, the CPU proceeds to step 1075 to execute processes of calculating the stored oxygen amount OSAkz and the released oxygen amount OSAhs according to the formulas (1) and (2) described above, and of calculating their mean value as a "mean oxygen storage amount OSA(4) for the fourth cylinder."

Thereafter, the CPU proceeds to step 1080 to determine whether the calculation for the stored oxygen amount OSAkz, the released oxygen amount OSAhs, and the mean oxygen storage amount OSA(4) has been completed. If the calculation has not yet been completed, the CPU makes a "No" determination at step 1080 to directly proceed to step 1095 to end the present routine tentatively.

By repetition of those processes, the calculation for the stored oxygen amount OSAkz, the released oxygen amount OSAhs, and the mean oxygen storage amount OSA(4) has been completed. Accordingly, when the CPU proceeds to step 1080, the CPU makes a "Yes" determination at step 1080 to proceed to step 1085, at which the CPU sets the each of the values of the first to fourth cylinder enrich flags X1-X4 to "0". Thereafter, the CPU proceeds to step 1090 determines the gas-reaching-strength of each of the cylinders based on the mean oxygen storage amount OSA(L) (L is 1, 2, 3, and 4). As described with reference to the table 1 above, the determination of/on the gas-reaching-strength is carried out as follows.

The CPU calculates a mean value OSAave of the mean oxygen storage amount OSA(1), the mean oxygen storage amount OSA(2), the mean oxygen storage amount OSA(3), and the mean oxygen storage amount OSA(4), according to a formula described below.

$$OSAave=[OSA(1)+OSA(2)+OSA(3)+OSA(4)]/4 \quad (3)$$

The CPU calculates a value obtained by subtracting each of the mean oxygen storage amounts OSA(L) (L is 1, 2, 3, and 4) from the mean value OSAave, with associating each value with the each cylinder (L). The calculated value (deviation degree) is a value representing/indicative of the influence/impact degree of the exhaust gas from each of the cylinders on/to the output value Voxs of the downstream air-fuel ratio sensor 56 (i.e., cylinder-by-cylinder influence degree indicating value EF(L)).

The CPU determines that the gas-reaching-strength is greater as the calculated value (deviation degree, cylinder-by-cylinder influence degree indicating value EF(L)) is larger. That is, the cylinder having the largest cylinder-by-cylinder influence degree indicating value EF(L) is identified/determined as the "gas most strongly reaching cylinder (gas most excellently reaching cylinder)", and the cylinder having the smallest cylinder-by-cylinder influence degree indicating value EF(L) is identified/determined as the "gas most weakly reaching cylinder (gas most poorly reaching cylinder)."

Thereafter, the CPU proceeds to step 1093 to set the gas-reaching-strength determination completion flag XFIN to "1", and proceeds to step 1095 to end the present routine tentatively. With the above operations, the mean oxygen storage amount OSA(L) serving as the fluctuation period correlated value, and the cylinder-by-cylinder influence degree indicating value EF(N) indicating the gas-reaching-strength of the exhaust gas discharged from each of the cylinders to the output value Voxs of the downstream air-fuel ratio sensor 56, are obtained.

It should be noted that the CPU may identify, as the "gas most excellently reaching cylinder", the Mth cylinder (M is one of integer from 1 to 4) corresponding to the smallest mean oxygen storage amount OSA(M) among the mean oxygen storage amounts OSA(L) serving as the fluctuation period correlated values (L is an integer from 1 to 4). Similarly, the CPU may identify, as the "gas most poorly reaching cylinder", the Pth cylinder (P is one of integer from 1 to 4) corresponding to the largest mean oxygen storage amount OSA(L) among the mean oxygen storage amounts OSA(L) serving as the fluctuation period correlated values (L is an integer from 1 to 4).

<Setting of the Cylinder-by-Cylinder Correction Gain in Accordance with the Gas-Reaching-Strength and the Operation Condition of the Engine>

After the gas-reaching-strength determination completion flag XFIN is set to "1" at step 1093 shown in FIG. 10, the CPU makes a "No" determination at step 905 shown in FIG. 9 to proceed to step 960. At step 960, the CPU sets/determines, based on the cylinder-by-cylinder influence degree indicating value EF(N) obtained as described above, the cylinder-by-cylinder correction gains (the increasing coefficient for Nth cylinder kRich(N) and the decreasing coefficient for Nth cylinder kLean(N), N is an integer from 1 to 4).

<<1. Cylinder-by-Cylinder Air-Fuel Control During an Enrich Control After Fuel Cut>>

The first control apparatus adjusts the cylinder-by-cylinder correction gains after the end of the fuel cut operation. More specifically, the first control apparatus more greatly decreases the increasing coefficient for Lth cylinder kRich(L) as the "influence/impact degree on the output value Voxs of the downstream air-fuel ratio sensor 56 of the exhaust gas of a certain Lth cylinder" indicated by the cylinder-by-cylinder influence degree indicating value EF(L) is greater (in other words, as the cylinder-by-cylinder influence degree indicating value EF(L) is larger).

Figure 12:
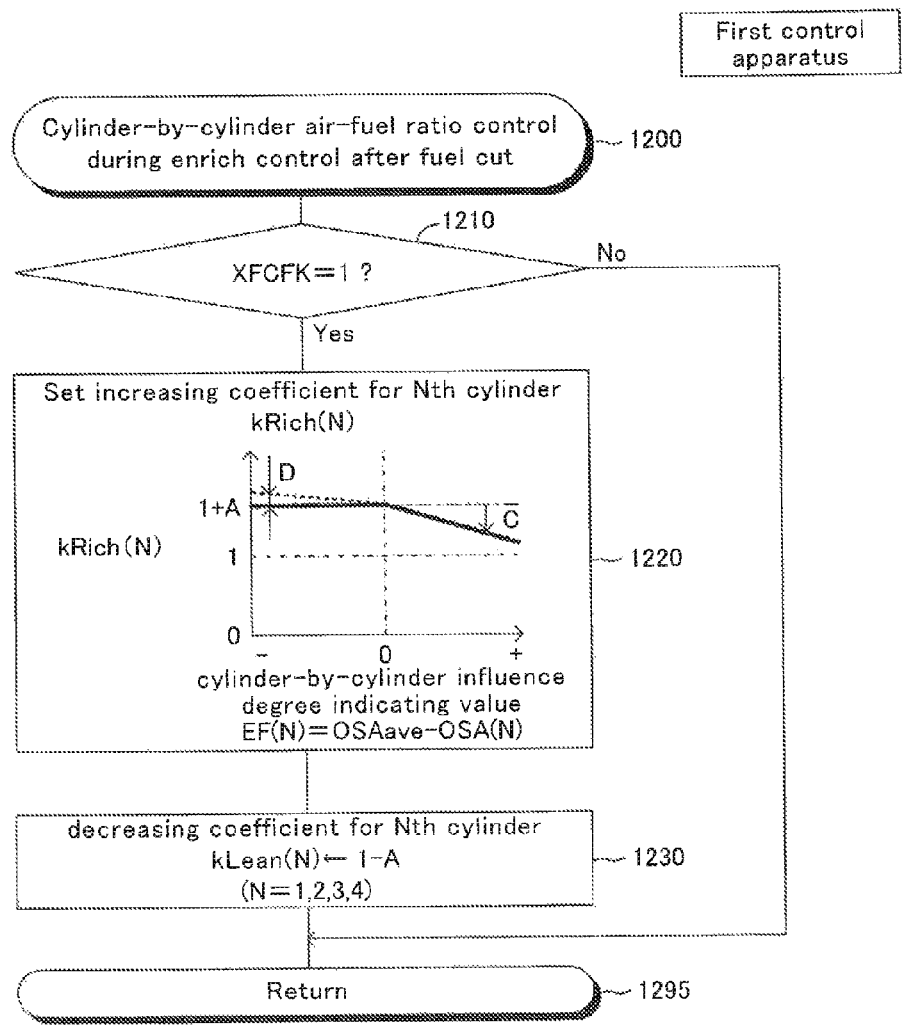
FIG. 12 is a flowchart showing a routine executed by the CPU of the first control apparatus.

For example, when the first cylinder is the gas most excellently reaching cylinder, the second and third cylinders are the gas normally reaching cylinders, and the fourth cylinder is the gas most poorly reaching cylinder, as indicated in the table 1 above, the first control apparatus sets each of "the increasing coefficient for second cylinder kRich(2) of the second cylinder which is the gas normally reaching cylinder, and the increasing coefficient for third cylinder kRich(3) of the third cylinder which is the gas normally reaching cylinder" to the increasing coefficient base value "1+A" (refer to a graph described in step 1220 of FIG. 12).

The first control apparatus sets the increasing coefficient for first cylinder kRich(1) of the first cylinder which is the gas most excellently reaching cylinder to a value "1+A−C" which is smaller than the increasing coefficient base value "1+A" by a positive value C. The value C is a value which becomes larger as the cylinder-by-cylinder influence degree indicating value EF(N) becomes larger, and is determined in such a manner that the value "1+A−C" is larger than "1." Therefore, the increasing coefficient for first cylinder kRich(1) becomes smaller within a range from "1" to the increasing coefficient base value "1+A", as the cylinder-by-cylinder influence degree indicating value EF(1) becomes larger.

Further, the first control apparatus sets the increasing coefficient for fourth cylinder kRich(4) of the fourth cylinder which is the gas most poorly reaching cylinder to the increasing coefficient base value "1+A."

In the mean time, the first control apparatus sets the decreasing coefficient for Nth cylinder kLean(N) (N is an integer from 1 to 4) to the decreasing coefficient base value "1−A" (refer to step 1230 shown in FIG. 12).

During the fuel cut operation, a great amount of oxygen flows into the catalyst 43. Accordingly, the oxygen storage amount of the catalyst 43 reaches the maximum oxygen storage amount Cmax. In order to get out of such a state, the increasing coefficient after fuel cut KFCFK is set to a value "1+FK" larger than "1" from a point in time at which the fuel cut operation ends/is terminated. The final fuel injection amount Fi(N) is therefore increased, and thus, the air-fuel ratio of the catalyst inflow gas is set to the rich air-fuel ratio. In this manner, the air-fuel ratio control in which the air-fuel ratio of the engine (air-fuel ratio of the catalyst inflow gas) is set to the rich air-fuel ratio is also referred to as an "enrich control after fuel cut", or a "fuel amount increasing control after fuel cut."

This enrich control after fuel cut decreases the oxygen storage amount of the catalyst 43. Accordingly, when a predetermined time period elapses after the end of the fuel cut operation, a part of the unburnt substances start to flow out downstream of the catalyst 43 without being purified by the catalyst 43. That is, a blowout of the unburnt substances occurs.

Consequently, the output value Voxs of the downstream air-fuel ratio sensor 56 changes from a value smaller than the stoichiometric air-fuel ratio corresponding voltage Vst to a value larger than the stoichiometric air-fuel ratio corresponding voltage Vst. At this point in time (i.e., when a lean-rich inversion point in time after the end of the fuel cut operation), the oxygen storage materials supported by the catalyst 43 have released oxygen, and thus is in a reduction condition. In view of this, the conventional apparatus sets the air-fuel ratio of the catalyst inflow gas to the lean air-fuel ratio at the lean-rich inversion point in time after the end of the fuel cut operation.

However, "noble (precious) metals serving as the catalytic materials (especially, rhodium etc.)" have not sufficiently become in a reduction condition at the lean-rich inversion point in time after the end of the fuel cut operation. That is, the noble metals are oxidized by a large amount of the oxygen during the fuel cut operation, and thus, a "greater amount of the unburnt substances (reducing agent)" are necessary in order for the noble metals to get out of this oxidized state than an amount of the unburnt substances required to release the "oxygen stored during the fuel cut operation" from the oxygen storage materials. Accordingly, if the air-fuel ratio of the catalyst inflow gas is switched to the lean air-fuel ratio at the "lean-rich inversion point in time after the end of the fuel cut operation", the purifying efficiency of the catalyst may thereafter be lowered since the noble metals have not sufficiently been reduced (i.e. the noble metals are in an oxygen poisoning state).

In view of the above, as described above, the CPU of the first control apparatus sets the increasing coefficient kRich(N) for the gas most excellently reaching cylinder (and, if necessary, for the cylinder having a gas-reaching-strength stronger than the standard strength) to the value "1+A−C" which is smaller than the increasing coefficient base value "1+A." In other words, assuming that the gas most excellently reaching cylinder is the Xth cylinder, the first control apparatus makes the "increasing coefficient kRich(X) for the Xth cylinder" smaller than the "increasing coefficient kRich(Y) for the Yth cylinder which is the remaining cylinder (Y is an integer from 1 to 4, but other than X)."

Consequently, as compared with the case in which the increasing coefficient kRich(N) for each of all of the cylinders is set to the increasing coefficient base value "1+A", the air-fuel ratio of the gas most excellently reaching cylinder is changed to a "value, which is still the rich air-fuel ratio, but which is closer to the stoichiometric air-fuel ratio compared to the other cylinders." Accordingly, an "ability of the exhaust gas discharged from the gas most excellently reaching cylinder to cause the output value Voxs of the downstream air-fuel ratio sensor 56 to change to a value corresponding to an air-fuel ratio richer than the stoichiometric air-fuel ratio" is diminished/weakened. Therefore, even if the blowout of the unburnt substances occurs while the enrich control after fuel cut is being carried out, a point in time is delayed at which the output value Voxs of the downstream air-fuel ratio sensor 56 changes to a value larger than the stoichiometric air-fuel ratio corresponding voltage Vst from a value smaller than the stoichiometric air-fuel ratio corresponding voltage Vst (i.e., the lean-rich inversion point in time after the end of the fuel cut operation is delayed).

Consequently, a greater amount of the unburnt substances are flowed into the catalyst 43 until the lean-rich inversion point in time after the end of the fuel cut operation comes, and thus, the noble metals supported by the catalyst 43 are sufficiently reduced. Accordingly, the first control apparatus can avoid lowering of the purifying capability of the catalyst 43 after the end of the fuel cut operation.

Further, the first control apparatus, during the fuel amount increasing control after fuel cut, may set the increasing coefficient kRich(Z) for the Zth cylinder having a gas-reaching-strength weaker than the standard strength (the second and the third cylinders, in the example shown in the table 1) to the value "1+A+D" which is larger than the increasing coefficient base value "1+A." In this case, the value D is positive, and preferably becomes larger as the cylinder-by-cylinder influence degree indicating value EF(Z) becomes smaller.

Even when the increasing coefficient kRich(Z) for the Zth cylinder having the weak (or, lowest, weakest) gas-reaching-strength is set to the value larger than the increasing coefficient base value "1+A", it is unlikely that the lean-rich inversion point in time after the end of the fuel cut operation occurs earlier. Accordingly, with the above setting, it is possible to have a "greater amount of the unburnt substances (reducing agents)" flow into the catalyst 43 during the fuel amount increasing control after fuel cut. Consequently, it is possible to more surely reduce the noble metals supported by the catalyst 43.

How the CPU sets the fuel cut flag XFC, the increasing coefficient after fuel cut KFCFK, the increasing coefficient for Nth cylinder kRich(N), and the decreasing coefficient for Nth cylinder kLean(N) will next be described with reference to FIGS. 11 to 13.

The CPU executes the "fuel cut condition determining routine" shown by the flowchart in FIG. 11, every time a predetermined time period elapses. Accordingly, at an appropriate point in time, the CPU starts the process from step 1100 of FIG. 11 to proceed to step 1110, at which the CPU determines whether or not the value of the fuel cut flag XFC at the present point in time is "0." That is, the CPU determines whether or not the present point in time is not in the fuel cut operation. It should be noted that the value of the fuel cut flag is set to "0" in the initial routine described above.

It is assumed that the value of the fuel cut flag XFC is "0." In this case, the CPU makes a "Yes" determination at step 1110 to proceed to step 1120, at which the CPU determines whether or not the fuel cut condition (fuel cut start condition) is satisfied.

More specifically, the fuel cut condition is satisfied, when the operation amount Accp of the accelerator pedal AP or the throttle valve opening TA is "0", and the engine rotational speed NE is equal to or higher than a fuel cut rotational speed NEFCth.

When the fuel cut condition is not satisfied, the CPU makes a "No" determination at step 1120 to directly proceed to step 1195 to end the present routine tentatively. In contrast, when the fuel cut condition is satisfied, the CPU makes a "Yes" determination at step 1120 to proceed to step 1130, at which the CPU sets the value of the fuel cut flag XFC to "1." Thereafter, the CPU proceeds to step 1195 to end the present routine tentatively. This causes the CPU to make a "No" determination at step 705 shown in FIG. 7 to directly proceed to step 795, and thus, the fuel cut operation is started.

Under this state (in the state in which the value of the fuel cut flag XFC is set to "1"), when the CPU again starts the process from step 1100, the CPU makes a "No" determination at step 1110. Subsequently, the CPU proceeds to step 1140 to determine whether or not the fuel cut termination condition is satisfied.

More specifically, the fuel cut termination condition is satisfied, when the operation amount Accp of the accelerator pedal AP or the throttle valve opening TA becomes a value other than "0", or when the engine rotational speed NE becomes equal to or lower than a fuel cut end rotational speed NErt, while the value of the fuel cut flag XFC is "1" (during the fuel cut operation). The fuel cut end rotational speed NErt is lower than the fuel cut rotational speed NEFCth by a positive predetermined rotational speed $\Delta NE$ (NErt=NEFCth$-\Delta NE$, $\Delta NE>0$).

When the fuel cut termination condition is not satisfied, the CPU makes a "No" determination at step 1140 to directly proceed to step 1195 to end the present routine tentatively.

In contrast, when the fuel cut termination condition is satisfied, the CPU makes a "Yes" determination at step 1140 to proceed to step 1150 to set the value of the fuel cut flag XFC to "0." This causes the CPU to make a "Yes" determination at step 705, and thus, the fuel cut operation ends so that the fuel injection (supplying the fuel to the engine 10) is resumed.

Subsequently, the CPU proceeds to step 1160 to set a value of a fuel cut operation end flag XFCFK to "1." The value of the fuel cut operation end flag XFCFK is set to "0" in the initial routine described above. The fuel cut operation end flag XFCFK indicates that the fuel cut operation ends and the enrich control after fuel cut is being carried out, when the value of the fuel cut operation end flag XFCFK is "1."

Subsequently, the CPU proceeds to step 1170 to set the value of the increasing coefficient after fuel cut KFCFK to a value "1+FK." The value FK is a positive value (e.g., 0.2). It should be noted that the value FK may be "0." Thereafter, the CPU proceeds to step 1195 to end the present routine tentatively.

Further, when the CPU proceeds to step 960 shown in FIG. 9, the CPU starts processes of a "routine of a cylinder-by-cylinder air-fuel ratio control for the enrich control after fuel cut" shown by a flowchart in FIG. 12 from step 1200.

That is, when the value of the gas-reaching-strength determination completion flag XFIN is set to "1", the CPU makes a "No" determination at step 905 to proceed to step 960, so as to proceed to step 1200 shown in FIG. 12. Subsequently, the CPU proceeds to step 1210 to determine whether or not the value of the fuel cut operation end flag XFCFK is "1."

When the value of the fuel cut operation end flag XFCFK is "0", the CPU makes a "No" determination at step 1210 to directly proceed to step 1295 to end the present routine tentatively.

In contrast, if the value of the fuel cut operation end flag XFCFK is "1" when the CPU executes the process of step 1210, the CPU makes a "Yes" determination at step 1210 to directly proceed to step 1220, at which the CPU sets the increasing coefficient for Nth cylinder kRich(N) based on the cylinder-by-cylinder influence degree indicating value EF(N), as described above.

More specifically, the CPU determines the increasing coefficient for Nth cylinder kRich(N) in such a manner that the increasing coefficient for Nth cylinder kRich(N) becomes smaller within a range between "1" and "1+A" as the cylinder-by-cylinder influence degree indicating value EF(N) (i.e., the gas-reaching-strength of the Nth cylinder) becomes larger, as shown by a solid line in the graph described in step 1220. It should be noted that the CPU sets the increasing coefficient for Nth cylinder kRich(N) to the increasing coefficient base value "1+A" when the cylinder-by-cylinder influence degree indicating value EF(N) is equal to or smaller than "0" (i.e., when the gas-reaching-strength of the Nth cylinder is the standard or lower than the standard).

Subsequently, the CPU proceeds to step 1230 to set the decreasing coefficient for Nth cylinder kLean(N) (N is an integer from 1 to 4) to the decreasing coefficient base value "1−A." Thereafter, the CPU proceeds to step 1295 to end the present routine tentatively.

Figure 13:
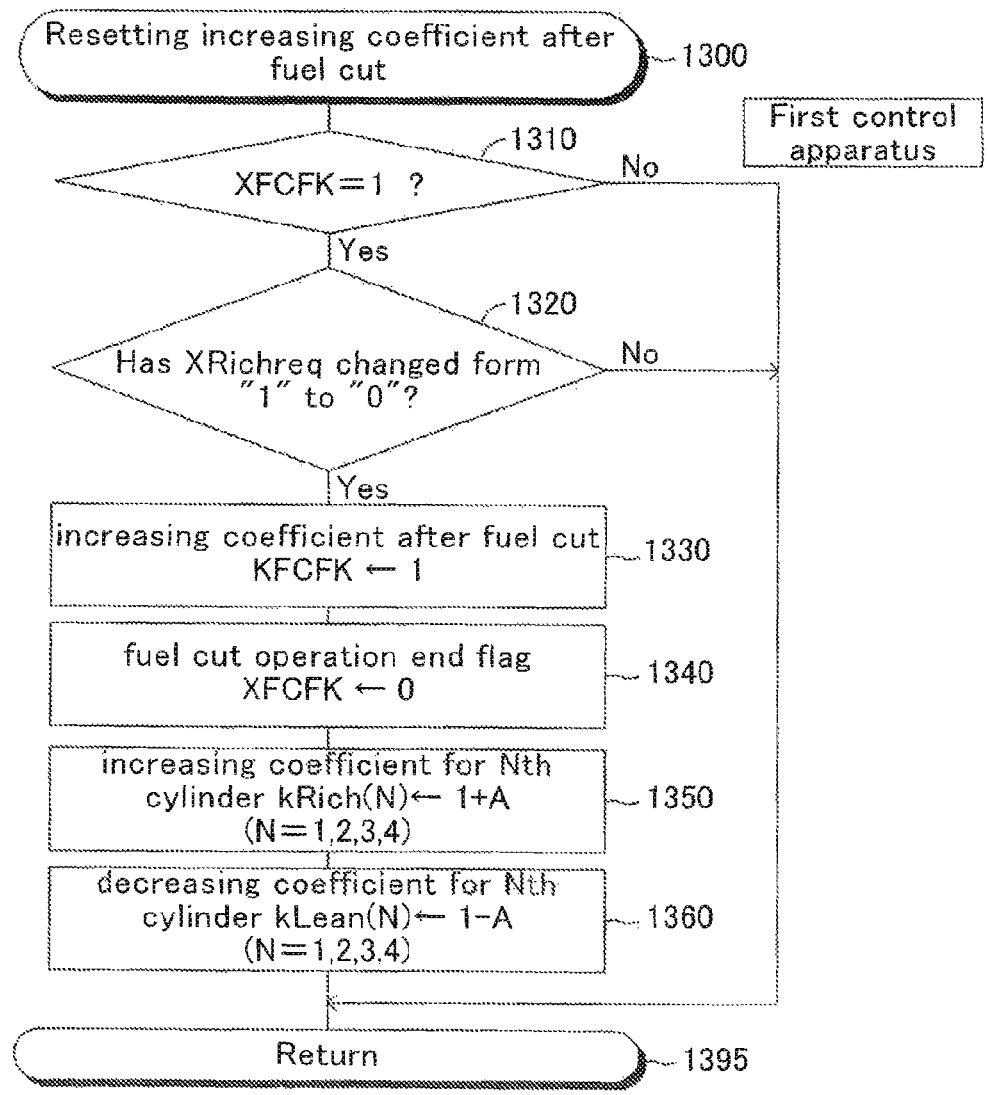
FIG. 13 is a flowchart showing a routine executed by the CPU of the first control apparatus.

Further, after the CPU finishes the processes of the routine shown in FIG. 12, the CPU starts processes of a "routine for resetting the increasing coefficient after fuel cut" shown by a flowchart in FIG. 13, from step 1300. Subsequently, the CPU proceeds to step 1310 to determine whether or not the value of the fuel cut operation end flag XFCFK is "1."

When the value of the fuel cut operation end flag XFCFK is "1", the CPU makes a "Yes" determination at step 1310 to proceed to step 1320, at which the CPU determines whether or not the present point in time is immediately after a point in time at which the value of the rich request flag Xrichreq has changed from "1" to "0" (that is, whether or not the inversion of the output value Voxs has just occurred, or the present point in time is immediately after the lean-rich inversion point in time after the end of the fuel cut operation). If the present point in time is immediately after the point in time at which the value of the rich request flag Xrichreq has changed from "1" to "0", the CPU makes a "Yes" determination at step 1320 to execute processes of steps from step 1330 to step 1360, described below, one after another, and proceeds to step 1395 to end the present routine tentatively.

Step 1330: The CPU returns the value of the increasing coefficient after fuel cut KFCFK to "1." This terminates the enrich control after fuel cut.

Step 1340: The CPU sets the value of the fuel cut operation end flag XFCFK to "0."

Step 1350: The CPU sets the increasing coefficient for Nth cylinder kRich(N) (N is an integer from 1 to 4) to the increasing coefficient base value "1+A."

Step 1360: The CPU sets the decreasing coefficient for Nth cylinder kLean(N) (N is an integer from 1 to 4) to the decreasing coefficient base value "1−A." Note that this step 1350 may be omitted.

It should be noted that, if the value of the fuel cut operation end flag XFCFK is not "1" (i.e., it is "0") when the CPU executes the process of step 1310, the CPU makes a "No" determination at step 1310 to directly proceed to step 1395 to end the present routine tentatively. In addition, when the lean-rich inversion after the end of the fuel cut operation has occurred even in a period in which the value of the gas-reaching-strength determination completion flag XFIN is "0", the CPU returns the value of the increasing coefficient after fuel cut KFCFK to "1", and sets the value of the fuel cut operation end flag XFCFK to "0."

Further, if the present point in time is not immediately after the point in time at which the value of the rich request flag Xrichreq has changed from "1" to "0" when the CPU executes the process of step 1320, the CPU makes a "No" determination at step 1320 to directly proceed to step 1395 to end the present routine tentatively. In this manner, the fuel cut flag XFC, the increasing coefficient after fuel cut KFCFK, the increasing coefficient for Nth cylinder kRich(N), and the decreasing coefficient for Nth cylinder kLean(N), and the like are set.

<<2. Cylinder-by-Cylinder Air-Fuel Ratio Control for Compensating for a Delay in the Air-Fuel Ratio Feedback Control>>

When the intake air amount Ga is very large (i.e., when the intake air amount Ga is equal to or larger than a high side (first) intake air amount threshold GaHith), a great amount of oxygen flows into the catalyst 43 when the air-fuel ratio of the catalyst inflow gas is the lean air-fuel ratio, and a great amount of unburnt substance flows into the catalyst 43 when the air-fuel ratio of the catalyst inflow gas is the rich air-fuel ratio. Accordingly, if the air-fuel ratio of the catalyst inflow gas can not be promptly/rapidly set to the rich air-fuel ratio when oxygen stats to flow out from the catalyst 43, a great amount of NOx may be discharged. Similarly, if the air-fuel ratio of the catalyst inflow gas can not be promptly/rapidly set to the lean air-fuel ratio when unburnt substance stats to flow out from the catalyst 43, a great amount of the unburnt substance may be discharged.

Meanwhile, an air-fuel ratio detecting element of the downstream air-fuel ratio sensor 56 inevitably has a "delay in the responsivity with respect to a change in the air-fuel ratio." In other words, when the air-fuel ratio of the exhaust gas reaching in the vicinity of the downstream air-fuel ratio sensor 56 has changed from the lean air-fuel ratio to the rich air-fuel ratio, or vive versa, the output value Voxs of the downstream air-fuel ratio sensor 56 does not rapidly/immediately change to a value corresponding to the air-fuel ratio which has changed.

Consequently, the response delay time of the downstream air-fuel ratio sensor 56 itself with respect to the change in the air-fuel ratio becomes relatively large to such a degree that the response delay time can not be ignored in terms of the feedback control of the air-fuel ratio. This causes a case in which the emission becomes worse.

In contrast, when the intake air amount Ga is very small (i.e., when the intake air amount Ga is equal to or smaller than a low side (second) intake air amount threshold GaLoth), it requires a relatively long time for the oxygen storage amount of the catalyst 43 reaches to the maximum oxygen storage amount Cmax or "0." Thus, a "dead time of the control" in the air-fuel ratio feedback control becomes longer, and consequently, the air-fuel ratio of the engine can not be accurately feedback-controlled. Especially, when the intake air amount Ga increases with a start of an acceleration operation in such a state, the emission may become worse.

In view of the above, the first control apparatus determines whether or not the intake air amount Ga is equal to or larger than the high side (first) intake air amount threshold GaHith which is extremely large", and whether or not the intake air amount Ga is equal to or smaller than the "low side (second) intake air amount threshold GaLoth which is extremely small."

In addition, when the first control apparatus determines that the intake air amount Ga is equal to or larger than the "high side intake air amount threshold GaHith or that the intake air amount Ga is equal to or smaller than the low side intake air amount threshold GaLoth, it adjusts/changes the cylinder-by-cylinder correction gain (increasing coefficient for Nth cylinder kRich(N) and decreasing coefficient for Nth cylinder kLean(N), N is an integer from 1 to 4). This control is also referred to as a "feedback period shortening control (cylinder-by-cylinder air-fuel ratio control for shortening a feedback period)", or a "cylinder-by-cylinder air-fuel ratio control for compensating for an air-fuel ratio feedback control delay."

More specifically, the first control apparatus makes the increasing coefficient for Lth cylinder kRich(L) larger and makes the decreasing coefficient for Lth cylinder kLean(L) smaller, as the "influence/impact degree on the output value Voxs of the downstream air-fuel ratio sensor 56 by/of the exhaust gas from the certain Lth cylinder" indicated by the cylinder-by-cylinder influence degree indicating value EF(L) is stronger (in other words, the cylinder-by-cylinder influence degree indicating value EF(N) becomes larger).

Figure 14:
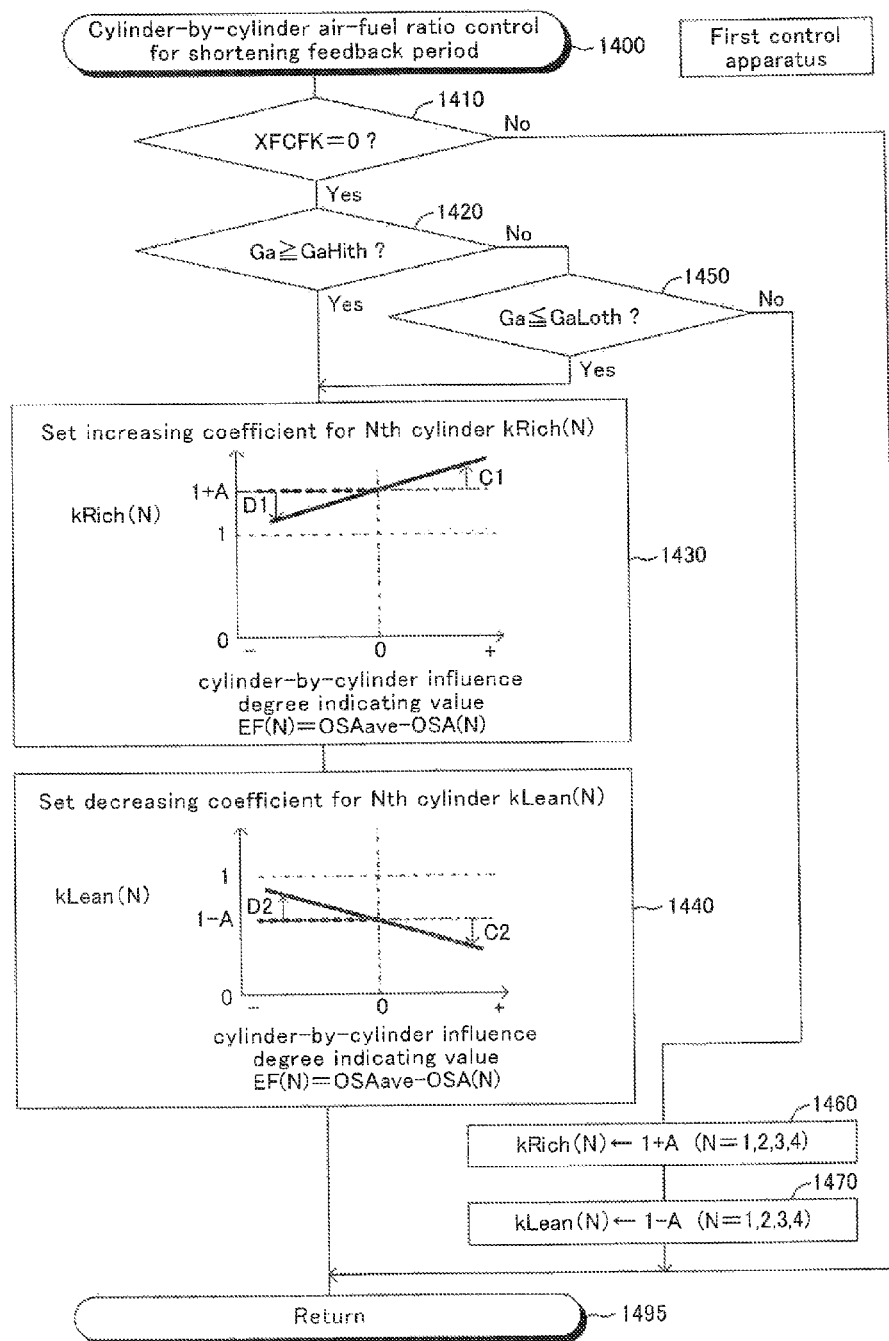
FIG. 14 is a flowchart showing a routine executed by the CPU of the first control apparatus.

For example, as described in the table 1, when the first cylinder is the "gas most excellently reaching cylinder", the second and third cylinders are the "gas normally reaching cylinders (cylinder whose cylinder-by-cylinder influence degree indicating value EF(L) is "0")", and the fourth cylinder is the "gas most poorly reaching cylinder", the first control apparatus sets each of "the increasing coefficient for second cylinder kRich(2) of the second cylinder which is the gas normally reaching cylinder, and the increasing coefficient for third cylinder kRich(3) of the third cylinder which is the gas normally reaching cylinder" to the increasing coefficient base value "1+A", as shown in a graph described in step 1430 of FIG. 14.

The first control apparatus sets the increasing coefficient for first cylinder kRich(1) of the first cylinder which is the gas most excellently reaching cylinder to a value "1+A+C1" which is larger than the increasing coefficient base value by a positive value C1, as shown by a solid line in the graph described in step 1430 of FIG. 14. The value C1 is a value which becomes larger as the cylinder-by-cylinder influence degree indicating value EF(N) becomes larger, and thus, the increasing coefficient for first cylinder kRich(1) becomes larger in a range larger than the increasing coefficient base value "1+A" as the cylinder-by-cylinder influence degree indicating value EF(1) becomes larger.

The first control apparatus sets the increasing coefficient for first cylinder kRich(4) of the first cylinder which is the gas most poorly reaching cylinder to a value "1+A−D1" which is smaller than the increasing coefficient base value by a positive value D1, as shown by the solid line in the graph described in step 1430 of FIG. 14. The value D1 is a value which becomes larger as the cylinder-by-cylinder influence degree indicating value EF(N) becomes smaller, and is determined in such a manner that the value "1+A−D1" is always larger than "1." Thus, the increasing coefficient for fourth cylinder kRich(4) becomes smaller in a range between "1" and the increasing coefficient base value "1+A" as the cylinder-by-cylinder influence degree indicating value EF(4) becomes smaller.

Furthermore, the first control apparatus sets each of "the decreasing coefficient for second cylinder kLean(2) of the second cylinder which is the gas normally reaching cylinder, and the decreasing coefficient for third cylinder kLean(3) of the third cylinder which is the gas normally reaching cylinder" to the decreasing coefficient base value "1−A", as shown by a solid line in a graph described in step 1440 of FIG. 14.

The first control apparatus sets the decreasing coefficient for first cylinder kLean(1) of the first cylinder which is the gas most excellently reaching cylinder to a value "1−A−C2" which is smaller than the decreasing coefficient base value "1−A" by a positive value C2, as shown by the solid line in the graph described in step 1440 of FIG. 14. The value C2 is a value which becomes larger as the cylinder-by-cylinder influence degree indicating value EF(N) becomes larger, and is determined in such a manner that the value "1−A−C2" is always larger than "0." Thus, the decreasing coefficient for first cylinder kLean(1) becomes smaller in a range between "0" and the decreasing coefficient base value "1−A" as the cylinder-by-cylinder influence degree indicating value EF(1) becomes larger.

The first control apparatus sets the decreasing coefficient for first cylinder kLean(4) of the fourth cylinder which is the gas most poorly reaching cylinder to a value "1−A+D2" which is larger than the decreasing coefficient base value "1−A" by a positive value D2, as shown by the solid line in the graph described in step 1440 of FIG. 14. The value D2 is a value which becomes larger as the cylinder-by-cylinder influence degree indicating value EF(N) becomes smaller, and is determined in such a manner that the value "1−A+D2" is always smaller than "1." Thus, the decreasing coefficient for fourth cylinder kLean(4) becomes larger in a range between "1" and the decreasing coefficient base value "1−A" as the cylinder-by-cylinder influence degree indicating value EF(4) becomes smaller.

According to the configuration above, when the rich request is occurring, the "air-fuel ratio of the gas relatively strongly reaching cylinder" is set to an air-fuel ratio richer (smaller) than the "air-fuel ratio of the gas relatively weakly reaching cylinder." Further, when the lean request is occurring, the "air-fuel ratio of the gas relatively strongly reaching cylinder" is set to an air-fuel ratio leaner (larger) than the "air-fuel ratio of the gas relatively weakly reaching cylinder."

Accordingly, the output value Voxs of the downstream air-fuel ratio sensor 56 promptly changes to a "value corresponding to an air-fuel ratio richer than the stoichiometric air-fuel ratio" when the rich request is occurring, and the output value Voxs of the downstream air-fuel ratio sensor 56 promptly changes to a "value corresponding to an air-fuel ratio leaner than the stoichiometric air-fuel ratio" when the lean request is occurring.

As a result, it becomes possible to promptly determine that the rich request or the lean request has occurred, in a case in which it is necessary to promptly determine that the rich request and the lean request have occurred due to the relatively large exhaust gas flow rate (in other words, in a case in which the response delay time of the downstream air-fuel ratio sensor 56 itself with respect to the change in the air-fuel ratio can not be ignored in terms of the feedback control of the air-fuel ratio), and in a case in which a time duration for the exhaust gas moves from the combustion chamber 21 to the downstream air-fuel ratio sensor 56 (transportation delay time of the exhaust gas) is long due to a minute exhaust gas flow rate, or the like. Consequently, it is possible to determine without delay that the rich request or the lean request has occurred, and/or the fluctuation period of the output value Voxs of the downstream air-fuel ratio sensor 56 (that is, a period corresponding to the inversion period described above, and expressed as the air-fuel ratio feedback control period) can be shortened. Accordingly, since the first control apparatus can appropriately control the catalyst inflow gas of the air-fuel ratio, the emission can be improved.

It should be noted that, as shown by a broken line in the graph at step 1430 shown in FIG. 14, the first control apparatus may set the increasing coefficient for Sth cylinder kRich (S) of the Sth cylinder whose gas-reaching-strength is weaker than the gas normally reaching cylinder to the increasing coefficient base value "1+A." Similarly, as shown by a broken line in the graph at step 1440 shown in FIG. 14, the first control apparatus may set the decreasing coefficient for Sth cylinder kLean(S) of the Sth cylinder whose gas-reaching-strength is weaker than the gas normally reaching cylinder to the decreasing coefficient base value "1−A."

Further, the first control apparatus may set the increasing coefficient for Xth cylinder kRich(X) of the Xth cylinder (X is an integer from 1 to 4) which is the gas most excellently reaching cylinder to a value "1+A+C1", and may set the increasing coefficient for Yth cylinder kRich(Y) of the Yth cylinder which is each of the remaining cylinders (Y is an integer from 1 to 4, and is other than X) to the increasing coefficient base value "1+A." Furthermore, the first control apparatus may set the decreasing coefficient for Xth cylinder kLean(X) of the Xth cylinder which is the gas most excellently reaching cylinder to a value "1−A−C2", and may set the decreasing coefficient for Yth cylinder kLean(Y) of the Yth cylinder which is each of the remaining cylinders to the decreasing coefficient base value "1−A." Moreover, the first control apparatus may set the increasing coefficient for Nth cylinder kRich(N) (N is an integer from 1 to 4) to the increasing coefficient base value "1+A", or may set the decreasing coefficient for Nth cylinder kLean(N) (N is an integer from 1 to 4) to the decreasing coefficient base value "1−A."

With reference to FIG. 14, operations of the CPU of the first control apparatus will next be described when the CPU performs the above described feedback period shortening control. The CPU executes a routine for the "cylinder-by-cylinder air-fuel ratio control for shortening the feedback period" shown by a flowchart in FIG. 14, after the processes of the routines shown in FIGS. 12 and 13 when it proceeds to step 960. Accordingly, at an appropriate point in time, the CPU starts the process from step 1400 shown in FIG. 14 to proceed to step 1410, at which the CPU determines whether or not the value fuel cut operation end flag XFCFK is "0."

When the value of the fuel cut operation end flag XFCFK is "1", the CPU makes a "No" determination at step 1410 to directly proceed to step 1495 to end the present routine tentatively.

In contrast, if the value of the fuel cut operation end flag XFCFK is "0" when the CPU executes the process of step 1410, the CPU makes a "Yes" determination at step 1410 to proceed to step 1420, at which the CPU determines whether or not the intake air amount Ga is equal to or higher than the high side intake air amount threshold (first intake air amount threshold) GaHith. The high side intake air amount threshold GaHith corresponds to an intake air amount Ga when the load KL of the engine is high.

It is assumed here that the intake air amount Ga is equal to or larger than the high side intake air amount threshold (first intake air amount threshold) GaHith. In this case, the CPU makes a "Yes" determination at step 1420 to proceed to step 1430, at which the CPU determines the increasing coefficient for Nth cylinder kRich(N) based on the cylinder-by-cylinder influence degree indicating value EF(N).

More specifically, as shown by the solid line in the graph in step 1430, the CPU determines the increasing coefficient for Nth cylinder kRich(N) in such a manner that the increasing coefficient for Nth cylinder kRich(N) becomes larger in a range larger than "1" as the cylinder-by-cylinder influence degree indicating value EF(N) of the Nth cylinder (N is an integer from 1 to 4) (i.e., gas-reaching-strength of the Nth cylinder) becomes larger. It should be noted that the CPU sets the increasing coefficient for Nth cylinder kRich(N) to the increasing coefficient base value "1+A" when the cylinder-by-cylinder influence degree indicating value EF(N) of the Nth cylinder is "0" (that is, when the gas-reaching-strength of the Nth cylinder is standard/normal).

Subsequently, the CPU proceeds to step 1440 to determine the decreasing coefficient for Nth cylinder kLean(N) in such a manner that the decreasing coefficient for Nth cylinder kLean(N) becomes smaller in a range smaller than "1" and larger than "0" as the cylinder-by-cylinder influence degree indicating value EF(N) of the Nth cylinder (N is an integer from 1 to 4) (i.e., gas-reaching-strength of the Nth cylinder) becomes larger, as shown by the solid line in the graph in step 1440. It should be noted that the CPU sets the decreasing coefficient for Nth cylinder kLean(N) to the decreasing coefficient base value "1−A" when the cylinder-by-cylinder influence degree indicating value EF(N) of the Nth cylinder is "0" (that is, when the gas-reaching-strength of the Nth cylinder is standard/normal). Thereafter, the CPU ends the present routine tentatively.

In contrast, if the intake air amount Ga is neither equal to nor larger than the high side intake air amount threshold when the CPU executes the process of step 1420, the CPU makes a "No" determination at step 1420 to proceed to step 1450 to determine whether or not the intake air amount Ga is equal to or smaller than the low side (second) intake air amount threshold GaLoth. The low side intake air amount threshold GaLoth corresponds to an intake air amount Ga when the load KL of the engine is extremely low. The low side intake air amount threshold GaLoth is therefore sufficiently smaller than the high side intake air amount threshold GaHith.

When the intake air amount Ga is equal to or smaller than the low side intake air amount threshold GaLoth, the CPU makes a "Yes" determination at step 1450 to sequentially executes the processes of step 1430 and step 1440 described above, and then proceeds to step 1495 to end the present routine tentatively.

In contrast, if the intake air amount Ga is neither equal to nor smaller than the low side intake air amount threshold GaLoth (that is, the intake air amount Ga is larger than the low side intake air amount threshold GaLoth and is smaller than high side intake air amount threshold GaHith) when the CPU executes the process of step 1450, the CPU makes a "No" determination at step 1450 to sequentially execute processes of step 1460 and step 1470 described below, and then proceeds to step 1495 to end the present routine tentatively.

Step 1460: The CPU sets the increasing coefficient for Nth cylinder kRich(N) (N is an integer from 1 to 4) to the increasing coefficient base value "1+A."

Step 1470: The CPU sets the decreasing coefficient for Nth cylinder kLean(N) (N is an integer from 1 to 4) to the decreasing coefficient base value "1−A."

As described above, the first control apparatus comprises:

a cylinder-by-cylinder mixture supplying section (refer to the fuel injection valves 25, and especially step 740 shown in FIG. 7) which is configured so as to supply a mixture to each of combustion chambers (21) of a plurality of the cylinders, and so as to be able to adjust a cylinder-by-cylinder air-fuel ratio which is an air-fuel ratio of the mixture supplied to each of the combustion chambers independently from each other among a plurality of the cylinders; and a cylinder-by-cylinder air-fuel ratio control section which is configured so as to determine, based on the output value Voxs of the downstream air-fuel ratio sensor 56, which air-fuel request is occurring, a rich request or a lean request, wherein the rich request is a request to set an air-fuel ratio of a catalyst inflow gas which is an exhaust gas flowing into the catalyst 43 to a rich air-fuel ratio which is an air-fuel ratio smaller than stoichiometric air-fuel ratio, and the lean request is a request to set the air-fuel ratio of the catalyst inflow gas to a lean air-fuel ratio which is an air-fuel ratio larger than the stoichiometric air-fuel ratio (refer to FIG. 8), and so as to control the cylinder-by-cylinder air-fuel ratio of each of a plurality of the cylinders in such a manner that the cylinder-by-cylinder air-fuel ratio of each of a plurality of the cylinders becomes an air-fuel ratio corresponding to the determined air-fuel ratio request (refer to, especially, step 735, step 745 to step 755 shown in FIG. 7, FIG. 9, etc.).

Figure 19:
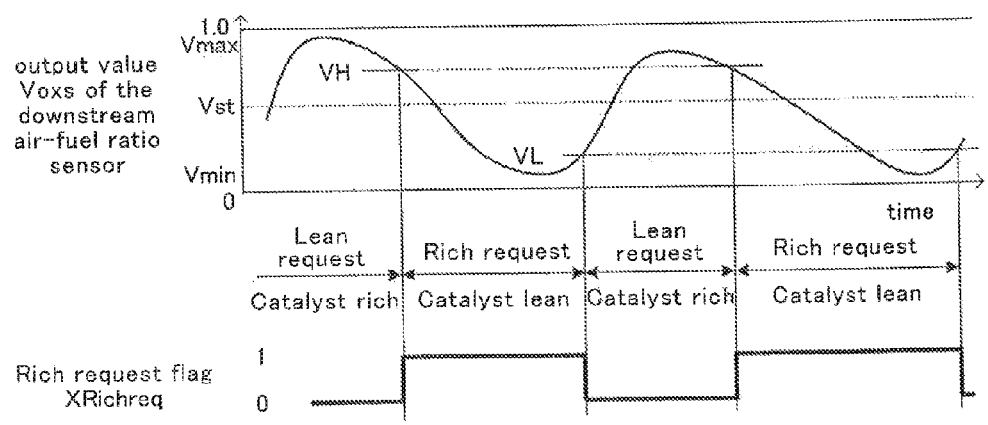
FIG. 19 is a timeline chart for describing operations when a CPU of an air-fuel ratio control apparatus according to a fifth modification of the present invention determines an air-fuel ratio request.

Further, in the first control apparatus, the cylinder-by-cylinder air-fuel ratio control section includes:

a fluctuation period correlated value obtaining section (refer to FIGS. 5, 9, 10, and so on) which is configured so as to repeatedly perform an operation to select, as a selected cylinder, one of a plurality of the cylinders, to change the cylinder-by-cylinder air-fuel ratio of each of a plurality of the cylinders in such a manner that a cylinder-by-cylinder air-fuel ratio of the selected cylinder becomes different from a cylinder-by-cylinder air-fuel ratio of each of remaining cylinders among the plurality of the cylinders, and to obtain, as a fluctuation period correlated value with respect to the selected cylinder, a value (mean oxygen storage amount OSA(N)) correlated with a fluctuation period of the output value of the downstream air-fuel ratio sensor, until a point in time at which each of all of the cylinders is selected as the selected cylinder; and a gas reaching strength determining section which is configured so as to determine, based on the obtained fluctuation period correlated value (mean oxygen storage amount OSA (N)) with respect to each of a plurality of the cylinders, the influence degree of the exhaust gas discharged from each of a plurality of the cylinders on the output value of the downstream air-fuel ratio sensor which the exhaust gas discharged from each of a plurality of the cylinders has (refer to step 550 in FIG. 5, step 1090 in FIG. 19, the table 1, and so on).

Accordingly, the first control apparatus can determine (obtain) the influence/impact degree on the output value Voxs of the downstream air-fuel ratio sensor 56 of the exhaust gas from each of the cylinders. Consequently, since the cylinder-by-cylinder air-fuel ratios can be controlled utilizing the influence/impact degree (cylinder-by-cylinder influence degree indicating value EF(N)) on the output value Voxs of the downstream air-fuel ratio sensor 56, the emission can be improved.

The gas reaching strength determining section includes a cylinder-by-cylinder influence degree indicating value obtaining section (refer to step 1090 shown in FIG. 10, and the table 1) which is configured so as to obtain, for each of a plurality of the cylinders, based on the obtained fluctuation period correlated value (mean oxygen storage amount OSA (N)) with respect to each of a plurality of the cylinders, a cylinder-by-cylinder influence degree indicating value EF(N) indicative of the influence degree on the output value of the downstream air-fuel ratio sensor of the exhaust gas discharged from each of a plurality of the cylinders; and the cylinder-by-cylinder air-fuel ratio control section includes a cylinder-by-cylinder air-fuel ratio correction section (refer to, especially step 1430 in FIG. 14, and step 750 in FIG. 7), which performs a feedback period shortening control to correct each of the cylinder-by-cylinder air-fuel ratios of a plurality of the cylinders, in such a manner that, in a period in which the rich request is occurring, a cylinder-by-cylinder air-fuel ratio of a "cylinder whose influence degree on the output value of the downstream air-fuel ratio sensor indicated by the cylinder-by-cylinder influence degree indicating value EF(N) is a first value" is smaller than a cylinder-by-cylinder air-fuel ratio of a "cylinder whose influence degree on the output value of the downstream air-fuel ratio sensor indicated by the cylinder-by-cylinder influence degree indicating value EF(N)" is a second value smaller than the first value."

It should be noted that the cylinder-by-cylinder air-fuel ratio correction section is also a section which corrects each of the cylinder-by-cylinder air fuel ratios of a plurality of the cylinders in such a manner that, in the period in which the rich request is occurring, a cylinder-by-cylinder air-fuel ratio of a "gas most excellently reaching cylinder which is identified based on the fluctuation period correlated value (mean oxygen storage amount OSA(N)) (cylinder whose cylinder-by-cylinder influence degree indicating value EF(N) is the largest among a plurality of the cylinders)" is smaller (richer) than a cylinder-by-cylinder air-fuel ratio of a cylinder other than the gas most excellently reaching cylinder among a plurality of said cylinders.

According to the configuration described above, the output value Voxs of the downstream air-fuel ratio sensor 56 promptly changes to a value corresponding to an air-fuel ratio richer than the stoichiometric air-fuel ratio. Consequently, it is possible to appropriately control the air-fuel ratio of the catalyst inflow gas in such a manner that a large amount of the unburnt substances which can not be purified do not flow into the catalyst 43. Accordingly, the emission can be improved.

Further, the cylinder-by-cylinder air-fuel ratio control section includes a cylinder-by-cylinder air-fuel ratio correction section (refer to, especially step 1440 in FIG. 14, and step 755 in FIG. 7), which performs a feedback period shortening control to correct each of the cylinder-by-cylinder air-fuel ratios of a plurality of the cylinders, in such a manner that, in a period in which the lean request is occurring, a cylinder-by-cylinder air-fuel ratio of a "cylinder whose influence degree on the output value of the downstream air-fuel ratio sensor indicated by the cylinder-by-cylinder influence degree indicating value EF(N) is a first value" is larger than a cylinder-by-cylinder air-fuel ratio of a "cylinder whose influence degree on the output value of the downstream air-fuel ratio sensor indicated by the cylinder-by-cylinder influence degree indicating value EF(N)" is a second value smaller than the first value."

It should be noted that the cylinder-by-cylinder air-fuel ratio correction section is also a section which corrects each of the cylinder-by-cylinder air fuel ratios of a plurality of the cylinders in such a manner that, in the period in which the lean request is occurring, a cylinder-by-cylinder air-fuel ratio of the identified gas most excellently reaching cylinder (cylinder whose cylinder-by-cylinder influence degree indicating value EF(N) is the largest among a plurality of the cylinders) is larger (leaner) than a cylinder-by-cylinder air-fuel ratio of a cylinder other than the gas most excellently reaching cylinder among a plurality of said cylinders.

According to the configuration described above, the output value Voxs of the downstream air-fuel ratio sensor 56 promptly changes to a value corresponding to an air-fuel ratio leaner than the stoichiometric air-fuel ratio. Consequently, it is possible to appropriately control the air-fuel ratio of the catalyst inflow gas in such a manner that a large amount of NOx which can not be purified does not flowed into the catalyst 43. Accordingly, the emission can be improved.

In addition, the first control apparatus includes a fuel cut section which performs the fuel cut operation (refer to FIG. 11, and the "No" determination at step 705 shown in FIG. 7).

Further, the cylinder-by-cylinder air-fuel ratio control section is configured to includes a cylinder-by-cylinder air-fuel ratio correction section configured:

so as to determine, based on the output value of the downstream air-fuel ratio sensor, whether or not the unburnt substances start to flow out downstream of the three-way catalyst after a point in time of an end of the fuel cut operation (step 1310 and step 1320, shown in FIG. 13); so as to perform a post fuel cut control to correct the cylinder-by-cylinder air-fuel ratio, during a post fuel cut period from a point in time of the end of the fuel cut operation to a point in time at which it is determined that the unburnt substances start to flow out downstream of the three-way catalyst (i.e., period in which the value of the fuel cut operation end flag XFCFK is "1"), in such a manner that a cylinder-by-cylinder air-fuel ratio of a "cylinder whose influence degree on the output value Voxs of the downstream air-fuel ratio sensor 56 indicated by the cylinder-by-cylinder influence degree indicating value EF(N) is a first value" is larger than a cylinder-by-cylinder air-fuel ratio of a "cylinder whose influence degree on the output value of the downstream air-fuel ratio sensor indicated by the cylinder-by-cylinder influence degree indicating value EF(N)" is a second value smaller than the first value", but is smaller than the stoichiometric air-fuel ratio.

It should be noted that the cylinder-by-cylinder air-fuel ratio correction section is also a section which corrects each of the cylinder-by-cylinder air fuel ratios in such a manner that the cylinder-by-cylinder air-fuel ratio of the "identified gas most excellently reaching cylinder (cylinder whose cylinder-by-cylinder influence degree indicating value EF(N) is the largest among a plurality of the cylinders)" is larger (leaner) than a cylinder-by-cylinder air-fuel ratio of a cylinder other than the gas most excellently reaching cylinder among a plurality of said cylinders, but is smaller than the stoichiometric air-fuel ratio.

According to the configuration described above, a point in time (point in time of occurrence of the lean request) is delayed, as compared to the conventional apparatus, at which the output value Voxs of the downstream air-fuel ratio sensor 56 changes to a value corresponding to an air-fuel ratio richer than the stoichiometric air-fuel ratio from a value corresponding to an air-fuel ratio leaner than the stoichiometric air-fuel ratio after the end of the fuel cut operation. Accordingly, a sufficiently large amount of the unburnt substances that are necessary to reduce the noble metals of the catalyst 43 can be flowed into the catalyst in the post fuel cut period. Consequently, it can be avoided that the "purifying capacity of the catalyst 43 lowers due to the state in which the noble metals are not reduced" after the fuel cut operation.

It should be noted that the CPU of the first control apparatus may stores the cylinder-by-cylinder influence degree indicating value EF(N) (N is an integer from 1 to 4) into the backup RAM, and may perform the cylinder-by-cylinder air-fuel ratio control based on the cylinder-by-cylinder influence degree indicating value EF(N) stored in the backup RAM until the cylinder-by-cylinder influence degree indicating value EF(N) is newly obtained after a next start of the engine 10.

(Modification of the First Control Apparatus)

A modification of the first control apparatus will next be described. This modification always maintains the increasing coefficient after fuel cut KFCFK at "1." In other words, the increasing coefficient after fuel cut KFCFK is not used in this modification.

As described above, the oxygen storage amount of the catalyst 43 reaches the maximum oxygen storage amount Cmax during the fuel cut operation, and thus, the output value Voxs immediately after the end of the fuel cut operation is smaller than the stoichiometric air-fuel ratio corresponding voltage Vst. Accordingly, the value of the rich request flag Xrichreq is set to "1" at step 810 shown in FIG. 8, and thus, the CPU makes a "Yes" determination at step 745 shown in FIG. 7 to proceed to step 750. Consequently, the base fuel injection amount Fb(N) is increased by the increasing coefficient for Nth cylinder kRich(N), and thus, the air-fuel ratio of the catalyst inflow gas is set to the rich air-fuel ratio even when the value of the increasing coefficient after fuel cut KFCFK is "1." The other features are similar to the first control apparatus.

That is, the cylinder-by-cylinder air-fuel ratio correction section of the first control apparatus described above is configured so as to correct the cylinder-by-cylinder air-fuel ratio in such a manner that a "mean value of the cylinder-by-cylinder air-fuel ratios of a plurality of the cylinders during the post fuel cut period" is smaller than (becomes an air-fuel ratio smaller than) a "mean value of the cylinder-by-cylinder air-fuel ratios of a plurality of the cylinders when the rich request is occurring after the post fuel cut period."

According to the configuration, it is possible to supply a sufficient amount of the unburnt substances (reduction materials) to the catalyst 43 during the post fuel cut period, and to shift the condition of the catalyst 43 to the normal condition within a short period of time after the end of the fuel cut.

In contrast, the cylinder-by-cylinder air-fuel ratio correction section of the modification of the first control apparatus is configured so as to correct the cylinder-by-cylinder in such a manner that the "mean value of the cylinder-by-cylinder air-fuel ratios of a plurality of the cylinders during the post fuel cut period" becomes an air-fuel ratio equal to the "mean value of the cylinder-by-cylinder air-fuel ratios of a plurality of the cylinders when the rich request is occurring after the post fuel cut period."

Second Embodiment

An air-fuel ratio control apparatus (hereinafter simply referred to as a "second control apparatus") of the second embodiment according to the present invention will next be described. The second control apparatus obtains the cylinder-by-cylinder influence degree indicating value EF(N), similarly to the first control apparatus. The second control apparatus is different from the first control apparatus in that the second control apparatus performs, based on the cylinder-by-cylinder influence degree indicating value EF(N), a "cylinder-by-cylinder air-fuel ratio control (control hunting preventing control) for preventing hunting of the air-fuel ratio feedback control." Accordingly, the different points will mainly be described hereinafter.

When the maximum oxygen storage amount Cmax of the upstream catalyst 43 becomes small in a case in which the upstream catalyst 43 is deteriorated, a fluctuation period of the output value Voxs of the downstream air-fuel ratio sensor 56 (period, which corresponds to the above described inversion period, and which can be expressed as an air-fuel ratio feedback control period) becomes short. Accordingly, if the cylinder-by-cylinder air-fuel ratios are set to the same value as each other, the output value Voxs of the downstream air-fuel ratio sensor 56 responds highly sensitively to the air-fuel ratio of the exhaust gas of the gas excellently reaching cylinder. Consequently, the air-fuel ratio of the engine 10 greatly fluctuates/vibrates (shows hunting), and thus, the emission becomes worse.

In view of the above, the second control apparatus obtains the maximum oxygen storage amount Cmax of the catalyst 43, determines whether or not the maximum oxygen storage amount Cmax is smaller than a maximum oxygen storage amount threshold Cmaxth, and makes the increasing coefficient for Lth cylinder kRich(L) smaller and makes the decreasing coefficient for Lth cylinder kLean(L) larger as an "influence/impact degree on the output value Voxs of the downstream air-fuel ratio sensor 56 which an exhaust gas of a certain Lth cylinder (L is an integer from 1 to 4) has" which is indicated by the cylinder-by-cylinder influence degree indicating value EF(L) becomes stronger (in other words, as the cylinder-by-cylinder influence degree indicating value EF(L) becomes larger) when it is determined that the maximum oxygen storage amount Cmax is smaller than the maximum oxygen storage amount threshold Cmaxth.

Figure 15:
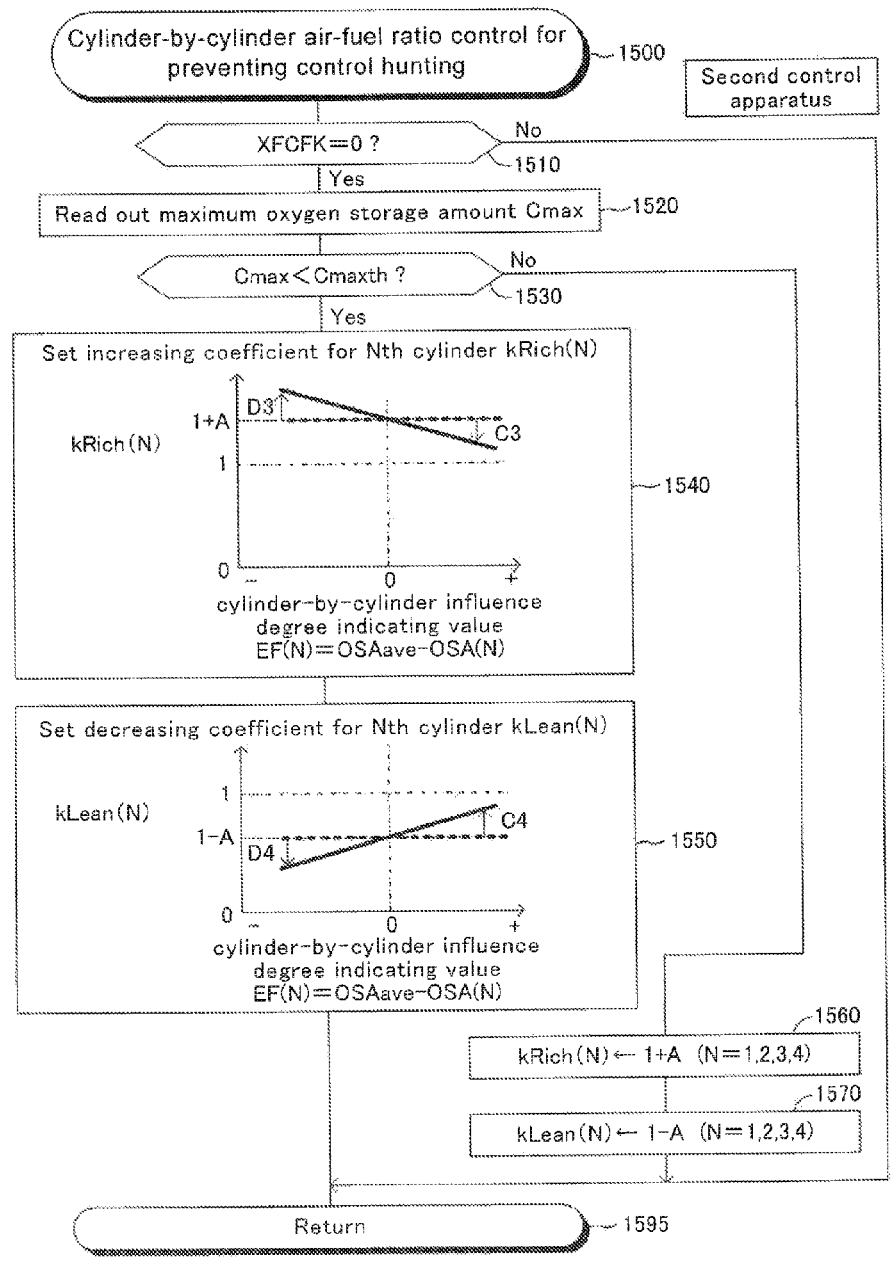
FIG. 15 is a flowchart showing a routine executed by a CPU of an air-fuel ratio control apparatus (second control apparatus) according to a second embodiment of the present invention.

For example, when the first cylinder is the gas most excellently reaching cylinder, the second and third cylinders are the gas normally reaching cylinders, and the fourth cylinder is the gas most poorly reaching cylinder, as indicated in the table 1 above, the second control apparatus sets, as shown by a solid line in a graph in step 1540 of FIG. 15, each of "the increasing coefficient for second cylinder kRich(2) of the second cylinder which is the gas normally reaching cylinder, and the increasing coefficient for third cylinder kRich(3) of the third cylinder which is the gas normally reaching cylinder" to the increasing coefficient base value "1+A."

The second control apparatus sets, as shown by the solid line in the graph in step 1540 of FIG. 15, the increasing coefficient for first cylinder kRich(1) of the first cylinder which is the gas most excellently reaching cylinder to a value "1+A−C3" which is smaller than the increasing coefficient base value "1+A" by a positive value C3. The value C3 is a value which becomes larger as the cylinder-by-cylinder influence degree indicating value EF(N) becomes larger, and is determined in such a manner that the value "1+A−C3" is larger than "1." Therefore, the increasing coefficient for first cylinder kRich(1) becomes smaller within a range from "1" to the increasing coefficient base value "1+A", as the cylinder-by-cylinder influence degree indicating value EF(1) becomes larger.

The second control apparatus sets, as shown by the solid line in the graph in step 1540 of FIG. 15, the increasing coefficient for fourth cylinder kRich(4) of the fourth cylinder which is the gas most poorly reaching cylinder to a value "1+A+D3" which is larger than the increasing coefficient base value "1+A" by a positive value D3. The value D3 is a value which becomes larger as the cylinder-by-cylinder influence degree indicating value EF(N) becomes smaller. Therefore, the increasing coefficient for fourth cylinder kRich(4) becomes larger within a range larger than the increasing coefficient base value "1+A", as the cylinder-by-cylinder influence degree indicating value EF(4) becomes smaller.

Further, the second control apparatus sets, as shown by a solid line in a graph in step 1550 of FIG. 15, each of "the decreasing coefficient for second cylinder kLean(2) of the second cylinder which is the gas normally reaching cylinder, and the decreasing coefficient for third cylinder kLean(3) of the third cylinder which is the gas normally reaching cylinder" to the decreasing coefficient base value "1−A."

The second control apparatus sets, as shown by the solid line in the graph in step 1550 of FIG. 15, the decreasing coefficient for first cylinder kLean(1) of the first cylinder which is the gas most excellently reaching cylinder to a value "1−A+C4" which is larger than the decreasing coefficient base value "1−A" by a positive value C4. The value C4 is a value which becomes larger as the cylinder-by-cylinder influence degree indicating value EF(N) becomes larger, and is determined in such a manner that the value "1−A+C4" is lsmaller than "1." Therefore, the decreasing coefficient for first cylinder kLean(1) becomes larger within a range from "1" to the decreasing coefficient base value "1−A", as the cylinder-by-cylinder influence degree indicating value EF(1) becomes larger.

The second control apparatus sets, as shown by the solid line in the graph in step 1550 of FIG. 15, the decreasing coefficient for fourth cylinder kLean(4) of the fourth cylinder which is the gas most poorly reaching cylinder to a value "1−A−D4" which is smaller than the decreasing coefficient base value "1−A" by a positive value D4. The value D4 is a value which becomes larger as the cylinder-by-cylinder influence degree indicating value EF(N) becomes smaller, and is determined in such a manner that the value "1−A−D4" is larger than "0." Therefore, the decreasing coefficient for fourth cylinder kLean(4) becomes smaller within a range from "0" to the decreasing coefficient base value "1−A", as the cylinder-by-cylinder influence degree indicating value EF(4) becomes smaller.

Consequently, the second control apparatus can have the "air-fuel ratio of the gas relatively strongly reaching cylinder" come closer to the stoichiometric air-fuel ratio, and have the "air-fuel ratio of the gas relatively weakly reaching cylinder" deviate more from the stoichiometric air-fuel ratio.

Accordingly, the influence/impact degree of the air-fuel ratio of the exhaust gas discharged from each of the cylinders on the output value Voxs of the downstream air-fuel ratio sensor 56 is equalized among the cylinders. As a result, when the rich request is occurring, and thus, when the exhaust gas having the rich air-fuel ratio is flowing into the catalyst 43, the output value Voxs of the downstream air-fuel ratio sensor 56 does not respond highly sensitively to the air-fuel ratio of the exhaust gas from the gas most excellently reaching cylinder, and therefore, the "point in time at which the output value Voxs of the downstream air-fuel ratio sensor 56 changes from a value corresponding to an air-fuel ratio leaner than the stoichiometric air-fuel ratio to a value corresponding to an air-fuel ratio richer than the stoichiometric air-fuel ratio" is delayed. Consequently, it is possible to lengthen the fluctuation period of the output value Voxs of the downstream air-fuel ratio sensor 56 (in other words, to lengthen the air-fuel ratio feedback control period).

Further, when the lean request is occurring, and thus, when the exhaust gas having the lean air-fuel ratio is flowing into the catalyst 43, the output value Voxs of the downstream air-fuel ratio sensor 56 does not respond highly sensitively to the air-fuel ratio of the exhaust gas from the gas most excellently reaching cylinder, and therefore, the "point in time at which the output value Voxs of the downstream air-fuel ratio sensor 56 changes from a value corresponding to an air-fuel ratio richer than the stoichiometric air-fuel ratio to a value corresponding to an air-fuel ratio leaner than the stoichiometric air-fuel ratio" is delayed. Consequently, it is possible to lengthen the fluctuation period of the output value Voxs of the downstream air-fuel ratio sensor 56 (in other words, to lengthen the air-fuel ratio feedback control period).

As a result, even when the maximum oxygen storage amount Cmax of the catalyst 43 becomes small, it is possible to prevent the cylinder-by-cylinder air-fuel ratio from greatly fluctuating (showing hunting), and thus, to prevent the emission from being worse.

(Actual Operation)

The CPU of the second control apparatus executes the routines shown in FIGS. 7 to 13. Further, when the CPU completes the processes of the routine shown in FIG. 13, the CPU is designed to execute a "cylinder-by-cylinder air-fuel ratio control routine for preventing the control hunting" shown in FIG. 15. Accordingly, at an appropriate point in time, the CPU starts the process from step 1500 to proceed to step 1510, at which the CPU determines whether or not the value of the fuel cut operation end flag XFCFK is "0."

When the value of the fuel cut operation end flag XFCFK is "1", the CPU makes a "No" determination at step 1510 to directly proceed to step 1595 to end the present routine tentatively.

In contrast, if the value of the fuel cut operation end flag XFCFK is "0" when the CPU executes the process of step 1510, the CPU makes a "Yes" determination at step 1510 to proceed to step 1520, at which the CPU reads out the maximum oxygen storage amount Cmax.

The maximum oxygen storage amount Cmax is a maximum amount of oxygen that the upstream catalyst 43 can store, and is separately obtained by a so-called "active air-fuel ratio control." The maximum oxygen storage amount Cmax becomes smaller as the deterioration of the upstream catalyst 43 progresses. The active air-fuel ratio control is a well-known control, as is disclosed in Japanese Patent Application Laid-Open (kokai) No. Hei 5-133264. For example, the maximum oxygen storage amount Cmax is obtained as follows.

When the temperature of the catalyst 43 is a predetermined temperature, the CPU continues to have the exhaust gas having the air-fuel ratio richer than the stoichiometric air-fuel ratio flow into the upstream catalyst 43 so as to have the oxygen storage amount of the upstream catalyst 43 coincide with "0." At that point in time, the output value Voxs of the downstream air-fuel ratio sensor 56 becomes the maximum output value max.

After that point in time, the CPU continues to have the exhaust gas having the air-fuel ratio leaner than the stoichiometric air-fuel ratio flow into the upstream catalyst 43, and obtains the maximum oxygen storage amount Cmax by calculating/estimating, based on the output value Vabyfs of the upstream air-fuel ratio sensor 55 and an fuel amount, an amount of oxygen which is stored into the three-way catalyst 43 (i.e., a change amount ΔOSA of the oxygen storage amount) and by accumulating the change amount ΔOSA of the oxygen storage amount, in a period from that point in time to a point in time at which the output value Voxs of the downstream air-fuel ratio sensor 56 becomes a value smaller than the stoichiometric air-fuel ratio corresponding voltage Vst. The change amount ΔOSA of the oxygen storage amount can be calculated according to a formula (=fuel amount per unit time)·0.23·(abyfs−stoich). The maximum oxygen storage amount Cmax is updated and stored into the backup RAM with the information of a temperature at which the maximum oxygen storage amount Cmax has been obtained, every time it is obtained.

Subsequently, the CPU proceeds to step 1530 to determine whether or not the maximum oxygen storage amount Cmax is smaller than the maximum oxygen storage amount threshold Cmaxth. When the maximum oxygen storage amount Cmax is smaller than the maximum oxygen storage amount threshold Cmaxth, the CPU makes a "Yes" determination at step 1530 to sequentially executes processes of step 1540 and step 1550, and then proceeds to step 1595 to end the present routine tentatively.

Step 1540: The CPU determines, based on the cylinder-by-cylinder influence degree indicating value EF(N), the increasing coefficient for Nth cylinder kRich(N). More specifically, as shown by a solid line in a graph in step 1540, the CPU determines the increasing coefficient for Nth cylinder kRich(N) in such a manner that the increasing coefficient for Nth cylinder kRich(N) becomes smaller in a range larger than "1" as the cylinder-by-cylinder influence degree indicating value EF(N) of the Nth cylinder (i.e., gas-reaching-strength of the Nth cylinder) becomes larger. It should be noted that the CPU sets the increasing coefficient for Nth cylinder kRich(N) to the increasing coefficient base value "1+A" when the cylinder-by-cylinder influence degree indicating value EF(N) of the Nth cylinder is "0" (that is, when the gas-reaching-strength of the Nth cylinder is standard/normal).

Step 1550: The CPU determines, based on the cylinder-by-cylinder influence degree indicating value EF(N), the decreasing coefficient for Nth cylinder kLean(N). More specifically, as shown by a solid line in a graph in step 1550, the CPU determines the decreasing coefficient for Nth cylinder kLean(N) in such a manner that the decreasing coefficient for Nth cylinder kLean(N) becomes larger in a range smaller than "1" as the cylinder-by-cylinder influence degree indicating value EF(N) of the Nth cylinder (i.e., gas-reaching-strength of the Nth cylinder) becomes larger. It should be noted that the CPU sets the decreasing coefficient for Nth cylinder kLean(N) to the decreasing coefficient base value "1−A" when the cylinder-by-cylinder influence degree indicating value EF(N) of the Nth cylinder is "0" (that is, when the gas-reaching-strength of the Nth cylinder is standard/normal).

In contrast, if the maximum oxygen storage amount Cmax is equal to or larger than the maximum oxygen storage amount threshold Cmaxth when the CPU executes the process of step 1530, the CPU makes a "No" determination at step 1530 to sequentially executes processes of step 1560 and step 1570, and then proceeds to step 1595 to end the present routine tentatively.

Step 1560: The CPU sets the increasing coefficient for Nth cylinder kRich(N) (N is an integer from 1 to 4) to the increasing coefficient base value "1+A."

Step 1570: The CPU sets the decreasing coefficient for Nth cylinder kLean(N) (N is an integer from 1 to 4) to the decreasing coefficient base value "1−A."

It should be noted that the second control apparatus may have "the increasing coefficient for Nth cylinder kRich(N) and the decreasing coefficient for Nth cylinder kLean(N)" come much closer to "1" (that is, may increase the values C3, D3, C4, and D4, shown in step 1540 and step 1550) as the maximum oxygen storage amount Cmax becomes smaller, if the gas-reaching-strength of the Nth cylinder is stronger than that of the gas normally reaching cylinder. In other words, the second control apparatus may have the cylinder-by-cylinder air-fuel ratio of the gas most excellently reaching cylinder come much closer to the stoichiometric air-fuel ratio, and may have the cylinder-by-cylinder air-fuel ratio of the gas most poorly reaching cylinder deviate more greatly from the stoichiometric air-fuel ratio, as the maximum oxygen storage amount Cmax becomes smaller.

As described above, the cylinder-by-cylinder air-fuel ratio control section of the second control apparatus comprises:

a maximum oxygen storage amount obtaining section which obtains the maximum oxygen storage amount Cmax of the three-way catalyst 43 (refer to step 1520 shown in FIG. 15); and a cylinder-by-cylinder air-fuel ratio correction section which corrects (i.e., which performs a control hunting preventing control) each of the cylinder-by-cylinder air-fuel ratios of a plurality of the cylinders in such a manner that, in a period in which the rich request is occurring, a cylinder-by-cylinder air-fuel ratio of a "cylinder whose influence/impact degree on the output value of the downstream air-fuel ratio sensor indicated by the cylinder-by-cylinder influence degree indicating value EF(N) is a first value" is larger than a cylinder-by-cylinder air-fuel ratio of a "cylinder whose influence/impact degree on the output value of the downstream air-fuel ratio sensor indicated by the cylinder-by-cylinder influence degree indicating value EF(N) is a second value smaller than the first value", is smaller than the stoichiometric air-fuel ratio, and becomes closer to the stoichiometric air-fuel ratio as the obtained maximum oxygen storage amount becomes smaller (refer to step 1530 and step 1540 shown in FIG. 15, and so on).

This cylinder-by-cylinder air-fuel ratio correction section is also a section which corrects each of the cylinder-by-cylinder air-fuel ratios of a plurality of the cylinders in such a manner that, in the period in which the rich request is occurring, the cylinder-by-cylinder air-fuel ratio of the "gas most excellently reaching cylinder (cylinder whose cylinder-by-cylinder influence degree indicating value EF(N) is the largest among a plurality of the cylinders)" is larger than a cylinder-by-cylinder air-fuel ratio of a "cylinder other than the gas most excellently reaching cylinder", is smaller than the stoichiometric air-fuel ratio, and becomes closer to the stoichiometric air-fuel ratio as the obtained maximum oxygen storage amount Cmax becomes smaller.

Further, the cylinder-by-cylinder air-fuel ratio correction section of the second control apparatus is configured so as to correct (i.e., perform a control hunting preventing control) each of the cylinder-by-cylinder air-fuel ratios of a plurality of the cylinders in such a manner that, in a period in which the lean request is occurring, a cylinder-by-cylinder air-fuel ratio of a "cylinder whose influence/impact degree on the output value of the downstream air-fuel ratio sensor indicated by the cylinder-by-cylinder influence degree indicating value EF(N) is a first value" is smaller than a cylinder-by-cylinder air-fuel ratio of a "cylinder whose influence/impact degree on the output value of the downstream air-fuel ratio sensor indicated by the cylinder-by-cylinder influence degree indicating value EF(N) is a second value smaller than the first value", is larger than the stoichiometric air-fuel ratio, and becomes closer to the stoichiometric air-fuel ratio as the obtained maximum oxygen storage amount becomes smaller (refer to step 1530 and step 1550 shown in FIG. 15, and so on).

This cylinder-by-cylinder air-fuel ratio correction section is also a section which corrects each of the cylinder-by-cylinder air-fuel ratios of a plurality of the cylinders in such a manner that, in the period in which the lean request is occurring, the cylinder-by-cylinder air-fuel ratio of the "gas most excellently reaching cylinder (cylinder whose cylinder-by-cylinder influence degree indicating value EF(N) is the largest among a plurality of the cylinders)" is smaller than a cylinder-by-cylinder air-fuel ratio of a "cylinder other than the gas most excellently reaching cylinder", is larger than the stoichiometric air-fuel ratio, and becomes closer to the stoichiometric air-fuel ratio as the obtained maximum oxygen storage amount Cmax becomes smaller.

This second control apparatus can delay "a point in time at which the output value Voxs of the downstream air-fuel ratio sensor 56 changes to a value corresponding to an air-fuel ratio leaner than the stoichiometric air-fuel ratio, and a point in time at which the output value Voxs of the downstream air-fuel ratio sensor 56 changes to a value corresponding to an air-fuel ratio richer than the stoichiometric air-fuel ratio" when the maximum oxygen storage amount Cmax becomes smaller due to the deterioration of the catalyst 43. Accordingly, the fluctuation period of the output value of the downstream air-fuel ratio sensor (in other words, air-fuel ratio feedback period) can be lengthened. Consequently, it can be avoided that the emission becomes worse when the catalyst 43 is deteriorated, and thus, the maximum oxygen storage amount Cmax becomes small.

Third Embodiment

An air-fuel ratio control apparatus (hereinafter simply referred to as a "third control apparatus") of the third embodiment according to the present invention will next be described. The third control apparatus obtains the cylinder-by-cylinder influence degree indicating value EF(N), similarly to the first control apparatus. The third control apparatus is different from the first control apparatus in that the third control apparatus performs, based on the cylinder-by-cylinder influence degree indicating value EF(N), a "cylinder-by-cylinder air-fuel ratio control for obtaining a parameter for determining an abnormality of the catalyst." Accordingly, the different point will mainly be described hereinafter.

Similarly to the second control apparatus, the third control apparatus performs a cylinder-by-cylinder air-fuel ratio control in such a manner that it makes the "air-fuel ratio of the gas relatively strongly reaching cylinder" come closer to the stoichiometric air-fuel ratio, and makes the "air-fuel ratio of the gas relatively weakly reaching cylinder" deviate more from the stoichiometric air-fuel ratio, during a period in which the parameter for determining an abnormality of the catalyst 43 (maximum oxygen storage amount Cmax) is being obtained.

That is, the third control apparatus sets the increasing coefficient for Nth cylinder kRich(N) to a value which becomes smaller in a range larger than "1" as the cylinder-by-cylinder influence degree indicating value EF(N) becomes larger, during the period in which the parameter for determining an abnormality of the catalyst 43 (maximum oxygen storage amount Cmax) is being obtained. It should be noted that the third control apparatus sets the increasing coefficient for Nth cylinder kRich(N) to the increasing coefficient base value "1+A" when the cylinder-by-cylinder influence degree indicating value EF(N) of the Nth cylinder is "0."

Further, the third control apparatus sets the decreasing coefficient for Nth cylinder kLean(N) to a value which becomes larger in a range smaller than "1" as the cylinder-by-cylinder influence degree indicating value EF(N) becomes larger, during the period in which the parameter for determining an abnormality of the catalyst 43 (maximum oxygen storage amount Cmax) is being obtained. It should be noted that the third control apparatus sets the decreasing coefficient for Nth cylinder kLean(N) to the decreasing coefficient base value "1−A" when the cylinder-by-cylinder influence degree indicating value EF(N) of the Nth cylinder is "0."

According to the configuration above, a state can be realized in which the gas strongly reaching cylinder and the gas weakly reaching cylinder discharge exhaust gases that have the substantially same influence/impact on the output value of the downstream air-fuel ratio sensor 56 as each other. Therefore, as compared to a case in which a specific cylinder has the strong influence/impact, the parameter for determining an abnormality of the catalyst 43 (maximum oxygen storage amount Cmax) can be obtained with high accuracy.

(Actual Operation)

The CPU of the third control apparatus executes the routines shown in FIGS. 7 to 13. Further, when the CPU completes the processes of the routine shown in FIG. 13, the CPU is designed to execute a "cylinder-by-cylinder air-fuel ratio control routine for obtaining the parameter for determining an abnormality of the catalyst" shown in FIG. 16. Accordingly, at an appropriate point in time, the CPU starts the process from step 1600 to proceed to step 1610, at which the CPU determines whether or not the value of the fuel cut operation end flag XFCFK is "0."

When the value of the fuel cut operation end flag XFCFK is "1", the CPU makes a "No" determination at step 1610 to directly proceed to step 1695 to end the present routine tentatively.

In contrast, if the value of the fuel cut operation end flag XFCFK is "0" when the CPU executes the process of step 1610, the CPU makes a "Yes" determination at step 1610 to proceed to step 1620, at which the CPU determines whether or not the present point in time is in a state in which the parameter for determining an abnormality of the catalyst (i.e., maximum oxygen storage amount Cmax) is being obtained.

It should be noted that the maximum oxygen storage amount Cmax is separately obtained according to the so-called "active air-fuel ratio control." In addition, the maximum oxygen storage amount Cmax serving as the parameter for determining an abnormality of the catalyst is obtained when a predetermined diagnosing condition is satisfied (for example, when the cooling water temperature THW is equal to or higher than a cooling water temperature threshold THWth, the intake air amount Ga is within a predetermined range, an estimated temperature of the catalyst 43 is within a predetermined temperature range, and a change amount ΔGa per unit time of the intake air amount Ga is equal to or smaller than a predetermined value, and so on).

When the present point in time is in the state in which the parameter for determining an abnormality of the catalyst (i.e., maximum oxygen storage amount Cmax) is being obtained, the CPU makes a "Yes" determination at step 1620 to sequentially execute processes step 1630 and step 1640 described below, and proceeds to step 1695 to end the present routine tentatively.

Step 1630: The CPU determines, based on the cylinder-by-cylinder influence degree indicating value EF(N), the increasing coefficient for Nth cylinder kRich(N). More specifically, as shown by a solid line in a graph in step 1630, the CPU determines the increasing coefficient for Nth cylinder kRich(N) in such a manner that the increasing coefficient for Nth cylinder kRich(N) becomes smaller in a range larger than "1" as the cylinder-by-cylinder influence degree indicating value EF(N) of the Nth cylinder (i.e., gas-reaching-strength of the Nth cylinder) becomes larger. It should be noted that the CPU sets the increasing coefficient for Nth cylinder kRich(N) to the increasing coefficient base value (rich side base gain) "1+A" when the cylinder-by-cylinder influence degree indicating value EF(N) of the Nth cylinder is "0" (that is, when the gas-reaching-strength of the Nth cylinder is standard/normal).

Step 1640: The CPU determines, based on the cylinder-by-cylinder influence degree indicating value EF(N), the decreasing coefficient for Nth cylinder kLean(N). More specifically, as shown by a solid line in a graph in step 1640, the CPU determines the decreasing coefficient for Nth cylinder kLean(N) in such a manner that the decreasing coefficient for Nth cylinder kLean(N) becomes larger in a range smaller than "1" as the cylinder-by-cylinder influence degree indicating value EF(N) of the Nth cylinder (i.e., gas-reaching-strength of the Nth cylinder) becomes larger. It should be noted that the CPU sets the decreasing coefficient for Nth cylinder kLean(N) to the decreasing coefficient base value (lean side base gain) "1−A" when the cylinder-by-cylinder influence degree indicating value EF(N) of the Nth cylinder is "0" (that is, when the gas-reaching-strength of the Nth cylinder is standard/normal).

In contrast, if the present point in time is not in the state in which the parameter for determining an abnormality of the catalyst is being obtained when the CPU executes the process of step 1620, the CPU makes a "No" determination at step 1620 to sequentially executes processes of step 1650 and step 1660, and then proceeds to step 1695 to end the present routine tentatively.

Step 1650: The CPU sets the increasing coefficient for Nth cylinder kRich(N) (N is an integer from 1 to 4) to the increasing coefficient base value "1+A."

Step 1660: The CPU sets the decreasing coefficient for Nth cylinder kLean(N) (N is an integer from 1 to 4) to the decreasing coefficient base value "1−A."

Figure 16:
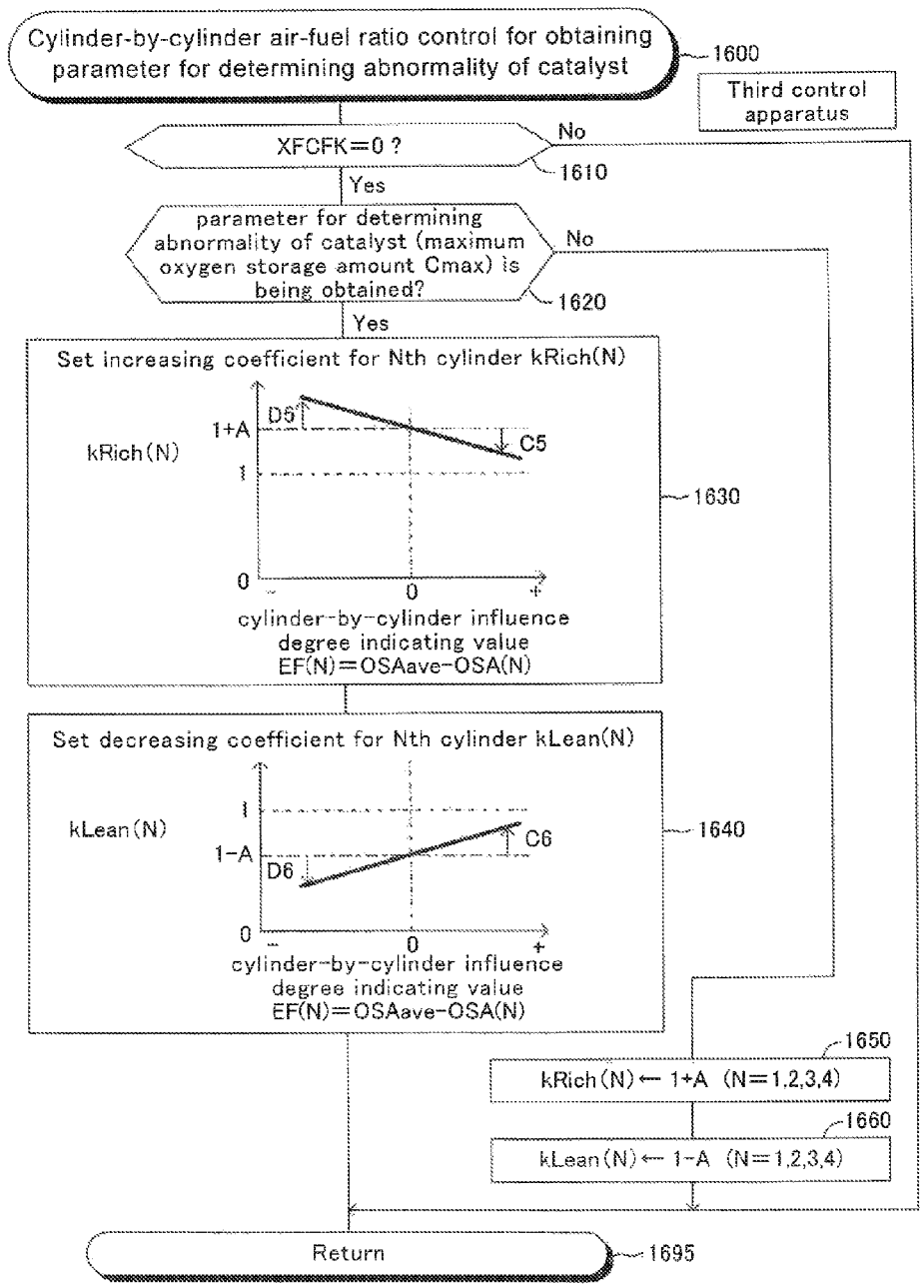
FIG. 16 is a flowchart showing a routine executed by a CPU of an air-fuel ratio control apparatus (third control apparatus) according to a third embodiment of the present invention.

As described above, the third control apparatus has the "air-fuel ratio of the gas relatively strongly reaching cylinder" come closer to the stoichiometric air-fuel ratio, and has the "air-fuel ratio of the gas relatively weakly reaching cylinder" deviate more from the stoichiometric air-fuel ratio in the period in which the parameter for determining an abnormality of the catalyst (i.e., maximum oxygen storage amount Cmax) is being obtained similarly to the second control apparatus (refer to FIG. 16). Accordingly, a case can be substantially obtained in which each of the cylinder discharges an exhaust gas having the substantially same influence/impact on the output value of the downstream air-fuel ratio sensor 56 as each other. Therefore, as compared to a case in which a specific cylinder has the strong influence/impact, the parameter for determining an abnormality of the catalyst 43 (maximum oxygen storage amount Cmax) can be obtained with high accuracy.

Fourth Embodiment

An air-fuel ratio control apparatus (hereinafter simply referred to as a "fourth control apparatus") of the fourth embodiment according to the present invention will next be described. The fourth control apparatus obtains the cylinder-by-cylinder influence degree indicating value EF(N), similarly to the first control apparatus. Further, the fourth control apparatus performs the cylinder-by-cylinder air-fuel ratio controls that the first to third control apparatus adopt, but does not perform (any of) the cylinder-by-cylinder air-fuel ratio controls when the operating condition of the engine 10 is in a specific condition (more specifically, a purifying ability of the downstream catalyst 44 is high).

Figure 17:
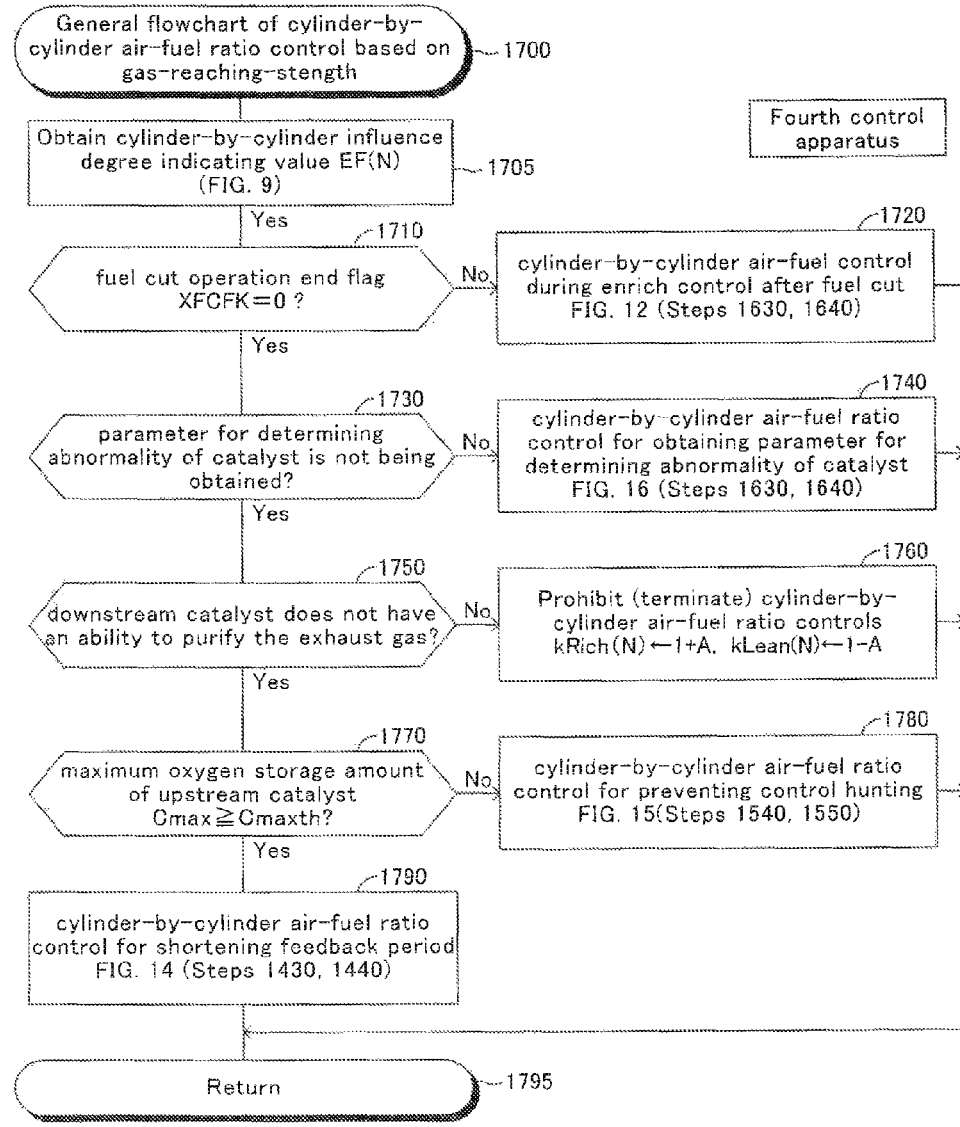
FIG. 17 is a flowchart showing a routine executed by a CPU of an air-fuel ratio control apparatus (fourth control apparatus) according to a fourth embodiment of the present invention.

The CPU of the fourth control apparatus operates according to a general flowchart shown in FIG. 17. That is, the CPU proceeds to step 1705 every time a predetermined time period elapses, and obtains the cylinder-by-cylinder influence degree indicating value EF(N), similarly to the first control apparatus (refer to FIGS. 5, 9, 10, and so on). It should be noted that, once the CPU obtains the cylinder-by-cylinder influence degree indicating value EF(N) after the current start of the engine 10, the CPU thereafter skips step 1705 to proceed to step 1710.

After the CPU obtains the cylinder-by-cylinder influence degree indicating value EF(N), it proceeds to steep 1710 to determine whether or not the value of the fuel cut operation end flag XFCFK is "0." When the value of the fuel cut operation end flag XFCFK is "1", the CPU makes a "No" determination at step 1710 to proceed to step 1720, at which the CPU performs the "cylinder-by-cylinder air-fuel control during the enrich control after fuel cut" (refer to FIG. 12, and the like). Thereafter, the CPU proceeds to step 1795.

If the value of the fuel cut operation end flag XFCFK is "0" when the CPU executes the process of step 1710, the CPU makes a "Yes" determination at step 1710 to proceed to step 1730, at which the CPU determines whether or not the present point in time is not in the state in which the parameter for determining an abnormality of the catalyst (i.e., maximum oxygen storage amount Cmax) is being obtained.

If the present point in time is in the state in which the parameter for determining an abnormality of the catalyst (i.e., maximum oxygen storage amount Cmax) is being obtained, the CPU makes a "No" determination at step 1730 to proceed to step 1740 to perform the "cylinder-by-cylinder air-fuel ratio control for obtaining the parameter for determining an abnormality of the catalyst" (refer to FIG. 16, and the like). Thereafter, the CPU proceeds to step 1795.

If the present point in time is not in the state in which the parameter for determining an abnormality of the catalyst is being obtained when the CPU executes the process of step 1730, the CPU makes a "Yes" determination at step 1730 to proceed to step 1750, at which the CPU determines whether or not the downstream catalyst 44 does not have an ability to purify the exhaust gas.

More specifically, the CPU updates an integrated value SGarich of the intake air amount Ga in a period in which the output value Voxs of the downstream air-fuel ratio sensor 56 is indicating a value corresponding to an air-fuel ratio richer than the stoichiometric air-fuel ratio, updates an integrated value SGalean of the intake air amount Ga in a period in which the output value Voxs of the downstream air-fuel ratio sensor 56 is indicating a value corresponding to an air-fuel ratio leaner than the stoichiometric air-fuel ratio, and determines that the downstream catalyst 44 does not have an ability to purify the exhaust gas, when a difference between those values (=SGalean−SGarich, that is, a value corresponding to an oxygen storage amount of the downstream catalyst 44) is equal to or smaller than 20% (first threshold value) of a predetermined maximum oxygen storage amount Cufmax of the downstream catalyst 44, or is equal to or larger than 80% (second threshold value larger than the first threshold value) of the predetermined maximum oxygen storage amount Cufmax. It should be noted that the integrated value SGalean is set to the maximum oxygen storage amount Cufmax at the start of the engine 10. Alternatively, the value corresponding to the oxygen storage amount of the downstream catalyst 44 may be calculated by disposing a "limiting-current-type wide range air-fuel ratio sensor similar to the upstream air-fuel ratio sensor 55" in the vicinity of the downstream air-fuel ratio sensor 56, by disposing a "concentration-cell-type oxygen concentration sensor ($O_2$ sensor) similar to the downstream air-fuel ratio sensor 56 at a position downstream of the downstream catalyst 44, and by using a method similar to the method for obtaining the maximum oxygen storage amount Cmax of the upstream catalyst 43 while using those disposed sensors.

If the downstream catalyst 44 has the ability to purify the exhaust gas when the CPU executes the process of step 1750, the CPU makes a "No" determination at step 1750 to proceed to step 1760, at which the CPU prohibits (terminates) the "cylinder-by-cylinder air-fuel ratio controls." That is, the CPU sets each of the increasing coefficient for Nth cylinder kRich(N) (N is an integer from 1 to 4) to the increasing coefficient base value "1+A", and sets each of the decreasing coefficient for Nth cylinder kLean(N) (N is an integer from 1 to 4) to the decreasing coefficient base value "1−A." Thereafter, the CPU proceeds to step 1795.

If the downstream catalyst 44 does not have the ability to purify the exhaust gas when the CPU executes the process of step 1750, the CPU makes a "Yes" determination at step 1750 to proceed to step 1770, at which the CPU determines whether or not the maximum oxygen storage amount Cmax of the upstream catalyst 43 is equal to or larger than the maximum oxygen storage amount threshold Cmaxth.

When the maximum oxygen storage amount Cmax of the upstream catalyst 43 is neither equal to nor larger than the maximum oxygen storage amount threshold Cmaxth, the CPU makes a "No" determination at step 1770 to proceed to step 1780, at which the CPU performs the "cylinder-by-cylinder air-fuel ratio control routine for preventing the control hunting" described above (refer to FIG. 15, and the like). Thereafter, the CPU proceeds to step 1795.

If the maximum oxygen storage amount Cmax of the upstream catalyst 43 is equal to or larger than the maximum oxygen storage amount threshold Cmaxth when the CPU executes the process of step 1770, the CPU makes a "Yes" determination at step 1770 to proceed to step 1790, at which the CPU performs the "cylinder-by-cylinder air-fuel ratio control for shortening a feedback period" described above (refer to FIG. 14, and the like). Thereafter, the CPU proceeds to step 1795.

As described above, the fourth control apparatus performs the cylinder-by-cylinder air-fuel ratio controls that the first to third control apparatus performs, and terminates the cylinder-by-cylinder air-fuel ratio controls when the downstream catalyst 44 has the ability to purify the exhaust gas (refer to step 1750 and step 1760, shown in FIG. 17).

Accordingly, a computational load of the CPU can be decreased as compared with a case in which the CPU always calculates the increasing coefficient for Nth cylinder kRich (N) and the decreasing coefficient for Nth cylinder kLean(N). Consequently, a calculation error does not occur, and thus, the high accurate air-fuel ratio control can be carried out.

As is understood from the above description, each of the embodiments of the air-fuel ratio control apparatus according to the present invention obtains the cylinder-by-cylinder influence degree indicating value EF(N) indicating the influence/impact degree on the output value Voxs of the downstream air-fuel ratio sensor 56 that the exhaust gas discharged from each (the Nth cylinder) of a plurality of the cylinders has, and controls the cylinder-by-cylinder air-fuel ratio (in actuality, the increasing coefficient for Nth cylinder kRich(N) and the decreasing coefficient for Nth cylinder kLean(N)) based on the cylinder-by-cylinder influence degree indicating value EF(N) and the operating state of the engine, etc. As a result, the emission can be more improved.

The present invention is not limited to the above-described embodiments, and may be modified in various manners without departing from the scope of the present invention.

First Modification

Each of the first to fourth control apparatuses obtains the cylinder-by-cylinder influence degree indicating value EF(N) indicating the "influence/impact degree on the output value of the downstream air-fuel ratio sensor" of the air-fuel ratio of the exhaust gas discharged from the Nth cylinder (N is an integer from 1 to 4), and controls the air-fuel ratio cylinder-by-cylinder air-fuel ratio of the Nth cylinder based on the cylinder-by-cylinder influence degree indicating value EF(N).

However, the "influence/impact degree on the output value of the downstream air-fuel ratio sensor" of the air-fuel ratio of the exhaust gas discharged from the Nth cylinder (N is an integer from 1 to 4) can be obtained in advance based on experiments or the like, if the structure of the engine 10 (for example, the shape of the exhaust manifold 41, the position/disposition angle of the catalyst 43, the position/disposition angle of the downstream air-fuel ratio sensor 56, and the like) is fixed.

In view of the above, the first modification controls the cylinder-by-cylinder air-fuel ratio based on the "influence/impact degree on the output value of the downstream air-fuel ratio sensor" of the exhaust gas discharged from each of the cylinders" that has been obtained in advance. In other words, the CPU of the first modification stores the cylinder-by-cylinder influence degree indicating value EF(N) in the ROM in advance, and performs the cylinder-by-cylinder air-fuel ratio control similarly to that of each of the embodiments described above.

According to the first modification, it is not necessary to actually obtain the cylinder-by-cylinder influence degree indicating value EF(N), and thus, the desirable cylinder-by-cylinder air-fuel ratio control can be always carried out. Further, it is not necessary to sacrifice the emission in order to obtain the cylinder-by-cylinder influence degree indicating value EF(N).

Second Modification

Each of the first to fourth control apparatuses calculates the stored oxygen amount OSAkz and the released oxygen amount OSAhs, and obtains the mean oxygen storage amount OSA which is the mean value of those amounts as the fluctuation period correlated value (value representing the state of the periodic fluctuation of the output value Voxs of the downstream air-fuel ratio sensor 56).

However, the fluctuation period correlated value may alternately be obtained based on at least one of parameters described below.

A trace/trajectory length of the output value Voxs of the downstream air-fuel ratio sensor 56 in a predetermined time period. It should be noted that the trace/trajectory length can be calculated by accumulating/integrating, every elapse of a constant sampling time, and over the predetermined time period, an absolute value |Voxs−Voxsold| of a difference between the output value Voxs at that point in time and a previous output value Voxs at a point in time the sampling time before that point in time.

An inversion period (or the inversion frequency) of the output value Voxs of the downstream air-fuel ratio sensor 56. The inversion period of the output value Voxs of the downstream air-fuel ratio sensor 56 means a time duration correlated with a time duration from a point in time at which the output value Voxs of the downstream air-fuel ratio sensor 56 changes to a value corresponding to an air-fuel ratio richer than the stoichiometric air-fuel ratio to a point in time at which the output value Voxs of the downstream air-fuel ratio sensor 56 again changes to a value corresponding to an air-fuel ratio richer than the stoichiometric air-fuel ratio after it changes to a value corresponding to an air-fuel ratio leaner than the stoichiometric air-fuel ratio, as described above. It should be noted that the inversion period of the output value Voxs of the downstream air-fuel ratio sensor 56 may also be a time duration correlated with a time duration from a point in time at which the output value Voxs of the downstream air-fuel ratio sensor 56 changes to a value corresponding to an air-fuel ratio leaner than the stoichiometric air-fuel ratio to a point in time at which the output value Voxs of the downstream air-fuel ratio sensor 56 again changes to a value corresponding to an air-fuel ratio leaner than the stoichiometric air-fuel ratio after it changes to a value corresponding to an air-fuel ratio richer than the stoichiometric air-fuel ratio.

The stored oxygen amount OSAkz itself.

The released oxygen amount OSAhs itself.

Third Modification

Each of the first to fourth control apparatuses changes the cylinder-by-cylinder correction gain (the increasing coefficient for Nth cylinder kRich(N) and the decreasing coefficient for Nth cylinder kLean(N)), in order to carry out the cylinder-by-cylinder air-fuel ratio control. In contrast, the third modification changes a target cylinder-by-cylinder air-fuel ratio for each of the cylinders so as to carry out the cylinder-by-cylinder air-fuel ratio control.

Figure 18:
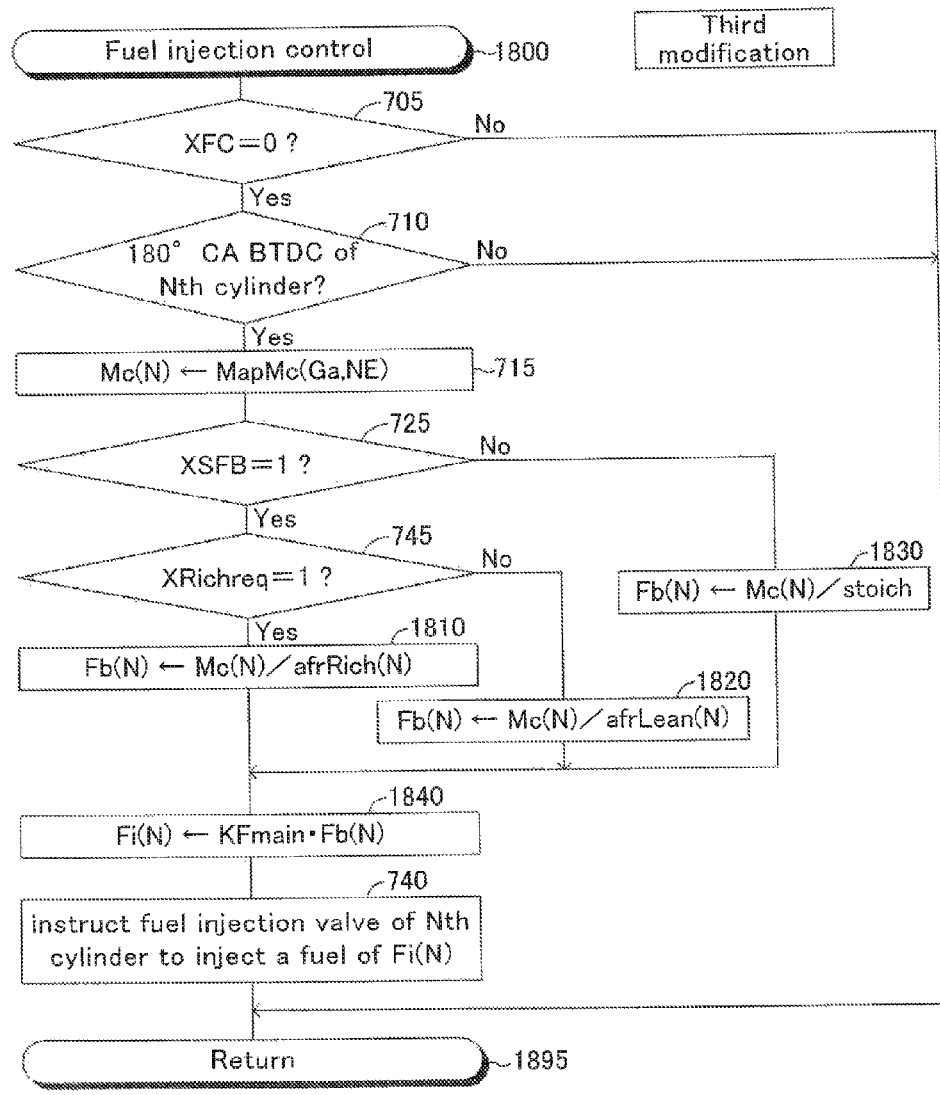
FIG. 18 is a flowchart showing a routine executed by a CPU of an air-fuel ratio control apparatus according to a third modification of the present invention.

More specifically, a CPU of the third modification executes a fuel injection control routine shown by a flowchart in FIG. 18, every time a predetermined time period elapses. Note that each step in FIG. 18 at which the same process is performed as each step which has already been described is given the same numeral as one given to such step. A detail description on such a step will be appropriately omitted.

According to this routine, the in-cylinder intake air amount Mc(N) of the arbitrary Nth cylinder (N is an integer from 1 to 4) is obtained at step 715, when the value of the fuel cut flag XFC is "0" (refer to step 705), and the crank angle of the Nth cylinder reaches the predetermined crank angle (e.g., BTDC 180° CA) before the intake top dead center of the Nth cylinder (refer to step 710).

Further, when the value of the feedback execution allowable flag XSFB is "1" (refer to step 725), and the value of the rich request flag is "1" (refer to step 745), the CPU proceeds to step 1810 to calculate the base fuel injection amount Fb(N) by dividing the in-cylinder intake air amount Mc(N) of the Nth cylinder by a target rich side air-fuel ratio afrRich(N) (Fb(N)=Mc(N)/afrRich(N)).

The target rich side air-fuel ratio afrRich(N) is equal to a value obtained by dividing the stoichiometric air-fuel ratio by the above described increasing coefficient for Nth cylinder kRich(N) (afrRich(N)=stoich/kRich(N)). In other words, the CPU of the third modification sets the target rich side air-fuel ratio afrRich(N) which corresponds to the increasing coefficient for Nth cylinder kRich(N), in place of setting the increasing coefficient for Nth cylinder kRich(N) in the each of the first to fourth control apparatuses.

In contrast, when the value of the feedback execution allowable flag XSFB is "1" (refer to step 725), and the value of the rich request flag is "0" (refer to step 745), the CPU proceeds to step 1820 to calculate the base fuel injection amount Fb(N) by dividing the in-cylinder intake air amount Mc(N) of the Nth cylinder by a target lean side air-fuel ratio afrLean(N) (Fb(N)=Mc(N)/afrLean(N)).

The target lean side air-fuel ratio afrLean(N) is equal to a value obtained by dividing the stoichiometric air-fuel ratio by the above described decreasing coefficient for Nth cylinder kLean(N) (afrLean(N)=stoich/kLean(N)). In other words, the CPU of the third modification sets the target lean side air-fuel ratio afrLean(N) which corresponds to the decreasing coefficient for Nth cylinder kLean(N), in place of setting the decreasing coefficient for Nth cylinder kLean(N) in the each of the first to fourth control apparatuses.

Further, when the value of the feedback execution allowable flag XSFB is "0" (refer to step 725), the CPU proceeds to step 1830 to obtain the base fuel injection amount Fb(N) of the Nth cylinder by dividing the in-cylinder intake air amount Mc(N) of the Nth cylinder by the stoichiometric air-fuel ratio (Fb(N)=Mc(N)/stoich).

In addition, when the CPU proceeds to step 1840 from one of steps of step 1810, step 1820, and step 1830, to calculate the final fuel injection amount (instructed injection amount) Fi(N) by multiplying the base fuel injection amount Fb(N) by a main feedback coefficient KFmain. The main feedback coefficient KFmain will be described later. It should be noted than the main feedback coefficient KFmain may be fixed to "1."

Subsequently, the CPU proceeds to step 740 to send an injection instruction to the fuel injection valve 25 of the Nth cylinder in such a manner that the fuel of the final fuel injection amount Fi(N) is injected from that fuel injection valve 25. Thereafter, the CPU proceeds to step 1895 to end the present routine tentatively.

For example, the CPU calculates the main feedback coefficient KFmain as follows.

The CPU obtains the detected upstream air-fuel ratio abyfs by applying the output value Vabyfs of the upstream air-fuel ratio sensor 55 to the table Mapabyfs shown in FIG. 3.

The CPU obtains an "in-cylinder fuel supply amount Fc(k−n)" which is an "amount of the fuel actually supplied to the combustion chamber 21 for a cycle at a point in time N cycles before the present point in time." That is, the CPU obtains the in-cylinder fuel supply amount Fc(k−n) through dividing the "in-cylinder intake air amount Mc(k−N) which is the in-cylinder intake air amount for the cycle the n cycles (i.e., N·720° crank angle) before the present point in time" by the "actual detected air-fuel ratio abyfs." The reason why the cylinder intake air amount Mc(k−n) for the cycle n strokes before the present point in time is divided by the actual detected air-fuel ratio abyfs in order to obtain the in-cylinder fuel supply amount Fc(k−n) in this manner is because the "exhaust gas generated by the combustion of the mixture in the combustion chamber 21" requires time "corresponding to the n strokes" to reach the upstream air-fuel ratio sensor 55.

The CPU obtains a "target in-cylinder fuel supply amount Fcr(k−n)" by dividing the in-cylinder intake air amount Mc(k−n) for the cycle the N strokes before the present point in time by the target upstream air-fuel ratio abyfr(K−n) for the cycle the N strokes before the present point in time. The target upstream air-fuel ratio abyfr(K−n) is the target cylinder-by-cylinder air-fuel ratio (one of the afrRich(N), the afrLean(N), and the stoich) which was used to obtain the base fuel injection amount Fb(N) at the point in time the n strokes before the present point in time. Therefore, the target in-cylinder fuel supply amount Fcr(k−n) is a "fuel amount supposed to be supplied to the combustion chamber 21 for the cycle the n cycles before the present point in time."

The CPU obtains an in-cylinder fuel supply amount error DFc by subtracting the in-cylinder fuel supply amount Fc(k−n) from the target cylinder fuel supply amount Fcr(k−n). The in-cylinder fuel supply amount error DFc represents excess and deficiency of the fuel supplied to the cylinder for the cycle the n strokes before the present point in time.

The CPU obtains the main feedback amount DFmain by adding an "integral term Gi·SDFc obtained by multiplying an integrated value SDFC of the in-cylinder fuel supply amount error DFc by an integration gain Gi" to a "proportional term Gp·DFc." Further, the CPU calculates a main feedback coefficient KFmain by dividing the main feedback amount DFmain by the base fuel injection amount Fb(N) the n cycles before the present point in time.

It should be noted that the cylinder-by-cylinder influence degree indicating value EF(N) can be obtained by sequentially changing the cylinder-by-cylinder air-fuel ratios, in this modification, as well.

Fourth Modification

Each of the first to fourth control apparatuses, in order to control the cylinder-by-cylinder air-fuel ratios, determines that the rich request occurs when the output value Voxs of the downstream air-fuel ratio sensor 56 is smaller than the stoichiometric air-fuel ratio corresponding voltage Vst, and the lean request is occurring when the output value Voxs of the downstream air-fuel ratio sensor 56 is larger than the stoichiometric air-fuel ratio corresponding voltage Vst. In addition, each of the first to fourth control apparatuses selects, depending on which air-fuel request is occurring, the rich request or the lean request, the correction gain used to calculate the fuel injection amount (the increasing coefficient for Nth cylinder kRich(N) and the decreasing coefficient for Nth cylinder kLean(N)), and further, change the correction gain based on the cylinder-by-cylinder influence degree indicating value EF(N).

In contrast, the fourth modification carries out a well-known sub feedback control to have the output value Voxs of the downstream air-fuel ratio sensor 56 coincide with a target downstream air-fuel ratio Voxsref (normally, the stoichiometric air-fuel ratio corresponding voltage Vst). That is, it determines a sub feedback amount KSFB according to a PID control in such a manner that an error between the output value Voxs of the downstream air-fuel ratio sensor 56 and the target downstream air-fuel ratio Voxsref becomes smaller. The fourth modification sets, as a standard/reference target air-fuel ratio abyfrstd, a value obtained by subtracting the sub feedback amount KSFB form the stoichiometric air-fuel ratio stoich.

In this case, the sub feedback amount KSFB is increased when the output value Voxs is smaller than the target downstream air-fuel ratio Voxsref. Consequently, the standard/reference target air-fuel ratio abyfrstd is decreased so as to be smaller than the stoichiometric air-fuel ratio stoich (is set to the rich air-fuel ratio). Then, the cylinder-by-cylinder air-fuel ratio is controlled so as to coincide with the rich air-fuel ratio with the main feedback coefficient KFmain. In contrast, the sub feedback amount KSFB is decreased when the output value Voxs is larger than the target downstream air-fuel ratio Voxsref, so as to become a negative value. Consequently, the standard/reference target air-fuel ratio abyfrstd is increased so as to be larger than the stoichiometric air-fuel ratio stoich (is set to the lean air-fuel ratio). Then, the cylinder-by-cylinder air-fuel ratio is controlled so as to coincide with the lean air-fuel ratio with the main feedback coefficient KFmain.

In addition, when the fuel injection timing of the Nth cylinder comes (the crank angle of the Nth cylinder reaches the predetermined crank angle before the intake top dead center of the Nth cylinder), the fourth modification assumes that the lean request is occurring if the standard/reference target air-fuel ratio abyfrstd is larger than the stoichiometric air-fuel ratio stoich (i.e., is the lean air-fuel ratio), and sets the value obtained by dividing the standard/reference target air-fuel ratio abyfrstd by the decreasing coefficient for Nth cylinder kLean(N) to the target air-fuel ratio (afrLean(N)) of the Nth cylinder. Further, when the fuel injection timing of the Nth cylinder comes, the fourth modification assumes that the rich request is occurring if the standard/reference target air-fuel ratio abyfrstd is smaller than the stoichiometric air-fuel ratio stoich (i.e., is the rich air-fuel ratio), and sets the value obtained by dividing the standard/reference target air-fuel ratio abyfrstd by the increasing coefficient for Nth cylinder kRich(N) to the target air-fuel ratio (afrRich(N)) of the Nth cylinder.

It should be noted that the cylinder-by-cylinder influence degree indicating value EF(N) can be obtained by sequentially changing the cylinder-by-cylinder air-fuel ratios, in this modification, as well.

Fifth Modification

Each of the first to fourth control apparatuses determines that the rich request is occurring when the output value Voxs of the downstream air-fuel ratio sensor 56 is smaller than the stoichiometric air-fuel ratio corresponding voltage Vst, and the lean request is occurring when the output value Voxs of the downstream air-fuel ratio sensor 56 is larger than the stoichiometric air-fuel ratio corresponding voltage Vst.

Meanwhile, oxygen starts to flow out from the catalyst 43, when the oxygen storage amount increases to a certain value in a case in which the air-fuel ratio of the catalyst inflow gas is the lean air-fuel ratio. If the air-fuel ratio of the engine 10 can be switched to the rich air-fuel ratio at this stage, the air-fuel ratio of the catalyst inflow gas can be set to the rich air-fuel ratio before the oxygen storage amount of the catalyst 43 increases so that excessive oxygen and Nox can not be purified.

Similarly, unburnt substance starts to flow out from the catalyst 43, when the oxygen storage amount decreases to a certain value in a case in which the air-fuel ratio of the catalyst inflow gas is the rich air-fuel ratio. If the air-fuel ratio of the engine 10 can be switched to the lean air-fuel ratio at this stage, the air-fuel ratio of the catalyst inflow gas can be set to the lean air-fuel ratio before the oxygen storage amount of the catalyst 43 decreases so that a large amount of the unburnt substances can not be purified.

In view of the above, a CPU of the fifth modification determines, based on a comparison between a plurality (two, in the present example) of thresholds (high side determination value VH, and low side determination value VL) and the output value Voxs of the downstream air-fuel ratio sensor 56, which air-fuel ratio request is occurring, the rich request or the lean request.

More specifically, as shown in FIG. 19, the CPU of the fifth modification determines that the rich request has occurred so as to set the rich request flag XRichreq to "1", when the output value Voxs of the downstream air-fuel ratio sensor 56 has changed from "a value larger than the high side (first) determination value VH to a value smaller than the high side determination value VH in a case in which it is determined that the lean request is occurring (rich request flag=0) at the present point in time. The high side (first) determination value VH is higher than the stoichiometric air-fuel ratio corresponding voltage Vst.

Further, the CPU of the fifth modification determines that the lean request has occurred so as to set the rich request flag XRichreq to "0", when the output value Voxs of the downstream air-fuel ratio sensor 56 has changed from "a value smaller than the low side (second) determination value VL to a value larger than the low side determination value VL in a case in which it is determined that the rich request is occurring (rich request flag=1) at the present point in time. The low side (second) determination value VL is lower than the stoichiometric air-fuel ratio corresponding voltage Vst, and therefore, is lower than the high side (first) determination value VH.

According to the fifth modification, it is possible to determine which air-fuel request is occurring, the rich request or the lean request, at an appropriate point in time.

Sixth Modification

The sixth modification can expedite/hasten the determination point in time of the rich request and the lean request, according to the same reason for the fifth modification. More specifically, a CPU of the sixth modification determines which air-fuel request is occurring, the rich request or the lean request, as follows.

The CPU determines that the rich request has occurred, when temporal differential value d(Voxs)/dt of the output value Voxs of the downstream air-fuel ratio sensor 56 is a negative value, and its absolute value (|d(Voxs)/dt|) has become equal to or larger than a threshold value Dth while the output value Voxs is larger than the stoichiometric air-fuel ratio corresponding voltage Vst.

The CPU determines that the lean request has occurred, when temporal differential value d(Voxs)/dt of the output value Voxs of the downstream air-fuel ratio sensor 56 is a positive value, and its absolute value (|d(Voxs)/dt|) has become equal to or larger than the threshold value Dth while the output value Voxs is smaller than the stoichiometric air-fuel ratio corresponding voltage Vst.

The invention claimed is:

1. An air-fuel ratio control apparatus for an internal combustion engine which is a multi-cylinder internal combustion engine comprising:
  a three-way catalyst disposed at a position downstream of an exhaust gas aggregated portion in an exhaust passage of said engine into which exhaust gases discharged from a plurality of cylinders of said engine aggregate;
  a downstream air-fuel ratio sensor, which is disposed in said exhaust passage and at a position downstream of said three-way catalyst, and which outputs an output value varying in accordance with an air-fuel ratio of an exhaust gas flowing through said position at which said downstream air-fuel ratio sensor is disposed;
  a cylinder-by-cylinder mixture supplying section configured so as to supply a mixture to each of combustion chambers of a plurality of said cylinders, and so as to be able to adjust a cylinder-by-cylinder air-fuel ratio which is an air-fuel ratio of said mixture supplied to each of said combustion chambers independently from each other among a plurality of said cylinders; and
  a cylinder-by-cylinder air-fuel ratio control section configured so as to determine, based on said output value of said downstream air-fuel ratio sensor, which an air-fuel request is occurring, a rich request or a lean request, wherein said rich request is a request to set an air-fuel ratio of a catalyst inflow gas which is an exhaust gas flowing into said catalyst to a rich air-fuel ratio which is an air-fuel ratio smaller than stoichiometric air-fuel ratio, and said lean request is a request to set said air-fuel ratio of said catalyst inflow gas to a lean air-fuel ratio which is an air-fuel ratio larger than said stoichiometric air-fuel ratio, and so as to control said cylinder-by-cylinder air-fuel ratio of each of a plurality of said cylinders in such a manner that said cylinder-by-cylinder air-fuel ratio of each of a plurality of said cylinders becomes an air-fuel ratio corresponding to said determined air-fuel ratio request;
  wherein,
  said cylinder-by-cylinder air-fuel ratio control section includes:
    a fluctuation period correlated value obtaining section configured so as to repeatedly perform an operation to select, as a selected cylinder, one of a plurality of said cylinders, to change said cylinder-by-cylinder air-fuel ratio of each of a plurality of said cylinders in such a manner that a cylinder-by-cylinder air-fuel ratio of said selected cylinder becomes different from a cylinder-by-cylinder air-fuel ratio of each of remaining cylinders among a plurality of said cylinders, and to obtain, as a fluctuation period correlated value with respect to said selected cylinder, a value correlated with a fluctuation period of said output value of said downstream air-fuel ratio sensor, until a point in time at which each of all of said cylinders is selected as said selected cylinder; and
    a gas reaching strength determining section configured so as to determine, based on said obtained fluctuation period correlated value with respect to each of a plurality of said cylinders, an influence degree of said exhaust gas discharged from each of a plurality of said cylinders on said output value of said downstream air-fuel ratio sensor.

2. The air-fuel ratio control apparatus according to claim 1, wherein,
  said gas reaching strength determining section includes a cylinder-by-cylinder influence degree indicating value obtaining section configured so as to obtain, for each of a plurality of said cylinders, based on said obtained fluctuation period correlated value with respect to each of a plurality of said cylinders, a cylinder-by-cylinder influence degree indicating value indicative of said influence degree on said output value of said downstream air-fuel ratio sensor of said exhaust gas discharged from each of a plurality of said cylinders; and said cylinder-by-cylinder air-fuel ratio control section includes a cylinder-by-cylinder air-fuel ratio correction section configured so as to perform a feedback period shortening control to correct each of said cylinder-by-cylinder air-fuel ratios of a plurality of said cylinders, in such a manner that, in a period in which said rich request is occurring, a cylinder-by-cylinder air-fuel ratio of a cylinder whose influence degree on said output value of said downstream air-fuel ratio sensor indicated by said cylinder-by-cylinder influence degree indicating value is a first value becomes smaller than a cylinder-by-cylinder air-fuel ratio of a cylinder whose influence degree on said output value of said downstream air-fuel ratio sensor indicated by said cylinder-by-cylinder influence degree indicating value is a second value smaller than said first value.

3. The air-fuel ratio control apparatus according to claim 1, wherein, said gas reaching strength determining section includes a cylinder-by-cylinder influence degree indicating value obtaining section configured so as to obtain, for each of a plurality of said cylinders, based on said obtained fluctuation period correlated value with respect to each of a plurality of said cylinders, a cylinder-by-cylinder influence degree indicating value indicative of said influence degree on said output value of said downstream air-fuel ratio sensor of said exhaust gas discharged from each of a plurality of said cylinders; and said cylinder-by-cylinder air-fuel ratio control section includes a cylinder-by-cylinder air-fuel ratio correction section configured so as to perform a feedback period shortening control to correct each of said cylinder-by-cylinder air-fuel ratios of a plurality of said cylinders, in such a manner that, in a period in which said lean request is occurring, a cylinder-by-cylinder air-fuel ratio of a cylinder whose influence degree on said output value of said downstream air-fuel ratio sensor indicated by said cylinder-by-cylinder influence degree indicating value is a first value becomes larger than a cylinder-by-cylinder air-fuel ratio of a cylinder whose influence degree on said output value of said downstream air-fuel ratio sensor indicated by said cylinder-by-cylinder influence degree indicating value is a second value smaller than said first value.

4. The air-fuel ratio control apparatus according to claim 1, wherein, said gas reaching strength determining section includes a gas most excellently reaching cylinder identifying section configured so as to identify, as a gas most excellently reaching cylinder, based on said fluctuation period correlated value obtained for each of a plurality of said cylinders, a cylinder discharging an exhaust gas which has the greatest influence on said output value of said downstream air-fuel ratio sensor among a plurality of said cylinders; and said cylinder-by-cylinder air-fuel ratio control section includes a cylinder-by-cylinder air-fuel ratio correction section configured so as to perform a feedback period shortening control to correct each of said cylinder-by-cylinder air-fuel ratios of a plurality of said cylinders, in such a manner that, in a period in which said rich request is occurring, a cylinder-by-cylinder air-fuel ratio of said identified gas most excellently reaching cylinder becomes smaller than a cylinder-by-cylinder air-fuel ratio of a cylinder other than said gas most excellently reaching cylinder among a plurality of said cylinders.

5. The air-fuel ratio control apparatus according to claim 1, wherein, said gas reaching strength determining section includes a gas most excellently reaching cylinder identifying section configured so as to identify, as a gas most excellently reaching cylinder, based on said fluctuation period correlated value obtained for each of a plurality of said cylinders, a cylinder discharging an exhaust gas which has the greatest influence on said output value of said downstream air-fuel ratio sensor among a plurality of said cylinders; and said cylinder-by-cylinder air-fuel ratio control section includes a cylinder-by-cylinder air-fuel ratio correction section configured so as to perform a feedback period shortening control to correct each of said cylinder-by-cylinder air-fuel ratios of a plurality of said cylinders, in such a manner that, in a period in which said lean request is occurring, a cylinder-by-cylinder air-fuel ratio of said identified gas most excellently reaching cylinder becomes larger than a cylinder-by-cylinder air-fuel ratio of a cylinder other than said gas most excellently reaching cylinder among a plurality of said cylinders.

6. The air-fuel ratio control apparatus according to claim 2, wherein, said cylinder-by-cylinder air-fuel ratio correction section is configured so as to perform said feedback period shortening control at least either one of a case in which an intake air amount of said engine is equal to or larger than a first intake air amount threshold and a case in which said intake air amount of said engine is equal to or smaller than a second intake air amount threshold smaller than said first intake air amount threshold.

7. The air-fuel ratio control apparatus according to claim 1, wherein, said cylinder-by-cylinder mixture supplying section includes a fuel cut section configured so as to perform a fuel cut operation to stop supplying mixtures to all of said combustion chambers of a plurality of said cylinders when a predetermined fuel cut start condition becomes satisfied, and to terminate said fuel cut operation so as to resume supplying said mixtures to all of said combustion chambers of a plurality of said cylinders when a predetermined fuel cut termination condition becomes satisfied while said fuel cut operation is being performed;

said gas reaching strength determining section includes a cylinder-by-cylinder influence degree indicating value obtaining section configured so as to obtain, for each of a plurality of said cylinders, based on said obtained fluctuation period correlated value with respect to each of a plurality of said cylinders, a cylinder-by-cylinder influence degree indicating value indicative of said influence degree on said output value of said downstream air-fuel ratio sensor of said exhaust gas discharged from each of a plurality of said cylinders; and said cylinder-by-cylinder air-fuel ratio control section includes a cylinder-by-cylinder air-fuel ratio correction section configured so as to, determine, based on said output value of said downstream air-fuel ratio sensor, whether or not unburnt substances start to flow out downstream of said three-way catalyst after a point in time of an end of said fuel cut operation, and perform a post fuel cut control to correct said cylinder-by-cylinder air-fuel ratios in a post fuel cut period from said point in time of said end of said fuel cut operation to a point in time at which it is determined that said unburnt substances start to flow out downstream of said three-way catalyst, in such a manner that a cylinder-by-cylinder air-fuel ratio of a cylinder whose influence degree on said output value of said downstream air-fuel ratio sensor indicated by said cylinder-by-cylinder influence degree indicating value is a first value becomes larger than a cylinder-by-cylinder air-fuel ratio of a cylinder whose influence degree on said output value of said downstream air-fuel ratio sensor indicated by said cylinder-by-cylinder influence degree indicating value is a second value smaller than said first value, but is smaller than said stoichiometric air-fuel ratio.

8. The air-fuel ratio control apparatus according to claim 1, wherein, said cylinder-by-cylinder mixture supplying section includes a fuel cut section configured so as to perform a fuel cut operation to stop supplying mixtures to all of said combustion chambers of a plurality of said cylinders when a predetermined fuel cut start condition becomes satisfied, and to terminate said fuel cut operation so as to resume supplying said mixtures to all of said combustion chambers of a plurality of said cylinders when a predetermined fuel cut termination condition becomes satisfied while said fuel cut operation is being performed;

said gas reaching strength determining section includes a gas most excellently reaching cylinder identifying section configured so as to identify, as a gas most excellently reaching cylinder, based on said fluctuation period correlated value obtained for each of a plurality of said cylinders, a cylinder discharging an exhaust gas which has the greatest influence on said output value of said downstream air-fuel ratio sensor among a plurality of said cylinders; and said cylinder-by-cylinder air-fuel ratio control section includes a cylinder-by-cylinder air-fuel ratio correction section configured so as to, determine, based on said output value of said downstream air-fuel ratio sensor, whether or not unburnt substances start to flow out downstream of said three-way catalyst after a point in time of an end of said fuel cut operation, and perform a post fuel cut control to correct said cylinder-by-cylinder air-fuel ratios in a post fuel cut period from said point in time of said end of said fuel cut operation to a point in time at which it is determined that said unburnt substances start to flow out downstream of said three-way catalyst, in such a manner that a cylinder-by-cylinder air-fuel ratio of said identified gas most excellently reaching cylinder becomes larger than a cylinder-by-cylinder air-fuel ratio of a cylinder other than said gas most excellently reaching cylinder among a plurality of said cylinders, but is smaller than said stoichiometric air-fuel ratio.

9. The air-fuel ratio control apparatus according to claim 7, wherein, said cylinder-by-cylinder air-fuel ratio correction section is configured so as to correct said cylinder-by-cylinder air-fuel ratios in such a manner that a mean value of said cylinder-by-cylinder air-fuel ratios of a plurality of said cylinders during said post fuel cut period is smaller than a mean value of said cylinder-by-cylinder air-fuel ratios of a plurality of said cylinders during a period in which said rich request is occurring after said post fuel cut period.

10. The air-fuel ratio control apparatus according to claim 1, wherein, said gas reaching strength determining section includes a cylinder-by-cylinder influence degree indicating value obtaining section configured so as to obtain, for each of a plurality of said cylinders, based on said obtained fluctuation period correlated value with respect to each of a plurality of said cylinders, a cylinder-by-cylinder influence degree indicating value indicative of said influence degree on said output value of said downstream air-fuel ratio sensor of said exhaust gas discharged from each of a plurality of said cylinders; and said cylinder-by-cylinder air-fuel ratio control section includes:

a maximum oxygen storage amount obtaining section configures so as to obtain a maximum oxygen storage amount of said three-way catalyst; and a cylinder-by-cylinder air-fuel ratio correction section configured so as to perform a control hunting preventing control to correct each of said cylinder-by-cylinder air-fuel ratios of a plurality of said cylinders in such a manner that, in a period in which said rich request is occurring, a cylinder-by-cylinder air-fuel ratio of a cylinder whose influence degree on said output value of said downstream air-fuel ratio sensor indicated by said cylinder-by-cylinder influence degree indicating value is a first value becomes larger than a cylinder-by-cylinder air-fuel ratio of a cylinder whose influence degree on said output value of said downstream air-fuel ratio sensor indicated by said cylinder-by-cylinder influence degree indicating value is a second value smaller than said first value, but is smaller than said stoichiometric air-fuel ratio, and becomes closer to said stoichiometric air-fuel ratio as said obtained maximum oxygen storage amount becomes smaller.

11. The air-fuel ratio control apparatus according to claim 1, wherein, said gas reaching strength determining section includes a cylinder-by-cylinder influence degree indicating value obtaining section configured so as to obtain, for each of a plurality of said cylinders, based on said obtained fluctuation period correlated value with respect to each of a plurality of said cylinders, a cylinder-by-cylinder influence degree indicating value indicative of said influence degree on said output value of said downstream air-fuel ratio sensor of said exhaust gas discharged from each of a plurality of said cylinders; and said cylinder-by-cylinder air-fuel ratio control section includes:

a maximum oxygen storage amount obtaining section configures so as to obtain a maximum oxygen storage amount of said three-way catalyst; and a cylinder-by-cylinder air-fuel ratio correction section configured so as to perform a control hunting preventing control to correct each of said cylinder-by-cylinder air-fuel ratios of a plurality of said cylinders in such a manner that, in a period in which said lean request is occurring, a cylinder-by-cylinder air-fuel ratio of a cylinder whose influence degree on said output value of said downstream air-fuel ratio sensor indicated by said cylinder-by-cylinder influence degree indicating value is a first value becomes smaller than a cylinder-by-cylinder air-fuel ratio of a cylinder whose influence degree on said output value of said downstream air-fuel ratio sensor indicated by said cylinder-by-cylinder influence degree indicating value is a second value smaller than said first value, but is larger than said stoichiometric air-fuel ratio, and becomes closer to said stoichiometric air-fuel ratio as said obtained maximum oxygen storage amount becomes smaller.

12. The air-fuel ratio control apparatus according to claim 1, wherein,
said gas reaching strength determining section includes a gas most excellently reaching cylinder identifying section configured so as to identify, as a gas most excellently reaching cylinder, based on said fluctuation period correlated value obtained for each of a plurality of said cylinders, a cylinder discharging an exhaust gas which has the greatest influence on said output value of said downstream air-fuel ratio sensor among a plurality of said cylinders; and
said cylinder-by-cylinder air-fuel ratio control section includes:
a maximum oxygen storage amount obtaining section configures so as to obtain a maximum oxygen storage amount of said three-way catalyst; and
a cylinder-by-cylinder air-fuel ratio correction section configured so as to perform a control hunting preventing control to correct each of said cylinder-by-cylinder air-fuel ratios of a plurality of said cylinders in such a manner that, in a period in which said rich request is occurring, a cylinder-by-cylinder air-fuel ratio of said identified gas most excellently reaching cylinder becomes larger than a cylinder-by-cylinder air-fuel ratio of a cylinder other than said gas most excellently reaching cylinder among a plurality of said cylinders, but is smaller than said stoichiometric air-fuel ratio, and becomes closer to said stoichiometric air-fuel ratio as said obtained maximum oxygen storage amount becomes smaller.

13. The air-fuel ratio control apparatus according to claim 1, wherein,
said gas reaching strength determining section includes a gas most excellently reaching cylinder identifying section configured so as to identify, as a gas most excellently reaching cylinder, based on said fluctuation period correlated value obtained for each of a plurality of said cylinders, a cylinder discharging an exhaust gas which has the greatest influence on said output value of said downstream air-fuel ratio sensor among a plurality of said cylinders; and
said cylinder-by-cylinder air-fuel ratio control section includes:
a maximum oxygen storage amount obtaining section configures so as to obtain a maximum oxygen storage amount of said three-way catalyst; and
a cylinder-by-cylinder air-fuel ratio correction section configured so as to perform a control hunting preventing control to correct each of said cylinder-by-cylinder air-fuel ratios of a plurality of said cylinders in such a manner that, in a period in which said lean request is occurring, a cylinder-by-cylinder air-fuel ratio of said identified gas most excellently reaching cylinder becomes smaller than a cylinder-by-cylinder air-fuel ratio of a cylinder other than said gas most excellently reaching cylinder among a plurality of said cylinders, but is larger than said stoichiometric air-fuel ratio, and becomes closer to said stoichiometric air-fuel ratio as said obtained maximum oxygen storage amount becomes smaller.

14. The air-fuel ratio control apparatus according to claim 1, wherein,
said fluctuation period correlated value obtaining section is configured so as to:
obtain, as a base parameter, at least one of
a trajectory length of said output value of said downstream air-fuel ratio sensor,
an inversion period correlated with a time duration from a point in time at which said output value of said downstream air-fuel ratio sensor changes to a value corresponding to an air-fuel ratio richer than said stoichiometric air-fuel ratio to a point in time at which said output value of said downstream air-fuel ratio sensor again changes to a value corresponding to an air-fuel ratio richer than said stoichiometric air-fuel ratio after said output value changes to a value corresponding to an air-fuel ratio leaner than said stoichiometric air-fuel ratio,
an amount of stored oxygen of said three-way catalyst which corresponds to a total amount of an excessive oxygen flowing into said three-way catalyst during a period from a point in time at which said output value of said downstream air-fuel ratio sensor changes to a value corresponding to an air-fuel ratio richer than said stoichiometric air-fuel ratio to a point in time at which the output value changes to a value corresponding to an air-fuel ratio leaner than said stoichiometric air-fuel ratio, and
an amount of released oxygen of said three-way catalyst which corresponds to a total amount of an excessive unburnt substance flowing into said three-way catalyst during a period from a point in time at which said output value of said downstream air-fuel ratio sensor changes to a value corresponding to an air-fuel ratio leaner than said stoichiometric air-fuel ratio to a point in time at which the output value changes to a value corresponding to an air-fuel ratio richer than said stoichiometric air-fuel ratio; and
obtain, as said fluctuation period correlated value, a value correlated with said obtained base parameter.

15. An air-fuel ratio control apparatus for an internal combustion engine which is a multi-cylinder internal combustion engine comprising:
a three-way catalyst disposed at a position downstream of an exhaust gas aggregated portion in an exhaust passage of said engine into which exhaust gases discharged from a plurality of cylinders of said engine aggregate;
a downstream air-fuel ratio sensor, which is disposed in said exhaust passage and at a position downstream of said three-way catalyst, and which outputs an output value varying in accordance with an air-fuel ratio of an exhaust gas flowing through said position at which said downstream air-fuel ratio sensor is disposed;
a cylinder-by-cylinder mixture supplying section configured so as to supply a mixture to each of combustion chambers of a plurality of said cylinders, and so as to be able to adjust a cylinder-by-cylinder air-fuel ratio which is an air-fuel ratio of said mixture supplied to each of said combustion chambers independently from each other among a plurality of said cylinders; and
a cylinder-by-cylinder air-fuel ratio control section configured so as to determine, based on said output value of said downstream air-fuel ratio sensor, which an air-fuel request is occurring, a rich request or a lean request, wherein said rich request is a request to set an air-fuel ratio of a catalyst inflow gas which is an exhaust gas flowing into said catalyst to a rich air-fuel ratio which is an air-fuel ratio smaller than stoichiometric air-fuel ratio, and said lean request is a request to set said air-fuel ratio of said catalyst inflow gas to a lean air-fuel ratio which is an air-fuel ratio larger than said stoichiometric air-fuel ratio, and so as to control said cylinder-by-cylinder air-fuel ratio of each of a plurality of said cylinders in such a manner that said cylinder-by-cylinder air-fuel ratio of each of a plurality of said cylinders becomes an air-fuel ratio corresponding to said determined air-fuel ratio request;

wherein, reaching strengths of said exhaust gases discharged from a plurality of said cylinders to said downstream air-fuel ratio sensor are not uniform among a plurality of said cylinders, so that an influence degrees on said output value of said downstream air-fuel ratio sensor of said exhaust gas discharged from a plurality of said cylinders are different from each other among a plurality of said cylinders, and wherein, said cylinder-by-cylinder air-fuel ratio control section includes a cylinder-by-cylinder air-fuel ratio correction section configured so as to determine whether or not an operating condition of said engine satisfies a predetermined cylinder-by-cylinder air-fuel ratio control condition, and so as to correct each of said cylinder-by-cylinder air-fuel ratios of a plurality of said cylinders when it determines that said operating condition of said engine satisfies said predetermined cylinder-by-cylinder air-fuel ratio control condition, in such a manner that a cylinder-by-cylinder air-fuel ratio of a gas most excellently reaching cylinder which is a cylinder discharging an exhaust gas which has the greatest influence on said output value of said downstream air-fuel ratio sensor among a plurality of said cylinders becomes different from a cylinder-by-cylinder air-fuel ratio of a cylinder other than said gas most excellently reaching cylinder among a plurality of said cylinders.

16. The air-fuel ratio control apparatus according to claim 15, wherein, said cylinder-by-cylinder air-fuel ratio control section is configured so as to, determine that said cylinder-by-cylinder air-fuel ratio control condition is satisfied, at least in one of cases, a case in which an intake air amount of said engine is equal to or larger than a first intake air amount threshold, and a case in which said intake air amount of said engine is equal to or smaller than a second intake air amount threshold smaller than said first intake air amount threshold; and perform a feedback period shortening control to correct each of said cylinder-by-cylinder air-fuel ratios of a plurality of said cylinders, in such a manner that, in a period in which said rich request is occurring, said cylinder-by-cylinder air-fuel ratio of said gas most excellently reaching cylinder is smaller than said cylinder-by-cylinder air-fuel ratio of a cylinder other than said gas most excellently reaching cylinder among a plurality of said cylinders.

17. The air-fuel ratio control apparatus according to claim 15, wherein, said cylinder-by-cylinder air-fuel ratio control section is configured so as to, determine that said cylinder-by-cylinder air-fuel ratio control condition is satisfied, at least in one of cases, a case in which an intake air amount of said engine is equal to or larger than a first intake air amount threshold, and a case in which said intake air amount of said engine is equal to or smaller than a second intake air amount threshold smaller than said first intake air amount threshold; and perform a feedback period shortening control to correct each of said cylinder-by-cylinder air-fuel ratios of a plurality of said cylinders, in such a manner that, in a period in which said lean request is occurring, said cylinder-by-cylinder air-fuel ratio of said gas most excellently reaching cylinder is larger than said cylinder-by-cylinder air-fuel ratio of a cylinder other than said gas most excellently reaching cylinder among a plurality of said cylinders.

18. The air-fuel ratio control apparatus according to claim 15, wherein, said cylinder-by-cylinder mixture supplying section includes a fuel cut section configured so as to perform a fuel cut operation to stop supplying mixtures to all of said combustion chambers of a plurality of said cylinders when a predetermined fuel cut start condition becomes satisfied, and to terminate said fuel cut operation so as to resume supplying said mixtures to all of said combustion chambers of a plurality of said cylinders when a predetermined fuel cut termination condition becomes satisfied while said fuel cut operation is being performed;

said cylinder-by-cylinder air-fuel ratio correction section is configured so as to, determine, based on said output value of said downstream air-fuel ratio sensor, whether or not unburnt substances start to flow out downstream of said three-way catalyst after a point in time of an end of said fuel cut operation, and determine that said cylinder-by-cylinder air-fuel ratio control condition is satisfied during a post fuel cut period from a point in time of said end of said fuel cut operation to a point in time at which it is determined that said unburnt substances start to flow out downstream of said three-way catalyst; and perform a post fuel cut control to correct each of said cylinder-by-cylinder air-fuel ratios of a plurality of said cylinders in said post fuel cut period, in such a manner that a cylinder-by-cylinder air-fuel ratio of said gas most excellently reaching cylinder is larger than a cylinder-by-cylinder air-fuel ratio of a cylinder other than said gas most excellently reaching cylinder, but is smaller than said stoichiometric air-fuel ratio.

19. The air-fuel ratio control apparatus according to claim 15, wherein, said cylinder-by-cylinder air-fuel ratio correction section is configured:

so as to obtain a maximum oxygen storage amount of said catalyst, determine whether or not said obtained maximum oxygen is smaller than a predetermined maximum oxygen storage amount threshold, and determine that said cylinder-by-cylinder air-fuel ratio control condition is satisfied when it determines that said obtained maximum oxygen is smaller than said predetermined maximum oxygen storage amount threshold; and so as to perform a control hunting preventing control to correct each of said cylinder-by-cylinder air-fuel ratios of a plurality of said cylinders in such a manner that, in a period in which said rich request is occurring, a cylinder-by-cylinder air-fuel ratio of said gas most excellently reaching cylinder is larger than a cylinder-by-cylinder air-fuel ratio of a cylinder other than said gas most excellently reaching cylinder among a plurality of said cylinders, but is smaller than said stoichiometric air-fuel ratio.

20. The air-fuel ratio control apparatus according to claim 15, wherein, said cylinder-by-cylinder air-fuel ratio correction section is configured:

so as to obtain a maximum oxygen storage amount of said catalyst, determine whether or not said obtained maximum oxygen is smaller than a predetermined maximum oxygen storage amount threshold, and determine that said cylinder-by-cylinder air-fuel ratio control condition is satisfied when it determines that said obtained maximum oxygen is smaller than said predetermined maximum oxygen storage amount threshold; and so as to perform a control hunting preventing control to correct each of said cylinder-by-cylinder air-fuel ratios of a plurality of said cylinders in such a manner that, in a period in which said lean request is occurring, a cylinder-by-cylinder air-fuel ratio of said gas most excellently reaching cylinder is smaller than a cylinder-by-cylinder air-fuel ratio of a cylinder other than said gas most excellently reaching cylinder among a plurality of said cylinders, but is larger than said stoichiometric air-fuel ratio.

* * * * *